United States Patent
Goldberg et al.

(10) Patent No.: US 11,500,897 B2
(45) Date of Patent: *Nov. 15, 2022

(54) ALLOCATION AND REASSIGNMENT OF UNIQUE IDENTIFIERS FOR SYNCHRONIZATION OF CONTENT ITEMS

(71) Applicant: DROPBOX, INC., San Francisco, CA (US)

(72) Inventors: Isaac Goldberg, San Francisco, CA (US); John Lai, San Francisco, CA (US); Sujay Jayakar, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/833,348

(22) Filed: Mar. 27, 2020

(65) Prior Publication Data

US 2020/0233880 A1 Jul. 23, 2020

Related U.S. Application Data

(63) Continuation of application No. 15/858,357, filed on Dec. 29, 2017, now Pat. No. 10,872,098, and a
(Continued)

(51) Int. Cl.
*G06F 12/00* (2006.01)
*G06F 16/00* (2019.01)
(Continued)

(52) U.S. Cl.
CPC .............. *G06F 16/27* (2019.01); *G06F 1/04* (2013.01); *G06F 3/065* (2013.01); *G06F 3/067* (2013.01);
(Continued)

(58) Field of Classification Search
None
See application file for complete search history.

(56) References Cited

U.S. PATENT DOCUMENTS

| 5,220,665 A | 6/1993 | Coyle, Jr. et al. |
| 5,335,346 A | 8/1994 | Fabbio |

(Continued)

FOREIGN PATENT DOCUMENTS

| AU | 2008202290 B2 | 5/2010 |
| AU | 2018395858 | 11/2021 |

(Continued)

OTHER PUBLICATIONS

Cobena G., et al., "Detecting Changes in XML Documents," Proceedings of the 18th International Conference on Data Engineering, Jan. 1, 2002, pp. 41-52.
(Continued)

*Primary Examiner* — Tuan A Pham
(74) *Attorney, Agent, or Firm* — Polsinelli PC

(57) ABSTRACT

A client can allocate and reassociate unique identifiers to local content items associated with an account at a content management system, and use the unique identifiers to commit operations for the content items on the content management system. For example, a client can create a content item and determine the content item does not have an identifier from the content management system. The client obtains an identifier for the content item and asks the content management system to verify a uniqueness of the identifier. When the identifier is unique, the client adds a node corresponding to the content item to a local tree representing a state at the client of content items associated with the account, and uploads the content item with the identifier to the content management system. When the identifier is not unique, the client obtains a new identifier for the content item.

19 Claims, 37 Drawing Sheets

Related U.S. Application Data continuation of application No. 15/870,221, filed on Jan. 12, 2018, now Pat. No. 10,671,638.

(60) Provisional application No. 62/611,473, filed on Dec. 28, 2017.

(51) Int. Cl.

| | | |
|---|---|---|
| G06F 16/27 | (2019.01) | |
| G06F 16/11 | (2019.01) | |
| G06F 16/18 | (2019.01) | |
| G06F 16/178 | (2019.01) | |
| G06F 16/176 | (2019.01) | |
| G06F 3/06 | (2006.01) | |
| G06F 21/60 | (2013.01) | |
| G06F 21/62 | (2013.01) | |
| H04L 9/40 | (2022.01) | |
| H04L 67/06 | (2022.01) | |
| H04L 67/1097 | (2022.01) | |
| G06F 16/958 | (2019.01) | |
| G06F 16/2455 | (2019.01) | |
| G06F 16/951 | (2019.01) | |
| G06F 16/172 | (2019.01) | |
| G06F 1/04 | (2006.01) | |
| G06F 9/54 | (2006.01) | |
| G06F 11/14 | (2006.01) | |
| G06F 12/14 | (2006.01) | |
| G06F 21/10 | (2013.01) | |
| H04L 9/32 | (2006.01) | |
| H04L 67/1095 | (2022.01) | |
| G06F 16/23 | (2019.01) | |
| G06F 16/22 | (2019.01) | |
| G06F 16/182 | (2019.01) | |
| G06F 16/185 | (2019.01) | |
| G06F 16/16 | (2019.01) | |
| G06F 16/13 | (2019.01) | |
| G06F 16/174 | (2019.01) | |
| G06F 16/14 | (2019.01) | |
| G06F 16/907 | (2019.01) | |
| G06F 16/17 | (2019.01) | |
| G06F 16/901 | (2019.01) | |
| G06F 16/955 | (2019.01) | |
| H04L 67/306 | (2022.01) | |
| H04L 67/01 | (2022.01) | |

(52) U.S. Cl.
CPC .......... *G06F 3/0619* (2013.01); *G06F 3/0623* (2013.01); *G06F 3/0629* (2013.01); *G06F 3/0652* (2013.01); *G06F 9/547* (2013.01); *G06F 11/1469* (2013.01); *G06F 12/1466* (2013.01); *G06F 16/11* (2019.01); *G06F 16/113* (2019.01); *G06F 16/116* (2019.01); *G06F 16/119* (2019.01); *G06F 16/122* (2019.01); *G06F 16/125* (2019.01); *G06F 16/128* (2019.01); *G06F 16/13* (2019.01); *G06F 16/137* (2019.01); *G06F 16/148* (2019.01); *G06F 16/152* (2019.01); *G06F 16/156* (2019.01); *G06F 16/16* (2019.01); *G06F 16/162* (2019.01); *G06F 16/168* (2019.01); *G06F 16/172* (2019.01); *G06F 16/176* (2019.01); *G06F 16/178* (2019.01); *G06F 16/1734* (2019.01); *G06F 16/1744* (2019.01); *G06F 16/1767* (2019.01); *G06F 16/1787* (2019.01); *G06F 16/18* (2019.01); *G06F 16/182* (2019.01); *G06F 16/183* (2019.01); *G06F 16/184* (2019.01); *G06F 16/185* (2019.01); *G06F 16/1827* (2019.01); *G06F 16/1844* (2019.01); *G06F 16/2246* (2019.01); *G06F 16/2255* (2019.01); *G06F 16/2322* (2019.01); *G06F 16/2358* (2019.01); *G06F 16/2365* (2019.01); *G06F 16/2379* (2019.01); *G06F 16/24552* (2019.01); *G06F 16/275* (2019.01); *G06F 16/907* (2019.01); *G06F 16/9027* (2019.01); *G06F 16/951* (2019.01); *G06F 16/955* (2019.01); *G06F 16/958* (2019.01); *G06F 21/10* (2013.01); *G06F 21/604* (2013.01); *G06F 21/6218* (2013.01); *H04L 9/3213* (2013.01); *H04L 9/3247* (2013.01); *H04L 63/08* (2013.01); *H04L 63/0853* (2013.01); *H04L 63/10* (2013.01); *H04L 63/101* (2013.01); *H04L 63/102* (2013.01); *H04L 67/06* (2013.01); *H04L 67/1095* (2013.01); *H04L 67/1097* (2013.01); *G06F 2201/84* (2013.01); *G06F 2212/1052* (2013.01); *G06F 2221/2141* (2013.01); *H04L 67/01* (2022.05); *H04L 67/306* (2013.01)

(56) References Cited

U.S. PATENT DOCUMENTS

| | | |
|---|---|---|
| 5,574,901 A | 11/1996 | Takahashi |
| 5,665,863 A | 9/1997 | Yeh |
| 5,745,750 A | 4/1998 | Porcaro |
| 5,778,389 A | 7/1998 | Pruett et al. |
| 5,802,253 A | 9/1998 | Gross et al. |
| 5,802,508 A | 9/1998 | Morgenstern |
| 5,956,715 A | 9/1999 | Glasser et al. |
| 6,269,371 B1 | 7/2001 | Ohnishi |
| 6,408,298 B1 | 6/2002 | Van et al. |
| 6,421,684 B1 | 7/2002 | Cabrera et al. |
| 6,427,123 B1 | 7/2002 | Sedlar |
| 6,546,466 B1 | 4/2003 | Elko et al. |
| 6,560,655 B1 | 5/2003 | Grambihler et al. |
| 6,574,665 B1 | 6/2003 | Khotimsky et al. |
| 6,618,735 B1 | 9/2003 | Krishnaswami et al. |
| 6,665,863 B1 | 12/2003 | Lord et al. |
| 6,944,623 B2 | 9/2005 | Kim et al. |
| 6,978,271 B1 | 12/2005 | Hoffman et al. |
| 7,024,392 B2 | 4/2006 | Stefik et al. |
| 7,051,039 B1 | 5/2006 | Murthy et al. |
| 7,080,041 B2 | 7/2006 | Nagel et al. |
| 7,162,477 B1 | 1/2007 | Mukherjee |
| 7,263,718 B2 | 8/2007 | O'Brien et al. |
| 7,275,177 B2 | 9/2007 | Armangau et al. |
| 7,313,598 B1 | 12/2007 | Sheth et al. |
| 7,487,228 B1 | 2/2009 | Preslan et al. |
| 7,526,575 B2 | 4/2009 | Rabbers et al. |
| 7,529,931 B2 | 5/2009 | Vasishth et al. |
| 7,567,991 B2 | 7/2009 | Armangau et al. |
| 7,606,876 B2 | 10/2009 | Graves et al. |
| 7,631,298 B2 | 12/2009 | Kaler et al. |
| 7,634,482 B2 | 12/2009 | Mukherjee et al. |
| 7,634,514 B2 | 12/2009 | Langan et al. |
| 7,657,769 B2 | 2/2010 | Marcy et al. |
| 7,660,809 B2 | 2/2010 | Cortright et al. |
| 7,685,206 B1 | 3/2010 | Mathew et al. |
| 7,734,690 B2 | 6/2010 | Moromisato et al. |
| 7,761,497 B1 | 7/2010 | O'Connell, Jr. et al. |
| 7,805,469 B1 | 9/2010 | Nagaralu et al. |
| 7,809,828 B2 | 10/2010 | Burnett et al. |
| 7,886,016 B1 | 2/2011 | Tormasov et al. |
| 7,895,158 B2 | 2/2011 | Bosloy et al. |
| 7,917,494 B2 | 3/2011 | Mueller et al. |
| 7,925,631 B1 | 4/2011 | Thillai et al. |
| 7,962,950 B2 | 6/2011 | Choo et al. |
| 8,015,204 B2 | 9/2011 | Kaler et al. |
| 8,069,226 B2 | 11/2011 | Momchilov et al. |
| 8,099,452 B2 | 1/2012 | Chkodrov et al. |

(56) References Cited

U.S. PATENT DOCUMENTS

| | | |
|---|---|---|
| 8,117,151 B2 | 2/2012 | Nakatani et al. |
| 8,156,151 B2 | 4/2012 | Sidman et al. |
| 3,180,983 A1 | 5/2012 | Jernigan et al. |
| 8,180,747 B2 | 5/2012 | Marinkovic et al. |
| 8,190,741 B2 | 5/2012 | Wong et al. |
| 8,249,885 B2 | 8/2012 | Berkowitz et al. |
| 8,250,397 B2 | 8/2012 | Marcy et al. |
| 8,260,742 B2 | 9/2012 | Cognigni et al. |
| 8,301,994 B1 | 10/2012 | Shah et al. |
| 8,312,242 B2 | 11/2012 | Casper et al. |
| 8,326,874 B2 | 12/2012 | Wright et al. |
| 8,359,467 B2 | 1/2013 | Subramanian et al. |
| 8,417,676 B2 | 4/2013 | Petri |
| 8,516,149 B1 | 8/2013 | Edmett Stacey |
| 8,548,992 B2 | 10/2013 | Abramoff et al. |
| 8,554,800 B2 | 10/2013 | Goldentouch et al. |
| 8,589,349 B2 | 11/2013 | Grant et al. |
| 8,661,070 B2 | 2/2014 | Goldsmith et al. |
| 8,661,539 B2 | 2/2014 | Hodges |
| 8,667,034 B1 | 3/2014 | Simon et al. |
| 8,688,734 B1 | 4/2014 | Tidd |
| 8,694,564 B2 | 4/2014 | Guarraci et al. |
| 8,700,670 B2 | 4/2014 | Marathe et al. |
| 8,706,701 B1 | 4/2014 | Stefanov et al. |
| 8,818,951 B1 | 8/2014 | Muntz et al. |
| 8,862,644 B2 | 10/2014 | Lyle et al. |
| 8,880,474 B2 | 11/2014 | Mason et al. |
| 8,904,503 B2 | 12/2014 | Agbabian |
| 8,949,179 B2 | 2/2015 | Besen et al. |
| 8,990,924 B2 | 3/2015 | Chow |
| 8,996,884 B2 | 3/2015 | Hartley et al. |
| 9,002,805 B1 | 4/2015 | Barber et al. |
| 9,087,215 B2 | 7/2015 | Lafever et al. |
| 9,129,088 B1 | 9/2015 | Baschy |
| 9,152,466 B2 | 10/2015 | Dictos et al. |
| 9,183,303 B1 | 11/2015 | Goel et al. |
| 9,210,116 B2 | 12/2015 | Jeng et al. |
| 9,218,429 B2 | 12/2015 | Levy et al. |
| 9,231,988 B2 | 1/2016 | Holt et al. |
| 9,239,841 B2 | 1/2016 | Arnaudov et al. |
| 9,251,235 B1 | 2/2016 | Hurst et al. |
| 9,294,485 B2 | 3/2016 | Allain et al. |
| 9,298,384 B2 | 3/2016 | Kang et al. |
| 9,300,609 B1 | 3/2016 | Beausoleil et al. |
| 9,310,981 B2 | 4/2016 | Lynch et al. |
| 9,311,324 B2 | 4/2016 | Irizarry, Jr. et al. |
| 9,325,571 B2 | 4/2016 | Chen |
| 9,330,106 B2 | 5/2016 | Piasecki et al. |
| 9,336,219 B2 | 5/2016 | Makkar et al. |
| 9,336,227 B2 | 5/2016 | Eberlein et al. |
| 9,361,473 B2 | 6/2016 | Chou Fritz et al. |
| 9,413,708 B1 | 8/2016 | Michael et al. |
| 9,424,437 B1 | 8/2016 | Ancin et al. |
| 9,426,216 B2 | 8/2016 | Subramani et al. |
| 9,430,669 B2 | 8/2016 | Staley et al. |
| 9,432,457 B2 | 8/2016 | Marano et al. |
| 9,444,869 B2 | 9/2016 | Jellison, Jr. et al. |
| 9,448,893 B1 | 9/2016 | Whitehead et al. |
| 9,449,082 B2 | 9/2016 | Leonard |
| 9,449,182 B1 | 9/2016 | Dang et al. |
| 9,454,534 B2 | 9/2016 | Thomas et al. |
| 9,471,807 B1 | 10/2016 | Chakraborty et al. |
| 9,477,673 B2 | 10/2016 | Dwan et al. |
| 9,479,567 B1 | 10/2016 | Koorapati et al. |
| 9,479,578 B1 | 10/2016 | Swanson |
| 9,483,491 B2 | 11/2016 | Wijayaratne et al. |
| 9,495,478 B2 | 11/2016 | Hendrickson et al. |
| 9,501,490 B2 | 11/2016 | Evans et al. |
| 9,507,795 B2 | 11/2016 | Dorman et al. |
| 9,529,804 B1 | 12/2016 | Muddu et al. |
| 9,529,818 B2 | 12/2016 | Catmull et al. |
| 9,542,404 B2 | 1/2017 | Moore et al. |
| 9,547,559 B2 | 1/2017 | Whitehead et al. |
| 9,552,363 B2 | 1/2017 | Novak et al. |
| 9,558,202 B2 | 1/2017 | Lockhart et al. |
| 9,563,638 B2 | 2/2017 | Newhouse |
| 9,565,227 B1 | 2/2017 | Heli et al. |
| 9,589,131 B2 | 3/2017 | Austin |
| 9,596,246 B2 | 3/2017 | Peddada |
| 9,614,826 B1 | 4/2017 | McCorkendale |
| 9,632,528 B2 | 4/2017 | Miyashita et al. |
| 9,633,037 B2 | 4/2017 | Smith et al. |
| 9,648,088 B1 | 5/2017 | Pande et al. |
| 9,652,490 B2 | 5/2017 | Belanger et al. |
| 9,652,741 B2 | 5/2017 | Goldberg et al. |
| 9,672,261 B2 | 6/2017 | Holmes-Higgin et al. |
| 9,703,800 B1 | 7/2017 | Korshunov et al. |
| 9,703,801 B2 | 7/2017 | Melahn et al. |
| 9,710,535 B2 | 7/2017 | Aizman et al. |
| 9,716,753 B2 | 7/2017 | Piyush et al. |
| 9,720,926 B2 | 8/2017 | Aron et al. |
| 9,720,947 B2 | 8/2017 | Aron et al. |
| 9,727,394 B2 | 8/2017 | Xun et al. |
| 9,747,164 B1 | 8/2017 | Auchmoody et al. |
| 9,747,297 B2 | 8/2017 | Penangwala et al. |
| 9,754,119 B2 | 9/2017 | Kilday |
| 9,767,106 B1 | 9/2017 | Duggal et al. |
| 9,773,051 B2 | 9/2017 | Smith |
| 9,805,050 B2 | 10/2017 | Smith et al. |
| 9,805,054 B2 | 10/2017 | Davis et al. |
| 9,805,106 B2 | 10/2017 | McErlean et al. |
| 9,817,987 B2 | 11/2017 | Mityagin |
| 9,824,090 B2 | 11/2017 | Hayrapetian et al. |
| 9,830,345 B1 | 11/2017 | Baars |
| 9,838,424 B2 | 12/2017 | Brady et al. |
| 9,852,147 B2 | 12/2017 | Von Muhlen et al. |
| 9,922,201 B2 | 3/2018 | Von Muhlen et al. |
| 9,936,020 B2 | 4/2018 | Leggette et al. |
| 9,953,036 B2 | 4/2018 | Mackenzie et al. |
| 9,971,822 B1 | 5/2018 | Deardeuff et al. |
| 10,013,440 B1 | 7/2018 | Gupta et al. |
| 10,037,339 B1 | 7/2018 | Kleinpeter et al. |
| 10,095,879 B1 | 10/2018 | Kleinpeter et al. |
| 10,198,182 B2 | 2/2019 | Adler et al. |
| 10,235,378 B1 | 3/2019 | Mamidi et al. |
| 10,250,693 B2 | 4/2019 | Colrain et al. |
| 10,324,903 B1 | 6/2019 | Goldberg et al. |
| 10,380,076 B2 | 8/2019 | Wijayaratne et al. |
| 10,425,477 B2 | 9/2019 | Trandafir et al. |
| 10,558,375 B2 | 2/2020 | Muhlestein et al. |
| 10,671,638 B2 | 6/2020 | Goldberg et al. |
| 10,671,639 B1 | 6/2020 | Acheson et al. |
| 10,733,205 B2 | 8/2020 | Goldberg et al. |
| 10,922,333 B2 | 2/2021 | Lai et al. |
| 11,288,138 B1 | 3/2022 | Freilich et al. |
| 2002/0147742 A1 | 10/2002 | Schroeder |
| 2003/0033386 A1 | 2/2003 | Dahlen et al. |
| 2003/0145020 A1 | 7/2003 | Ngo et al. |
| 2003/0159136 A1 | 8/2003 | Huang et al. |
| 2003/0167317 A1 | 9/2003 | Deen et al. |
| 2003/0196119 A1 | 10/2003 | Raley et al. |
| 2003/0212657 A1 | 11/2003 | Kaluskar et al. |
| 2004/0002990 A1 | 1/2004 | Sander et al. |
| 2004/0080549 A1 | 4/2004 | Lord et al. |
| 2004/0098418 A1 | 5/2004 | Hein et al. |
| 2004/0255048 A1 | 12/2004 | Lev Ran et al. |
| 2005/0125411 A1 | 6/2005 | Kilian et al. |
| 2005/0144308 A1 | 6/2005 | Harashima et al. |
| 2005/0149450 A1 | 7/2005 | Stefik et al. |
| 2005/0151738 A1 | 7/2005 | Lord et al. |
| 2005/0198385 A1 | 9/2005 | Aust et al. |
| 2005/0222996 A1 | 10/2005 | Yalamanchi |
| 2005/0256861 A1 | 11/2005 | Wong et al. |
| 2005/0289446 A1 | 12/2005 | Moncsko et al. |
| 2006/0070114 A1 | 3/2006 | Wood et al. |
| 2006/0111880 A1 | 5/2006 | Brown et al. |
| 2006/0136513 A1 | 6/2006 | Ngo et al. |
| 2006/0155776 A1 | 7/2006 | Aust |
| 2006/0184720 A1 | 8/2006 | Sinclair et al. |
| 2006/0253501 A1 | 11/2006 | Langan et al. |
| 2006/0271602 A1 | 11/2006 | Davis et al. |
| 2007/0016650 A1 | 1/2007 | Gilbert et al. |
| 2007/0016771 A1 | 1/2007 | Allison et al. |
| 2007/0022091 A1 | 1/2007 | Styles et al. |

(56) References Cited

U.S. PATENT DOCUMENTS

| | | |
|---|---|---|
| 2007/0067349 A1 | 3/2007 | Jhaveri et al. |
| 2007/0088744 A1 | 4/2007 | Webber et al. |
| 2007/0088764 A1 | 4/2007 | Yoon et al. |
| 2007/0130077 A1 | 6/2007 | Jagadeesan et al. |
| 2007/0136391 A1 | 6/2007 | Anzai et al. |
| 2007/0150595 A1 | 6/2007 | Bhorania et al. |
| 2007/0156670 A1 | 7/2007 | Lim |
| 2007/0185852 A1 | 8/2007 | Erofeev |
| 2007/0198540 A1 | 8/2007 | Kohl et al. |
| 2007/0208715 A1 | 9/2007 | Muehlbauer et al. |
| 2007/0208763 A1 | 9/2007 | Muehlbauer et al. |
| 2007/0208948 A1 | 9/2007 | Costa-Requena et al. |
| 2007/0234398 A1 | 10/2007 | Muehlbauer et al. |
| 2007/0250552 A1 | 10/2007 | Lango et al. |
| 2007/0282914 A1 | 12/2007 | Sivapragasam et al. |
| 2007/0283050 A1 | 12/2007 | Savage |
| 2007/0283403 A1 | 12/2007 | Eklund et al. |
| 2007/0288714 A1 | 12/2007 | Nakamura |
| 2007/0299882 A1 | 12/2007 | Padgett et al. |
| 2008/0005195 A1 | 1/2008 | Li et al. |
| 2008/0059474 A1 | 3/2008 | Lim |
| 2008/0104277 A1 | 5/2008 | Tian |
| 2008/0120129 A1 | 5/2008 | Seubert et al. |
| 2008/0168183 A1 | 7/2008 | Marcy et al. |
| 2008/0222296 A1 | 9/2008 | Lippincott et al. |
| 2008/0295081 A1 | 11/2008 | Albot et al. |
| 2008/0307255 A1 | 12/2008 | Chen et al. |
| 2009/0055921 A1 | 2/2009 | Field et al. |
| 2009/0132400 A1 | 5/2009 | Conway |
| 2009/0150569 A1 | 6/2009 | Kumar et al. |
| 2009/0182778 A1 | 7/2009 | Tormasov |
| 2009/0183117 A1 | 7/2009 | Chang |
| 2009/0198719 A1 | 8/2009 | Dewitt |
| 2009/0228511 A1 | 9/2009 | Atkin et al. |
| 2009/0271412 A1 | 10/2009 | Lacapra et al. |
| 2009/0292640 A1 | 11/2009 | Heatherly |
| 2010/0058462 A1 | 3/2010 | Chow |
| 2010/0106687 A1 | 4/2010 | Marcy et al. |
| 2010/0235649 A1 | 9/2010 | Jeffries et al. |
| 2010/0242037 A1 | 9/2010 | Xie et al. |
| 2010/0293209 A1 | 11/2010 | Bireley et al. |
| 2010/0306283 A1 | 12/2010 | Johnson et al. |
| 2011/0014985 A1 | 1/2011 | Park et al. |
| 2011/0040793 A1 | 2/2011 | Davidson et al. |
| 2011/0066668 A1 | 3/2011 | Guarraci |
| 2011/0072143 A1 | 3/2011 | Kuo et al. |
| 2011/0082879 A1 | 4/2011 | Hazlewood et al. |
| 2011/0126296 A1 | 5/2011 | Moore |
| 2011/0137874 A1 | 6/2011 | Grosman et al. |
| 2011/0195485 A1 | 8/2011 | Kale |
| 2011/0196892 A1 | 8/2011 | Xia |
| 2011/0197196 A1 | 8/2011 | Felton et al. |
| 2011/0218964 A1 | 9/2011 | Hagan et al. |
| 2011/0248821 A1 | 10/2011 | Merten |
| 2011/0271084 A1 | 11/2011 | Moue et al. |
| 2011/0283185 A1 | 11/2011 | Obasanjo et al. |
| 2012/0011098 A1 | 1/2012 | Yamada |
| 2012/0079606 A1 | 3/2012 | Evans et al. |
| 2012/0102539 A1 | 4/2012 | Robb et al. |
| 2012/0254123 A1 | 10/2012 | Ferguson et al. |
| 2012/0254505 A1 | 10/2012 | Chishtie et al. |
| 2012/0278334 A1 | 11/2012 | Abjanic |
| 2013/0013560 A1 | 1/2013 | Goldberg et al. |
| 2013/0014023 A1 | 1/2013 | Lee et al. |
| 2013/0067542 A1 | 3/2013 | Gonsalves et al. |
| 2013/0080785 A1 | 3/2013 | Ruhlen et al. |
| 2013/0086640 A1 | 4/2013 | Hashimoto et al. |
| 2013/0124690 A1 | 5/2013 | Liebman |
| 2013/0133051 A1 | 5/2013 | Riemers |
| 2013/0138608 A1 | 5/2013 | Smith |
| 2013/0144834 A1 | 6/2013 | Lloyd et al. |
| 2013/0152047 A1 | 6/2013 | Moorthi et al. |
| 2013/0179480 A1 | 7/2013 | Agarwal et al. |
| 2013/0191339 A1 | 7/2013 | Haden et al. |
| 2013/0191631 A1 | 7/2013 | Ylonen et al. |
| 2013/0227015 A1 | 8/2013 | Mihara et al. |
| 2013/0238706 A1 | 9/2013 | Desai |
| 2013/0246527 A1 | 9/2013 | Viera et al. |
| 2013/0254777 A1 | 9/2013 | Branson et al. |
| 2013/0258842 A1 | 10/2013 | Mizutani et al. |
| 2013/0262862 A1 | 10/2013 | Hartley et al. |
| 2013/0268480 A1 | 10/2013 | Dorman |
| 2013/0268559 A1 | 10/2013 | Reeves |
| 2013/0282657 A1 | 10/2013 | Besen et al. |
| 2013/0282658 A1 | 10/2013 | Besen et al. |
| 2013/0282785 A1 | 10/2013 | Besen et al. |
| 2013/0290323 A1 | 10/2013 | Saib |
| 2013/0304694 A1 | 11/2013 | Barreto et al. |
| 2013/0304765 A1 | 11/2013 | Failelson et al. |
| 2013/0318160 A1 | 11/2013 | Beraka et al. |
| 2013/0321306 A1 | 12/2013 | Bauermeister et al. |
| 2013/0346557 A1 | 12/2013 | Chang et al. |
| 2014/0033324 A1 | 1/2014 | Kiang et al. |
| 2014/0047261 A1 | 2/2014 | Patiejunas et al. |
| 2014/0059002 A1 | 2/2014 | Lockhart et al. |
| 2014/0075501 A1 | 3/2014 | Srinivasan et al. |
| 2014/0082145 A1 | 3/2014 | Lacapra |
| 2014/0122425 A1 | 5/2014 | Poirier et al. |
| 2014/0136635 A1 | 5/2014 | Jeng et al. |
| 2014/0143543 A1 | 5/2014 | Aikas et al. |
| 2014/0173694 A1 | 6/2014 | Kranz |
| 2014/0181021 A1 | 6/2014 | Montulli et al. |
| 2014/0181033 A1 | 6/2014 | Pawar et al. |
| 2014/0181053 A1 | 6/2014 | Belanger et al. |
| 2014/0181579 A1 | 6/2014 | Whitehead et al. |
| 2014/0188798 A1 | 7/2014 | Mackenzie et al. |
| 2014/0189051 A1 | 7/2014 | Hunter |
| 2014/0189118 A1 | 7/2014 | Hunter |
| 2014/0189355 A1* | 7/2014 | Hunter .................. H04L 63/06 713/171 |
| 2014/0195485 A1 | 7/2014 | Dorman |
| 2014/0195638 A1 | 7/2014 | Houston et al. |
| 2014/0201138 A1 | 7/2014 | Dorman et al. |
| 2014/0201145 A1 | 7/2014 | Dorman et al. |
| 2014/0208124 A1 | 7/2014 | Hartley |
| 2014/0215551 A1 | 7/2014 | Allain et al. |
| 2014/0250066 A1 | 9/2014 | Calkowski et al. |
| 2014/0258350 A1 | 9/2014 | Duval et al. |
| 2014/0258418 A1 | 9/2014 | Subramani et al. |
| 2014/0259005 A1 | 9/2014 | Jeffrey et al. |
| 2014/0280129 A1 | 9/2014 | Howarth et al. |
| 2014/0282313 A1 | 9/2014 | Alfieri |
| 2014/0282851 A1 | 9/2014 | Miller et al. |
| 2014/0289195 A1 | 9/2014 | Chan et al. |
| 2014/0297734 A1 | 10/2014 | Lacapra et al. |
| 2014/0297759 A1 | 10/2014 | Mody |
| 2014/0310175 A1 | 10/2014 | Coronel |
| 2014/0317128 A1 | 10/2014 | Simeonov et al. |
| 2014/0359085 A1 | 12/2014 | Chen |
| 2014/0372376 A1 | 12/2014 | Smith et al. |
| 2014/0379647 A1 | 12/2014 | Smith et al. |
| 2015/0012616 A1 | 1/2015 | Pearl et al. |
| 2015/0026222 A1 | 1/2015 | Litzenberger et al. |
| 2015/0026597 A1 | 1/2015 | Gadamsetty et al. |
| 2015/0026604 A1 | 1/2015 | Mulukuri et al. |
| 2015/0026751 A1 | 1/2015 | Yokoi |
| 2015/0058932 A1 | 2/2015 | Faitelson et al. |
| 2015/0088817 A1 | 3/2015 | Dwan et al. |
| 2015/0089019 A1 | 3/2015 | Chou |
| 2015/0095641 A1 | 4/2015 | Drewry |
| 2015/0100546 A1 | 4/2015 | Eberlein et al. |
| 2015/0100547 A1 | 4/2015 | Holmes-Higgin et al. |
| 2015/0100705 A1 | 4/2015 | Abe et al. |
| 2015/0101021 A1 | 4/2015 | McErlean et al. |
| 2015/0120763 A1 | 4/2015 | Grue et al. |
| 2015/0134600 A1 | 5/2015 | Eisner et al. |
| 2015/0154418 A1 | 6/2015 | Redberg |
| 2015/0163206 A1 | 6/2015 | McCarthy et al. |
| 2015/0163302 A1 | 6/2015 | Armstrong et al. |
| 2015/0172283 A1 | 6/2015 | Omnes et al. |
| 2015/0172412 A1 | 6/2015 | Escriva et al. |
| 2015/0178516 A1 | 6/2015 | Mityagin |
| 2015/0186667 A1 | 7/2015 | Yao et al. |

(56) References Cited

U.S. PATENT DOCUMENTS

| | | |
|---|---|---|
| 2015/0186668 A1* | 7/2015 | Whaley .................. G06F 16/178 713/156 |
| 2015/0193347 A1 | 7/2015 | Kluesing et al. |
| 2015/0205977 A1 | 7/2015 | Rundle et al. |
| 2015/0207844 A1 | 7/2015 | Tataroiu et al. |
| 2015/0220917 A1 | 8/2015 | Aabye et al. |
| 2015/0222431 A1 | 8/2015 | Guido Van Rossum |
| 2015/0222580 A1 | 8/2015 | Grue |
| 2015/0222615 A1 | 8/2015 | Allain et al. |
| 2015/0242521 A1 | 8/2015 | Hunter et al. |
| 2015/0244692 A1 | 8/2015 | Liu et al. |
| 2015/0244795 A1 | 8/2015 | Cantwell et al. |
| 2015/0248384 A1 | 9/2015 | Luo et al. |
| 2015/0249647 A1 | 9/2015 | Mityagin et al. |
| 2015/0277802 A1 | 10/2015 | Oikarinen et al. |
| 2015/0277969 A1 | 10/2015 | Strauss et al. |
| 2015/0278024 A1 | 10/2015 | Barman et al. |
| 2015/0278397 A1 | 10/2015 | Hendrickson et al. |
| 2015/0280959 A1 | 10/2015 | Vincent |
| 2015/0281360 A1 | 10/2015 | Lacapra et al. |
| 2015/0286833 A1 | 10/2015 | Resch et al. |
| 2015/0288680 A1 | 10/2015 | Leggette |
| 2015/0296012 A1* | 10/2015 | Piyush .................. G06F 21/6245 726/1 |
| 2015/0310035 A1 | 10/2015 | Godman et al. |
| 2015/0318941 A1 | 11/2015 | Zheng et al. |
| 2015/0356111 A1 | 12/2015 | Kalsi et al. |
| 2015/0358408 A1 | 12/2015 | Fukatani et al. |
| 2015/0370483 A1 | 12/2015 | Schoebel-Theuer et al. |
| 2015/0370825 A1 | 12/2015 | Dutcalt et al. |
| 2016/0028796 A1 | 1/2016 | Garcia et al. |
| 2016/0034508 A1 | 2/2016 | Aron et al. |
| 2016/0036822 A1 | 2/2016 | Kim et al. |
| 2016/0042087 A1 | 2/2016 | Yang |
| 2016/0050177 A1 | 2/2016 | Cue et al. |
| 2016/0055021 A1 | 2/2016 | Beveridge et al. |
| 2016/0062839 A1 | 3/2016 | Kapoor |
| 2016/0065672 A1 | 3/2016 | Savage et al. |
| 2016/0085769 A1 | 3/2016 | Penangwala et al. |
| 2016/0092312 A1 | 3/2016 | Dornquast et al. |
| 2016/0103750 A1 | 4/2016 | Cooper et al. |
| 2016/0110374 A1 | 4/2016 | Wetherall et al. |
| 2016/0112508 A1 | 4/2016 | Sher |
| 2016/0140139 A1 | 5/2016 | Torres et al. |
| 2016/0140197 A1 | 5/2016 | Gast et al. |
| 2016/0140201 A1 | 5/2016 | Cowling et al. |
| 2016/0182494 A1 | 6/2016 | Lissounov et al. |
| 2016/0188465 A1 | 6/2016 | Almasi et al. |
| 2016/0188628 A1 | 6/2016 | Hartman et al. |
| 2016/0205100 A1 | 7/2016 | Brannon |
| 2016/0210238 A1 | 7/2016 | Frank et al. |
| 2016/0224989 A1 | 8/2016 | Lissounov et al. |
| 2016/0285890 A1 | 9/2016 | Beausoleil et al. |
| 2016/0291856 A1 | 10/2016 | Von Muhlen et al. |
| 2016/0292179 A1 | 10/2016 | Von Muhlen et al. |
| 2016/0292443 A1 | 10/2016 | Von Muhlen et al. |
| 2016/0294916 A1 | 10/2016 | Daher et al. |
| 2016/0299917 A1 | 10/2016 | Koos et al. |
| 2016/0301619 A1 | 10/2016 | Bashir et al. |
| 2016/0308950 A1 | 10/2016 | Bouvrette et al. |
| 2016/0308966 A1 | 10/2016 | Zhang et al. |
| 2016/0315941 A1 | 10/2016 | Dang et al. |
| 2016/0321275 A1 | 11/2016 | Yap et al. |
| 2016/0321287 A1 | 11/2016 | Luthra et al. |
| 2016/0321293 A1 | 11/2016 | Auer |
| 2016/0323358 A1 | 11/2016 | Malhotra et al. |
| 2016/0334967 A1 | 11/2016 | Rottler et al. |
| 2016/0335278 A1 | 11/2016 | Tabaaloute et al. |
| 2016/0337356 A1 | 11/2016 | Simon et al. |
| 2016/0342479 A1 | 11/2016 | Chen et al. |
| 2016/0349999 A1 | 12/2016 | Adler et al. |
| 2016/0350322 A1 | 12/2016 | Fan et al. |
| 2016/0352752 A1 | 12/2016 | Bush et al. |
| 2016/0353447 A1 | 12/2016 | White et al. |
| 2016/0357720 A1 | 12/2016 | Thimbleby |
| 2016/0366118 A1 | 12/2016 | Wang |
| 2016/0371296 A1 | 12/2016 | Passey et al. |
| 2016/0371358 A1 | 12/2016 | Lee et al. |
| 2017/0005974 A1 | 1/2017 | Wheeler et al. |
| 2017/0006097 A1 | 1/2017 | Johnson et al. |
| 2017/0026379 A1 | 1/2017 | Lu et al. |
| 2017/0039216 A1 | 2/2017 | Fan et al. |
| 2017/0052717 A1 | 2/2017 | Rawat et al. |
| 2017/0075907 A1 | 3/2017 | Goswami et al. |
| 2017/0075920 A1 | 3/2017 | McKay et al. |
| 2017/0075921 A1 | 3/2017 | Benton et al. |
| 2017/0078383 A1 | 3/2017 | Murstein et al. |
| 2017/0078384 A1 | 3/2017 | Trandafir et al. |
| 2017/0109370 A1 | 4/2017 | Newhouse |
| 2017/0109385 A1 | 4/2017 | Aronovich et al. |
| 2017/0123931 A1 | 5/2017 | Aizman et al. |
| 2017/0124111 A1 | 5/2017 | Sharma et al. |
| 2017/0124170 A1 | 5/2017 | Koorapati et al. |
| 2017/0131934 A1 | 5/2017 | Kaczmarczyk et al. |
| 2017/0149885 A1 | 5/2017 | Kaplan et al. |
| 2017/0168670 A1 | 6/2017 | Sovalin et al. |
| 2017/0177613 A1 | 6/2017 | Sharma et al. |
| 2017/0185687 A1 | 6/2017 | Pai et al. |
| 2017/0192656 A1 | 7/2017 | Pedrick et al. |
| 2017/0192856 A1 | 7/2017 | Chin et al. |
| 2017/0192998 A1 | 7/2017 | Sergeev et al. |
| 2017/0193002 A1 | 7/2017 | Shvachko et al. |
| 2017/0193040 A1 | 7/2017 | Agrawal et al. |
| 2017/0193448 A1 | 7/2017 | Piyush et al. |
| 2017/0195457 A1 | 7/2017 | Smith, II et al. |
| 2017/0220596 A1 | 8/2017 | Smith et al. |
| 2017/0230702 A1 | 8/2017 | Sarosi et al. |
| 2017/0235759 A1 | 8/2017 | Altaparmakov et al. |
| 2017/0270136 A1 | 9/2017 | Chen et al. |
| 2017/0270306 A1 | 9/2017 | Dorwin |
| 2017/0289210 A1 | 10/2017 | Pai et al. |
| 2017/0300505 A1 | 10/2017 | Belmanu Sadananda et al. |
| 2017/0302521 A1 | 10/2017 | Lui et al. |
| 2017/0302737 A1 | 10/2017 | Piyush et al. |
| 2017/0308443 A1 | 10/2017 | Lai et al. |
| 2017/0308565 A1 | 10/2017 | Broll et al. |
| 2017/0308598 A1 | 10/2017 | Goldberg et al. |
| 2017/0308599 A1 | 10/2017 | Newhouse |
| 2017/0308602 A1 | 10/2017 | Raghunath et al. |
| 2017/0308681 A1 | 10/2017 | Gould et al. |
| 2017/0314898 A1 | 11/2017 | Syverson et al. |
| 2017/0316032 A1 | 11/2017 | Kamalaksha et al. |
| 2017/0316222 A1 | 11/2017 | Muhlestein et al. |
| 2017/0331893 A1 | 11/2017 | Crofton et al. |
| 2017/0351701 A1 | 12/2017 | Aron et al. |
| 2017/0357663 A1 | 12/2017 | Giampaolo |
| 2018/0004442 A1 | 1/2018 | Hnanicek et al. |
| 2018/0018115 A1 | 1/2018 | Ikegame |
| 2018/0039652 A1 | 2/2018 | Nichols et al. |
| 2018/0039788 A1 | 2/2018 | Leggette |
| 2018/0084045 A1 | 3/2018 | Nichols et al. |
| 2018/0089349 A1 | 3/2018 | Rezgui |
| 2018/0121370 A1 | 5/2018 | Mukkamala et al. |
| 2018/0144263 A1 | 5/2018 | Saxena et al. |
| 2018/0150477 A1 | 5/2018 | Jewell et al. |
| 2018/0157825 A1 | 6/2018 | Eksten et al. |
| 2018/0176082 A1 | 6/2018 | Katz et al. |
| 2018/0176093 A1 | 6/2018 | Katz et al. |
| 2018/0176120 A1 | 6/2018 | Katz et al. |
| 2018/0181549 A1 | 6/2018 | Hileman et al. |
| 2018/0189369 A1 | 7/2018 | Baek et al. |
| 2018/0196643 A1 | 7/2018 | Dolby et al. |
| 2018/0246946 A1 | 8/2018 | Sadhwani |
| 2018/0260125 A1 | 9/2018 | Botes et al. |
| 2018/0260411 A1 | 9/2018 | Deardeuff et al. |
| 2018/0270534 A1 | 9/2018 | Badawiyeh |
| 2018/0329969 A1 | 11/2018 | Abrams |
| 2018/0349408 A1 | 12/2018 | Jewell et al. |
| 2018/0364950 A1 | 12/2018 | Spillane et al. |
| 2018/0365236 A1 | 12/2018 | Wang et al. |
| 2019/0005139 A1 | 1/2019 | Ford et al. |
| 2019/0034507 A1 | 1/2019 | Duttagupta et al. |
| 2019/0050833 A1 | 2/2019 | Hu et al. |
| 2019/0102370 A1 | 4/2019 | Nelson et al. |

(56) References Cited

U.S. PATENT DOCUMENTS

| | | | |
|---|---|---|---|
| 2019/0114427 | A1 | 4/2019 | Suryanarayana et al. |
| 2019/0179714 | A1 | 6/2019 | Karthikeyan et al. |
| 2019/0205407 | A1 | 7/2019 | Ying et al. |
| 2019/0205423 | A1 | 7/2019 | Haven et al. |
| 2019/0205424 | A1 | 7/2019 | Jubb, IV |
| 2019/0205425 | A1 | 7/2019 | Goldberg et al. |
| 2019/0205548 | A1 | 7/2019 | Lee et al. |
| 2019/0207940 | A1 | 7/2019 | Kleinpeter et al. |
| 2019/0208013 | A1 | 7/2019 | Lai |
| 2019/0208014 | A1 | 7/2019 | Goldberg et al. |
| 2019/0266342 | A1 | 8/2019 | Kleinpeter et al. |
| 2019/0332231 | A1 | 10/2019 | Rogers et al. |
| 2019/0332688 | A1 | 10/2019 | Valentine et al. |
| 2019/0361793 | A1 | 11/2019 | Goldberg |
| 2020/0249877 | A1 | 8/2020 | McIlroy et al. |
| 2021/0042325 | A1 | 2/2021 | Goldberg et al. |
| 2022/0019385 | A1 | 1/2022 | Karr et al. |

FOREIGN PATENT DOCUMENTS

| | | |
|---|---|---|
| CN | 1255748 C | 5/2006 |
| CN | 106897352 A | 6/2017 |
| CN | 106941504 A | 7/2017 |
| EP | 2757491 A1 | 7/2014 |
| EP | 2911068 A1 | 8/2015 |
| EP | 3707615 A1 | 9/2020 |
| GB | 2399663 A | 9/2004 |
| GB | 2494047 A | 2/2013 |
| JP | 2007102461 A | 4/2007 |
| JP | 2007115247 A | 5/2007 |
| JP | 2007527053 A | 9/2007 |
| JP | 2008250903 A | 10/2008 |
| JP | 2008541263 A | 11/2008 |
| JP | 2011128833 A | 6/2011 |
| JP | 2011233069 A | 11/2011 |
| JP | 2013088927 A | 5/2013 |
| JP | 2014026331 A | 2/2014 |
| JP | 2014524210 A | 9/2014 |
| JP | 2014524621 A | 9/2014 |
| JP | 2015527646 A | 9/2015 |
| JP | 2015210818 A | 11/2015 |
| JP | 2016181250 A | 10/2016 |
| JP | 2017182790 A | 10/2017 |
| JP | 2017529625 A | 10/2017 |
| KR | 100678921 B1 | 2/2007 |
| KR | 20110139739 A | 12/2011 |
| WO | 2009126941 A1 | 10/2009 |
| WO | 2014080547 A1 | 5/2014 |
| WO | 2015055035 A1 | 4/2015 |
| WO | 2019133230 A1 | 7/2019 |

OTHER PUBLICATIONS

Final Office Action from U.S. Appl. No. 15/863,748, dated Dec. 20, 2019, 19 pages.

Gladinet Inc., "CentreStack," Boca Raton, FL, May 30, 2015, Available online at https://webcache.googleusercontent.com/search?q=cache:R3ogLpu7xJYJ and https://www.gladinet.com/library/admin/index.htm+&cd=1&hl=en&ct=clnk&gl=us, visited on Feb. 8, 2018.

International Search Report and Written Opinion for PCT Application PCT/US2018/065097 dated Mar. 19, 2019, 14 pages.

International Search Report and Written Opinion for PCT Application PCT/US2018/065347 dated Apr. 2, 2019, 16 pages.

International Search Report and Written Opinion for PCT Application PCT/US2018/064659 dated Mar. 19, 2019, 13 pages.

International Search Report and Written Opinion for PCT Application PCT/US2018/064670 dated Mar. 14, 2019, 13 pages.

International Search Report and Written Opinion for PCT Application PCT/US2018/064675 dated Mar. 13, 2019, 12 pages.

International Search Report and Written Opinion for PCT Application PCT/US2018/065091 dated Mar. 21, 2019, 16 pages.

International Search Report and Written Opinion for PCT Application PCT/US2018/065100 dated Mar. 19, 2019, 11 pages.

International Search Report and Written Opinion for PCT Application PCT/US2018/065352 dated Mar. 19, 2019, 13 pages.

International Search Report and Written Opinion for PCT Application PCT/US2018/065940 dated Mar. 14, 2019, 14 pages.

International Search Report and Written Opinion for PCT Application PCT/US2018/066193 dated Mar. 14, 2019, 12 pages.

Lindholm T., et al., "A Hybrid Approach To Optimistic File System Directory Tree Synchronization," MobiDE 2005, Proceedings of 4th ACM International Workshop on Data Engineering for Wireless and Mobile Access, Jun. 12, 2005, pp. 49-56.

Lindholm T., "XML Three-way Merge as a Reconciliation Engine for Mobile Data," Proceedings of the 3rd ACM International Workshop on Data Engineering for Wireless and Mobile Access, MobiDE'03, Sep. 19, 2003, pp. 93-97.

Liu G., et al., "Source Code Revision History Visualization Tools: Do They Work and What Would It Take to Put Them to Work?," 2014 IEEE Access, Practical Innovations 1 Open Solutions, May 6, 2014, vol. 2, pp. 404-426.

Niazi S., et al., "HopsFS: Scaling Hierarchical File System Metadata Using NewSQL Databases," The 15th USENIX Conference on File and Storage Technologies (FAST 17), Feb. 22, 2017, 15 pages.

Non-Final Office Action for U.S. Appl. No. 15/868,511 dated Feb. 5, 2020, 11 pages.

Non-Final Office Action from U.S. Appl. No. 15/858,110, dated Feb. 24, 2020, 13 pages.

Non-Final Office Action from U.S. Appl. No. 15/858,125, dated Dec. 31, 2019, 12 pages.

Non-Final Office Action from U.S. Appl. No. 15/858,207, dated Jan. 22, 2020, 15 pages.

Non-Final Office Action from U.S. Appl. No. 15/858,357, dated Jan. 7, 2020, 15 pages.

Non-Final Office Action from U.S. Appl. No. 15/858,410, dated Nov. 29, 2019, 14 pages.

Non-Final Office Action from U.S. Appl. No. 15/858,430, dated Nov. 26, 2019, 10 pages.

Non-Final Office Action from U.S. Appl. No. 15/863,751, dated Nov. 6, 2019, 17 pages.

Non-Final Office Action from U.S. Appl. No. 15/867,496, dated Nov. 13, 2019, 12 pages.

Non-Final Office Action from U.S. Appl. No. 15/867,571, dated Feb. 26, 2020, 28 pages.

Non-Final Office Action from U.S. Appl. No. 15/868,505, dated Nov. 14, 2019, 7 pages.

Non-Final Office Action from U.S. Appl. No. 15/870,179, dated Oct. 7, 2019, 6 pages.

Notice of Allowance from U.S. Appl. No. 15/863,819, dated Mar. 6, 2020, 10 pages.

Notice of Allowance from U.S. Appl. No. 15/868,489, dated Dec. 27, 2019, 2 pages.

Notice of Allowance from U.S. Appl. No. 15/868,489, dated Feb. 20, 2020, 2 pages.

Notice of Allowance from U.S. Appl. No. 15/868,489, dated Jan. 24, 2020, 2 pages.

Notice of Allowance from U.S. Appl. No. 15/870,221, dated Feb. 25, 2020, 19 pages.

Notice of Allowance from U.S. Appl. No. 15/870,221, dated Jan. 17, 2020, 22 pages.

Notice of Allowance from U.S. Appl. No. 15/873,693, dated Dec. 26, 2019, 9 pages.

Notice of Allowance from U.S. Appl. No. 15/873,693, dated Jan. 30, 2020, 5 pages.

Notice of Allowance from U.S. Appl. No. 15/873,693, dated Oct. 29, 2019, 10 pages.

Phan R.C.W., et al., "Security Considerations for Incremental Hash Functions Based on Pair Block Chaining," Computers & Security, vol. 25 (2), Jan. 30, 2006, pp. 131-136.

Pollack K.T., et al., "Efficient Access Control for Distributed Hierarchical File Systems," Source: Proceedings—Twenty-second IEEE/Thirteenth NASA Goddard Conference on Mass Storage Systems and Technologies, IEEE/NASA MSST2005, Apr. 11, 2005-Apr. 14, 2005, pp. 101-108.

Requirement for Restriction/Election from U.S. Appl. No. 15/858,207, dated Sep. 26, 2019, 6 pages.

(56) References Cited

OTHER PUBLICATIONS

Requirement for Restriction/Election from U.S. Appl. No. 15/858,410, dated Sep. 19, 2019, 7 pages.
Swathy V., et al., "Providing Advanced Security Mechanism for Scalable Data Sharing in Cloud Storage," 2016 International Conference on Inventive Computation Technologies (ICICT), 2016, vol. 3, pp. 1-6.
Uploaded by Neeraj Singh, "Distributed System Answer Key," retrieved from https://www.scribd.com/doc/80052663/Distributed-System-Answer-Key, 129 pages.
Uppoor S., et al., "Cloud-based Synchronization of Distributed File System Hierarchies," 2010 IEEE International Conference on Cluster Computing Workshops and Posters (Cluster Workshops), Sep. 20, 2010, pp. 1-4.
Wang Y., et al., "X-Diff: An Effective Change Detection Algorithm for XML Documents," 2003 IEEE, Proceedings of the 19th International Conference on Data Engineering (ICDE'03), Mar. 5-8, 2003, pp. 519-530.
Advisory Action from U.S. Appl. No. 15/857,725, dated Aug. 20, 2021, 2 pages.
Advisory Action from U.S. Appl. No. 15/867,486, dated Dec. 7, 2021, 3 pages.
Article Entitled "Cgconfig Doesn't Start at Boot Time", by Redhat, dated Sep. 9, 2015, 2 pages.
D'Silva A., "Undo Delete vs Confirm Delete," Oct. 2, 2017, https://medium.com/@randomlies/undo-delete-vs-confirm-delete-31b04104c4a6, pp. 1-3.
Final Office Action from U.S. Appl. No. 15/857,725, dated Jun. 1, 2021, 14 pages.
Final Office Action from U.S. Appl. No. 15/857,789, dated Nov. 3, 2021, 17 pages.
Kotha R., "Fusion Middleware Language Reference for Oracle Business Process Management," Oracle Fusion Middleware, Jan. 2011, 28 pages.
Non-Final Office Action from U.S. Appl. No. 15/857,725, dated Nov. 15, 2021, 13 pages.
Non-Final Office Action from U.S. Appl. No. 15/857,729, dated May 7, 2021, 17 pages.
Non-Final Office Action from U.S. Appl. No. 15/857,732, dated Aug. 6, 2021, 32 pages.
Non-Final Office Action from U.S. Appl. No. 15/857,772, dated Apr. 20, 2021, 17 pages.
Non-Final Office Action from U.S. Appl. No. 15/857,779, dated Jul. 21, 2021, 24 pages.
Non-Final Office Action from U.S. Appl. No. 15/857,789, dated Jun. 15, 2021, 18 pages.
Non-Final Office Action from U.S. Appl. No. 16/908,186, dated Oct. 4, 2021, 7 pages.
Non-Final Office Action from U.S. Appl. No. 16/991,822, dated Dec. 8, 2021, 27 pages.
Notice of Acceptance for Australian Application No. 2018393933, dated on Sep. 23, 2021, 3 pages.
Notice of Acceptance for Australian Application No. 2018395856, dated on Aug. 27, 2021, 3 pages.
Notice of Allowance from U.S. Appl. No. 15/857,713, dated Oct. 1, 2021, 10 pages.
Notice of Allowance from U.S. Appl. No. 15/857,713, dated Oct. 19, 2021, 6 pages.
Notice of Allowance from U.S. Appl. No. 15/857,729, dated Oct. 4, 2021, 13 pages.
Notice of Allowance from U.S. Appl. No. 15/857,729, dated Oct. 25, 2021, 12 pages.
Notice of Allowance from U.S. Appl. No. 15/857,772, dated Sep. 15, 2021, 12 pages.
Notice of Allowance from U.S. Appl. No. 15/857,772, dated Sep. 27, 2021, 2 pages.
Notice of Allowance from U.S. Appl. No. 16/026,531, dated Apr. 6, 2021, 2 pages.
Notice of Reasons for Refusal for Japanese Application No. 2020-521435, dated Aug. 6, 2021, 20 pages.
Office Action for Canadian Application No. 3078982 dated Jun. 1, 2021, 3 pages.
Office Action for Canadian Application No. 3083530 dated Jul. 7, 2021, 4 pages.
Office Action for Canadian Application No. 3084312 dated Aug. 11, 2021, 5 pages.
Office Action for Canadian Application No. 3085998, dated Aug. 12, 2021, 4 pages.
Office Action For Japanese Application No. 2020-526431, dated Sep. 10, 2021, 9 pages.
Office Action For Japanese Application No. 2020-529314, dated Aug. 20, 2021, 11 pages.
Office Action for Japanese Application No. 2020-529761 dated Aug. 20, 2021, 20 pages.
Office Action For Japanese Application No. 2020-531088, dated Aug. 6, 2021, 7 pages.
Office Action For Japanese Application No. 2020-531974, dated Sep. 3, 2021, 9 pages.
Office Action For Japanese Application No. 2020-535976, dated Sep. 10, 2021, 11 pages.
Office Action For Japanese Application No. 2020-536083, dated Sep. 24, 2021, 13 pages.
Office Action for Korean Application No. 10-2020-7013685, dated Nov. 12, 2021, 11 pages.
Office Action for Korean Application No. 10-2020-7014986, dated Nov. 24, 2021, 11 pages.
Office Action for Korean Application No. 10-2020-7015491, dated Nov. 24, 2021, 13 pages.
Tran T.T.G., et al., "Virtualization at File System Level: A New Approach to Secure Data in Shared Environment", International Journal of Computer Theory and Engineering, vol. 8, No. 3, Jun. 2016, pp. 223-228.
Windows 7, "DOS/V Power Report," 2010, vol. 20, No. 1, The plaintiff's knowledge of **, Windows 7, which was examined thoroughly! Windows 7, which was found to be used by Windows, Inc, 7 pages.
Communication Pursuant to Article 94(3) EPC for European Application No. 18830580.9 dated Jan. 14, 2021, 9 pages.
Communication Pursuant to Article 94(3) EPC for European Application No. 18836962.3 dated Jan. 14, 2020, 5 pages.
Notice of Allowance from U.S. Appl. No. 15/858,110, dated Jan. 6, 2021, 2 pages.
Notice of Allowance from U.S. Appl. No. 15/858,192, dated Jan. 27, 2021, 9 pages.
Notice of Allowance from U.S. Appl. No. 15/863,815, dated Jan. 21, 2021, 12 pages.
Notice of Allowance from U.S. Appl. No. 15/867,571, dated Jan. 19, 2021, 1 pages.
Notice of Allowance from U.S. Appl. No. 15/868,511, dated Jan. 25, 2021, 7 pages.
Notice of Allowance from U.S. Appl. No. 15/858,357, dated May 26, 2020, 22 pages.
Notice of Allowance from U.S. Appl. No. 15/858,410, dated May 22, 2020, 18 pages.
Notice of Allowance from U.S. Appl. No. 15/867,496, dated May 28, 2020, 10 pages.
Final Office Action from U.S. Appl. No. 15/858,430, dated Jun. 12, 2020, 11 pages.
Non-Final Office Action from U.S. Appl. No. 15/858,192, dated Jun. 12, 2020, 13 pages.
Notice of Allowance from U.S. Appl. No. 15/870,179, dated Jun. 11, 2020, 7 pages.
Chiang J.K., et al., "Authentication, Authorization And File Synchronization On Hybrid Cloud—On Case of Google Docs, Hadoop, and Linux Local Hosts", IEEE, Jul. 2-5, 2013, pp. 116-123.
Communication under Rule 94(3) EPC for European Application No. 18839962.0 dated Oct. 26, 2020, 9 pages.
Examination Report for Australian Application No. 2018395933 dated Sep. 30, 2020, 4 pages.
Examination Report No. 1, for Australian Application No. 2018395856, dated Dec. 14, 2020, 4 pages.
Examination Report No. 1, for Australian Application No. 2018395919, dated Dec. 22, 2020, 5 pages.

(56) References Cited

OTHER PUBLICATIONS

Examination Report No. 1, for Australian Application No. 2018397604, dated Dec. 22, 2020, 3 pages.
Final Office Action from U.S. Appl. No. 15/863,751, dated Dec. 16, 2020, 19 pages.
Final Office Action from U.S. Appl. No. 15/867,486, dated Nov. 3, 2020, 38 pages.
Kher V., et al., "Securing Distributed Storage: Challenges, Techniques, and Systems," ACM, Nov. 2005, pp. 9-25.
Marshall C.C., et al., "Supporting Research Collaboration through Bi-Level File Synchronization," ACM, Oct. 2012, pp. 165-174.
Non-Final Office Action from U.S. Appl. No. 15/857,713, dated Nov. 25, 2020, 28 pages.
Non-Final Office Action from U.S. Appl. No. 15/858,430, dated Oct. 6, 2020, 11 pages.
Non-Final Office Action from U.S. Appl. No. 15/867,612, dated Dec. 8, 2020, 17 pages.
Notice of Allowance from U.S. Appl. No. 15/858,110, dated Dec. 11, 2020, 10 pages.
Notice of Allowance from U.S. Appl. No. 15/858,125, dated Nov. 3, 2020, 17 pages.
Notice of Allowance from U.S. Appl. No. 15/858,146, dated Nov. 17, 2020, 10 pages.
Notice of Allowance from U.S. Appl. No. 15/867,571, dated Dec. 10, 2020, 16 pages.
Wang H., et al., "On the Impact of Virtualization on Dropbox-like Cloud File Storage/Synchronization Services," IEEE, Jun. 1-5, 2012, pp. 1-9.
Final Office Action from U.S. Appl. No. 15/858,125, dated Jun. 26, 2020, 15 pages.
Final Office Action from U.S. Appl. No. 15/858,207, dated Jul. 2, 2020, 16 pages.
Kappes G., et al., "Virtualization-aware Access Control for Multitenant Filesystems," MSST 2014, Jun. 2-6, 2014, pp. 1-6.
Mell P M., et al., "Linear Time Algorithms to Restrict Insider Access using Multi-Policy Access Control Systems," Apr. 2013, retrieved from https://www.nist.gov/publications/linear-time-algorithms-restrict-insider-access-using-multi-policy-access-control, on Dec. 31, 2019, 2 Pages.
Non-Final Office Action from U.S. Appl. No. 15/857,713, dated Jan. 7, 2020, 16 pages.
Non-Final Office Action from U.S. Appl. No. 15/863,751, dated Jul. 7, 2020, 16 pages.
Wolff D, "A Web-Based Tool for Managing the Submission of Student Work," Journal of Computing Sciences in Colleges, Dec. 2004, vol. 20 (2), pp. 144-153.
Final Office Action from U.S. Appl. No. 15/857,713, dated Jul. 16, 2020, 22 pages.
Final Office Action from U.S. Appl. No. 15/867,571, dated Sep. 3, 2020, 34 pages.
Final Office Action from U.S. Appl. No. 15/867,612, dated Sep. 28, 2020, 16 pages.
Final Office Action from U.S. Appl. No. 15/868,511, dated Jul. 14, 2020, 10 pages.
Non-Final Office Action from U.S. Appl. No. 15/858,207, dated Sep. 30, 2020, 20 pages.
Non-Final Office Action from U.S. Appl. No. 15/863,748, dated Aug. 18, 2020, 25 pages.
Non-Final Office Action from U.S. Appl. No. 15/867,505, dated Aug. 19, 2020, 21 pages.
Notice of Allowance from U.S. Appl. No. 15/858,110, dated Sep. 3, 2020, 11 pages.
Notice of Allowance from U.S. Appl. No. 15/858,125, dated Sep. 9, 2020, 17 pages.
Notice of Allowance from U.S. Appl. No. 15/858,146, dated Sep. 10, 2020, 9 pages.
Notice of Allowance from U.S. Appl. No. 15/858,357, dated Aug. 18, 2020, 12 pages.
Notice of Allowance from U.S. Appl. No. 15/858,410, dated Jul. 14, 2020, 12 pages.
Notice of Allowance from U.S. Appl. No. 15/863,815, dated Sep. 30, 2020, 13 pages.
Notice of Allowance from U.S. Appl. No. 15/868,505, dated Jul. 15, 2020, 8 pages.
Notice of Allowance from U.S. Appl. No. 15/868,511, dated Sep. 16, 2020, 9 pages.
Notice of Allowance from U.S. Appl. No. 15/870,179, dated Aug. 12, 2020, 7 pages.
Examination Report No. 1, for Australian Application No. 2018395858, dated Feb. 5, 2021, 4 pages.
Examination Report No. 1 for Australian Application No. 2018397572 dated Feb. 8, 2021, 5 pages.
Examination Report No. 1 for Australian Application No. 2018395920 dated Oct. 16, 2020, 4 pages.
Final Office Action from U.S. Appl. No. 15/863,748, dated Feb. 5, 2021, 24 pages.
Final Office Action from U.S. Appl. No. 15/867,505, dated Feb. 8, 2021, 25 pages.
Non-Final Office Action from U.S. Appl. No. 15/867,486, dated Feb. 5, 2021, 37 pages.
Final Office Action from U.S. Appl. No. 15/863,751, dated Mar. 24, 2020, 16 pages.
Non-Final Office Action from U.S. Appl. No. 15/858,146, dated Apr. 1, 2020, 23 pages.
Non-Final Office Action from U.S. Appl. No. 15/863,815, dated Mar. 18, 2020, 17 pages.
Non-Final Office Action from U.S. Appl. No. 15/867,486, dated Apr. 3, 2020, 36 pages.
Non-Final Office Action from U.S. Appl. No. 15/867,612, dated Apr. 3, 2020, 14 pages.
Notice of Allowance from U.S. Appl. No. 15/863,819, dated Apr. 7, 2020, 8 pages.
Communication pursuant to Article 94(3) EPC for European Application No. 18829647.9 dated Dec. 9, 2021, 7 pages.
Non-Final Office Action from U.S. Appl. No. 16/991,798, dated Jan. 6, 2022, 20 pages.
Non-Final Office Action from U.S. Appl. No. 16/935,995, dated Feb. 9, 2022, 15 pages.
Notice of Allowance from U.S. Appl. No. 15/857,732, dated Jan. 31, 2022, 6 pages.
Notice of Allowance from U.S. Appl. No. 16/897,884, dated Feb. 7, 2022, 17 pages.
Notice of Allowance from U.S. Appl. No. 16/897,884, dated Feb. 16, 2022, 14 pages.
Notice of Allowance from U.S. Appl. No. 16/908,186, dated Feb. 17, 2022, 7 pages.
Notice of Preliminary Rejection for Korean Application No. 10-2020-7018226 dated Jan. 20, 2022, 8 pages.
Notice of Preliminary Rejection for Korean Application No. 10-2020-7018240 dated Jan. 14, 2022, 10 pages.
Notice of Preliminary Rejection for Korean Application No. 10-2020-7018403 dated Jan. 20, 2022, 4 pages.
Office Action for Korean Application No. 10-2020-7018242 dated Jan. 3, 2022, 13 pages.
Search Query Report from IP.com (performed Jan. 7, 2022), 5 pages.
Examination Report No. 2, for Australian Application No. 2018393933, dated Jul. 23, 2021, 3 pages.
Final Office Action from U.S. Appl. No. 15/867,486, dated Aug. 9, 2021, 35 pages.
Notice of Allowance from U.S. Appl. No. 15/863,748, dated Aug. 11, 2021, 2 pages.
Office Action for Canadian Application No. 3084056 dated Jul. 7, 2021, 4 pages.
Office Action for Canadian Application No. 3084060 dated Jul. 28, 2021, 3 pages.
Office Action for Canadian Application No. 3086004 dated Jul. 9, 2021, 4 pages.
Office Action for Canadian Application No. 3087087 dated Jul. 14, 2021, 4 pages.
Communication Pursuant to Article 94(3) EPC for European Application No. 18837007.6 dated Nov. 25, 2021, 9 pages.

(56) References Cited

OTHER PUBLICATIONS

Final Office Action from U.S. Appl. No. 15/858,430, dated Dec. 29, 2021, 12 pages.
Final Office Action from U.S. Appl. No. 16/887,714, dated Dec. 13, 2021, 52 pages.
Notice of Allowance from U.S. Appl. No. 15/857,732, dated Jan. 4, 2022, 9 pages.
Notice of Preliminary Rejection for Korean Application No. 10-2020-7016022 dated Dec. 15, 2021, 12 pages.
Notice of Preliminary Rejection for Korean Application No. 10-2020-7016208 dated Dec. 17, 2021, 6 pages.
Office Action for Korean Application No. 10-2020-7016617, dated Dec. 17, 2021, 10 pages.
"Active Directory Architecture", retrieved from https://technet.microsoft.com/en-us/library/bb727030.aspx, 2017, pp. 1-39.
Advisory Action from U.S. Appl. No. 15/857,772, dated Feb. 9, 2021, 4 pages.
Advisory Action from U.S. Appl. No. 15/867,505, dated Apr. 2, 2021, 4 pages.
Advisory Action from U.S. Appl. No. 15/857,772, dated Jun. 12, 2020, 3 pages.
Biztalkserver, "Optimizing Business Rule Engine (BRE) Performance," Jun. 7, 2017, retrieved from https://docs.microsoft.com/en-us/biztalk/technical-guides/optimizing-business-rule-engine-bre-performance, on Oct. 22, 2019, 5 Pages.
Capra R., et al., "File Synchronization and Sharing: User Practices and Challenges", 77th ASIS&T Annual Meeting, Seattle, WA, Oct. 31-Nov. 5, 2014, 10 pages.
Chris G., "Dropbox for Business 3.0", retrieved from www.chrismgrant.com/product-design/dropbox-for-business, 2018, pp. 1-98.
Clercq J D., "How to Use the Bypass Traverse Checking User Right," Aug. 27, 2008, ITProToday, https://www.itprotoday.com/print/20355, 2 pages.
Examination Report No. 1, for Australian Application No. 2018393933, dated Mar. 9, 2021, 4 pages.
Examination Report No. 1, for Australian Application No. 2018395857, dated Mar. 9, 2021, 5 pages.
Examination Report No. 1, for Australian Application No. 2018397571, dated Mar. 4, 2021, 4 pages.
Examination Report No. 2, for Australian Application No. 2018395856, dated Mar. 18, 2021, 4 pages.
Examination Report No. 2, for Australian Application No. 2018397571, dated Mar. 30, 2021, 4 pages.
Examination Report No. 2, for Australian Application No. 2018395919, dated May 3, 2021, 3 pages.
Final Office Action from U.S. Appl. No. 15/857,588, dated Aug. 3, 2020, 16 pages.
Final Office Action from U.S. Appl. No. 15/857,713, dated Apr. 7, 2021, 22 pages.
Final Office Action from U.S. Appl. No. 15/857,725, dated Oct. 26, 2020, 14 pages.
Final Office Action from U.S. Appl. No. 15/857,729, dated Dec. 7, 2020, 15 pages.
Final Office Action from U.S. Appl. No. 15/857,729, dated Mar. 11, 2020, 16 pages.
Final Office Action from U.S. Appl. No. 15/857,732, dated Feb. 26, 2021, 35 pages.
Final Office Action from U.S. Appl. No. 15/857,732, dated May 1, 2020, 26 pages.
Final Office Action from U.S. Appl. No. 15/857,772, dated Mar. 26, 2020, 12 pages.
Final Office Action from U.S. Appl. No. 15/857,772, dated Nov. 12, 2020, 18 pages.
Final Office Action from U.S. Appl. No. 15/857,779, dated Jun. 17, 2020, 25 pages.
Final Office Action from U.S. Appl. No. 15/857,779, dated Mar. 2, 2021, 26 pages.
Final Office Action from U.S. Appl. No. 15/857,784, dated Apr. 3, 2020, 18 pages.
Final Office Action from U.S. Appl. No. 15/857,784, dated Oct. 30, 2020, 20 pages.
Final Office Action from U.S. Appl. No. 15/857,789, dated Feb. 24, 2021, 21 pages.
Final Office Action from U.S. Appl. No. 15/857,789, dated Jun. 5, 2020, 15 pages.
Final Office Action from U.S. Appl. No. 15/858,430, dated Apr. 15, 2021, 12 pages.
"Give Access to a Subdirectory Without Giving Access to Parent Directories," Dec. 17, 2012, superuser, https://superuser.com/questions/520537/give-access-to-a-subdirectory-without-giving-access-to-parent-directories, 5 pages.
Grunbacher., et al., "POSIX Access Control Lists on Linux," Usenix, https://www.usenix.org/legacy/publications/library/proceedings/usenix03/tech/freenix03/full_papers/gruenbacher/gruenbacher_html/main.html, Apr. 4, 2003, pp. 1-23.
"How to Create Home Folders for User Accounts", retrieved from https://www.manageengine.com/products/ad-manager/admanager-kb/create-home-folders-for-user-accounts.html 2015, pp. 1-5.
Karjoth G., et al., "Implementing ACL-based Policies in XACML," 2008, Annual Computer Security Applications Conference, 10 pages.
King E., "Linux Namespaces," https://medium.eom/@teddyking/linux-namespaces-850489d3ccf, Dec. 10, 2016, 3 pages.
Klein H., "Puzzle: Delete Directory Content Without Deleting the Directory Itself (on the Command Line)", retrieved from https://helgeklein.com/blog/author/helge/, on Aug. 5, 2009, pp. 1-11.
Kuo Y H., et al., "A Hybrid Cloud Storage Architecture for Service Operational High Availability", COMPSACW, Jul. 2013, pp. 487-492.
linux.org., "Mount a File System," retrieved from https://www.linux.org/docs/man8/mount.html, Jan. 2012, pp. 1-17.
Microsoft Outlook, "Cannot Copy this Folder because it may Contain Private Items," Feb. 23, 2015, retrieved from http://techy-wire.blogspot.com/2015/02/cannot-copy-this-folder-because-it-may.html, 3 pages.
Non-Final Office Action from U.S. Appl. No. 15/857,588, dated Apr. 2, 2020, 14 pages.
Non-Final Office Action from U.S. Appl. No. 15/857,715, dated Feb. 20, 2020, 8 pages.
Non-Final Office Action from U.S. Appl. No. 15/857,725, dated Feb. 25, 2021, 14 pages.
Non-Final Office Action from U.S. Appl. No. 15/857,725, dated Jan. 2, 2020, 10 pages.
Non-Final Office Action from U.S. Appl. No. 15/857,725, dated Jun. 18, 2020, 13 pages.
Non-Final Office Action from U.S. Appl. No. 15/857,729, dated Jul. 21, 2020, 15 pages.
Non-Final Office Action from U.S. Appl. No. 15/857,729, dated Nov. 20, 2019, 12 pages.
Non-Final Office Action from U.S. Appl. No. 15/857,732, dated Dec. 27, 2019, 29 pages.
Non-Final Office Action from U.S. Appl. No. 15/857,732, dated Sep. 17, 2020, 29 pages.
Non-Final Office Action from U.S. Appl. No. 15/857,766, dated Oct. 31, 2019, 27 pages.
Non-Final Office Action from U.S. Appl. No. 15/857,772, dated Jul. 23, 2020, 16 pages.
Non-Final Office Action from U.S. Appl. No. 15/857,772, dated Nov. 25, 2019, 11 pages.
Non-Final Office Action from U.S. Appl. No. 15/857,779, dated Jan. 17, 2020, 17 pages.
Non-Final Office Action from U.S. Appl. No. 15/857,779, dated Oct. 15, 2020, 23 pages.
Non-Final Office Action from U.S. Appl. No. 15/857,784, dated Dec. 19, 2019, 18 pages.
Non-Final Office Action from U.S. Appl. No. 15/857,784, dated Jul. 24, 2020, 19 pages.
Non-Final Office Action from U.S. Appl. No. 15/857,789, dated Jan. 22, 2020, 15 pages.
Non-Final Office Action from U.S. Appl. No. 15/857,789, dated Sep. 29, 2020, 19 pages.
Non-Final Office Action from U.S. Appl. No. 16/026,531, dated Jul. 27, 2020, 22 pages.

(56) References Cited

OTHER PUBLICATIONS

Non-Final Office Action from U.S. Appl. No. 16/118,514, dated Nov. 27, 2019, 13 pages.
Notice of Allowance from U.S. Appl. No. 15/857,715, dated Aug. 7, 2020, 5 pages.
Notice of Acceptance for Australian Application No. 2018395920 dated Apr. 27, 2021, 3 pages.
Notice of Allowance from U.S. Appl. No. 15/857,588, dated Oct. 7, 2020, 10 pages.
Notice of Allowance from U.S. Appl. No. 15/857,766, dated Apr. 7, 2020, 19 pages.
Notice of Allowance from U.S. Appl. No. 15/857,766, dated Mar. 10, 2020, 20 pages.
Notice of Allowance from U.S. Appl. No. 15/857,784, dated Dec. 30, 2020, 15 pages.
Notice of Allowance from U.S. Appl. No. 15/858,192, dated Apr. 8, 2021, 10 pages.
Notice of Allowance from U.S. Appl. No. 15/858,207, dated Mar. 24, 2021, 17 pages.
Notice of Allowance from U.S. Appl. No. 15/863,751, dated Apr. 15, 2021, 2 pages.
Notice of Allowance from U.S. Appl. No. 15/863,751, dated Mar. 24, 2021, 8 pages.
Notice of Allowance from U.S. Appl. No. 15/867,505, dated Apr. 28, 2021, 14 pages.
Notice of Allowance from U.S. Appl. No. 15/867,612, dated Mar. 11, 2021, 5 pages.
Notice of Allowance from U.S. Appl. No. 16/026,531, dated Jan. 29, 2021, 9 pages.
Notice of Allowance from U.S. Appl. No. 16/118,514, dated Apr. 8, 2020, 17 pages.
Notice of Allowance from U.S. Appl. No. 16/118,514, dated May 20, 2020, 11 pages.
NTFS, "File and Folder Basic NTFS Permissions," Dec. 7, 2016, retrieved from http://www.ntfs.com/ntfs-permissions-file-folder.htm, on Jan. 14, 2020, 9 Pages.
Prusty N., et al., "UNIX File System Permissions Tutorial," retrieved from URL: http://qnimate.com/understanding-unix-filesystem-permissions/, 2014-2015, 8 pages.
Requirement for Restriction/Election from U.S. Appl. No. 15/857,588, dated Jan. 29, 2020, 6 pages.
Rubyrailsguide, "Active Record Callbacks," Nov. 18, 2016, retrieved from https://web.archive.org/web/20161118225731/http://guides.rubyonrails.org/active_record_callbacks.html, on Dec. 13, 2019, 11 Pages.
Search Query Report from IP.com (performed Feb. 25, 2020).
Search Query Report from Ip.com (performed Mar. 27, 2020).
Shields I., et al., "Learn Linux, 101: Manage File Permissions and Ownership," https://developer.ibm.com/technologies/linux/tutorials/l-lpic1-104-5/, Jan. 27, 2016, 21 pages.
Ucar, "Setting file and directory permissions," Sep. 2017, retrieved from https://web.archive.org/web/20170920093821/https://www2.cisl.ucar.edu/user-support/setting-file-and-directory-permissions, on Dec. 8, 2019, 5 Pages.
UNIX & Linux Stack Exchange, "Execute vs Read Bit. How do Directory Permissions in Linux Work?", Dec. 15, 2016, retrieved from https://unix.stackexchange.com/questions/21251/execute-vs-read-bit-how-do-directory-permissions-in-linux-work, on Mar. 20, 2020, 3 pages.
Communication Pursuant to Article 94(3) EPC for European Application No. 18834121.8 dated Apr. 28, 2021, 10 pages.
Communication Pursuant to Article 94(3) EPC for European Application No. 18836317.0 dated Feb. 23, 2021, 9 pages.
Notice of Allowance from U.S. Appl. No. 15/858,207, dated May 25, 2021, 2 pages.
Notice of Allowance from U.S. Appl. No. 15/863,748, dated Jun. 15, 2021, 9 pages.
Notice of Allowance from U.S. Appl. No. 15/867,505, dated May 5, 2021, 10 pages.
Tridgell A.,., et al., "rsync," edited on Nov. 24, 2017, retrieved from https://en.wikipedia.org/wikipedia.org/w/index.php?title=Rsync&oldid=811846440#cite_note-pool-25, on Apr. 20, 2021, 7 pages.
Tridgell A., "rsync(1)," XP055032454, retrieved from http://sunsite.ualberta.ca/Documentation/Misc/rsync-2.6.6/rsync.1.html, Jul. 28, 2005, 33 pages.
Communication pursuant to Article 94(3) EPC for EP Application No. 18833555.8, dated Jun. 8, 2021, 6 pages.
Daudjee K., et al., Article entitled "Inferring a Serialization Order for Distributed Transactions", 2006, 3 pages.
Examination Report No. 3, for Australian Application No. 2018395856, dated Jul. 2, 2021, 3 pages.
Non-Final Office Action from U.S. Appl. No. 15/858,430, dated Jun. 24, 2021, 11 pages.
Non-Final Office Action from U.S. Appl. No. 16/887,714, dated Jun. 28, 2021, 63 pages.
Notice of acceptance for Australian Application No. 2018395857, dated Jul. 20, 2021, 3 pages.
Notice of Acceptance for Australian Application No. 2018395858 dated Jul. 7, 2021, 3 pages.
Notice of acceptance for Australian Application No. 2018395919, dated Jul. 21, 2021, 3 pages.
Notice of Acceptance for Australian Application No. 2018397572 dated Jul. 14, 2021, 3 pages.
Notice of Allowance from U.S. Appl. No. 15/867,505, dated Jun. 28, 2021, 5 pages.
Notice of Reason for Refusal for Japanese Application No. 2020529752 dated Jun. 21, 2021, 13 pages.
Office Action for Canada Application No. 3,081,372 dated Jun. 7, 2021, 4 pages.
Office Action for Canadian Application No. 3082925 dated Jun. 16, 2021, 4 pages.
Advisory Action from U.S. Appl. No. 15/863,748, dated Apr. 15, 2020, 3 pages.
Final Office Action from U.S. Appl. No. 15/867,496, dated Apr. 10, 2020, 14 pages.
Final Office Action from U.S. Appl. No. 15/870,179, dated Apr. 16, 2020, 6 pages.
Non-Final Office Action from U.S. Appl. No. 15/868,505, dated Apr. 13, 2020, 12 pages.
Notice of Allowance from U.S. Appl. No. 15/870,221, dated Apr. 10, 2020, 19 pages.
Communication Pursuant to Article 71(3) EPC for European Application No. 18829647.9 dated Aug. 25, 2022, 133 pages.
Final Office Action from U.S. Appl. No. 16/935,995, dated Aug. 25, 2022, 11 pages.
Notice of Allowance from U.S. Appl. No. 16/887,714, dated Jul. 29, 2022, 8 pages.
Office Action for Canadian Application No. 3078982 dated Aug. 19, 2022, 6 pages.
Office Action for Canadian Application No. 3084056 dated Aug. 15, 2022, 4 pages.
Summons to Attend Oral Proceedings Pursuant to Rule 115(1) EPC for European Application No. 18836962.3 dated Jul. 6, 2022, 8 pages.
Communication Pursuant to Article 94(3) EPC for European Application No. 18834121.8 dated Feb. 9, 2022, 8 pages.
Communication Pursuant to Article 94(3) EPC for European Application No. 18839958.8 dated Feb. 22, 2022, 10 pages.
Communication Pursuant to Article 94(3) EPC for European Application No. 18840109.5 dated Feb. 23, 2022, 9 pages.
Decision of Refusal for Japanese Application No. 2020-521435 dated Feb. 25, 2022, 6 pages.
Decision of Refusal for Japanese Application No. 2020-531974 dated Apr. 8, 2022, 7 pages.
Examination Report No. 1 for Australian Application No. 2021203706 dated Mar. 31, 2022, 2 pages.
Final Office Action from U.S. Appl. No. 16/991,822, dated Jun. 13, 2022, 29 pages.
Final Office Action from U.S. Appl. No. 15/857,725, dated Apr. 6, 2022, 13 pages.
Final Office Action from U.S. Appl. No. 16/991,798, dated Jun. 24, 2022, 19 pages.

(56) References Cited

OTHER PUBLICATIONS

Non-Final Office Action from U.S. Appl. No. 17/076,538, dated Jun. 29, 2022, 19 pages.
Non-Final Office Action from U.S. Appl. No. 15/857,789, dated Mar. 14, 2022, 18 pages.
Non-Final Office Action from U.S. Appl. No. 15/867,486, dated Mar. 14, 2022, 55 pages.
Non-Final Office Action from U.S. Appl. No. 17/136,849, dated Jun. 1, 2022, 12 pages.
Non-Final Office Action from U.S. Appl. No. 17/204,208, dated Mar. 29, 2022, 24 pages.
Notice of Allowance from U.S. Appl. No. 15/857,732, dated Mar. 17, 2022, 6 pages.
Notice of Allowance from U.S. Appl. No. 15/858,430, dated Jun. 10, 2022, 2 pages.
Notice of Allowance from U.S. Appl. No. 15/858,430, dated May 12, 2022, 9 pages.
Notice of Allowance from U.S. Appl. No. 16/887,714, dated Apr. 28, 2022, 11 pages.
Notice of Allowance from U.S. Appl. No. 16/887,714, dated Jun. 2, 2022, 7 pages.
Notice of Allowance from U.S. Appl. No. 16/887,714, dated May 16, 2022, 11 pages.
Notice of Allowance from U.S. Appl. No. 16/908,186, dated Jun. 2, 2022, 7 pages.
Notice of Allowance from U.S. Appl. No. 17/077,719, dated Apr. 28, 2022, 13 pages.
Notice of Allowance from U.S. Appl. No. 15/857,779, dated Mar. 2, 2022, 9 pages.
Notice of Allowance from U.S. Appl. No. 15/858,430, dated Jul. 20, 2022, 2 pages.
Office Action for Canadian Application No. 3,084,312 dated Apr. 8, 2022, 3 pages.
Summons to Attend Oral Proceedings Pursuant to Rule 115(1) EPC for European Application No. 18830580.9, mailed on Mar. 24, 2022, 10 pages.
Summons to attend oral proceedings pursuant to Rule 115(1) EPC for European Application No. 18836317.0 mailed on Jun. 21, 2022, 15 pages.
Summons to Attend Oral Proceedings Pursuant to Rule 115(1) EPC for European Application No. 18839962.0 mailed on Feb. 22, 2022, 9 pages.
"What the Difference Between Remount to Umount/Mount?", https://unix.stackexchange.com/questions/404006/what-the-difference-between-remount-to-umount-mount, Nov. 2017, pp. 1-3.
Decision of Refusal for Japanese Application No. 2020-536083 dated Aug. 12, 2022, 14 pages.
Office Action for Canadian Application No. 3085998, dated Sep. 7, 2022, 6 pages.

\* cited by examiner

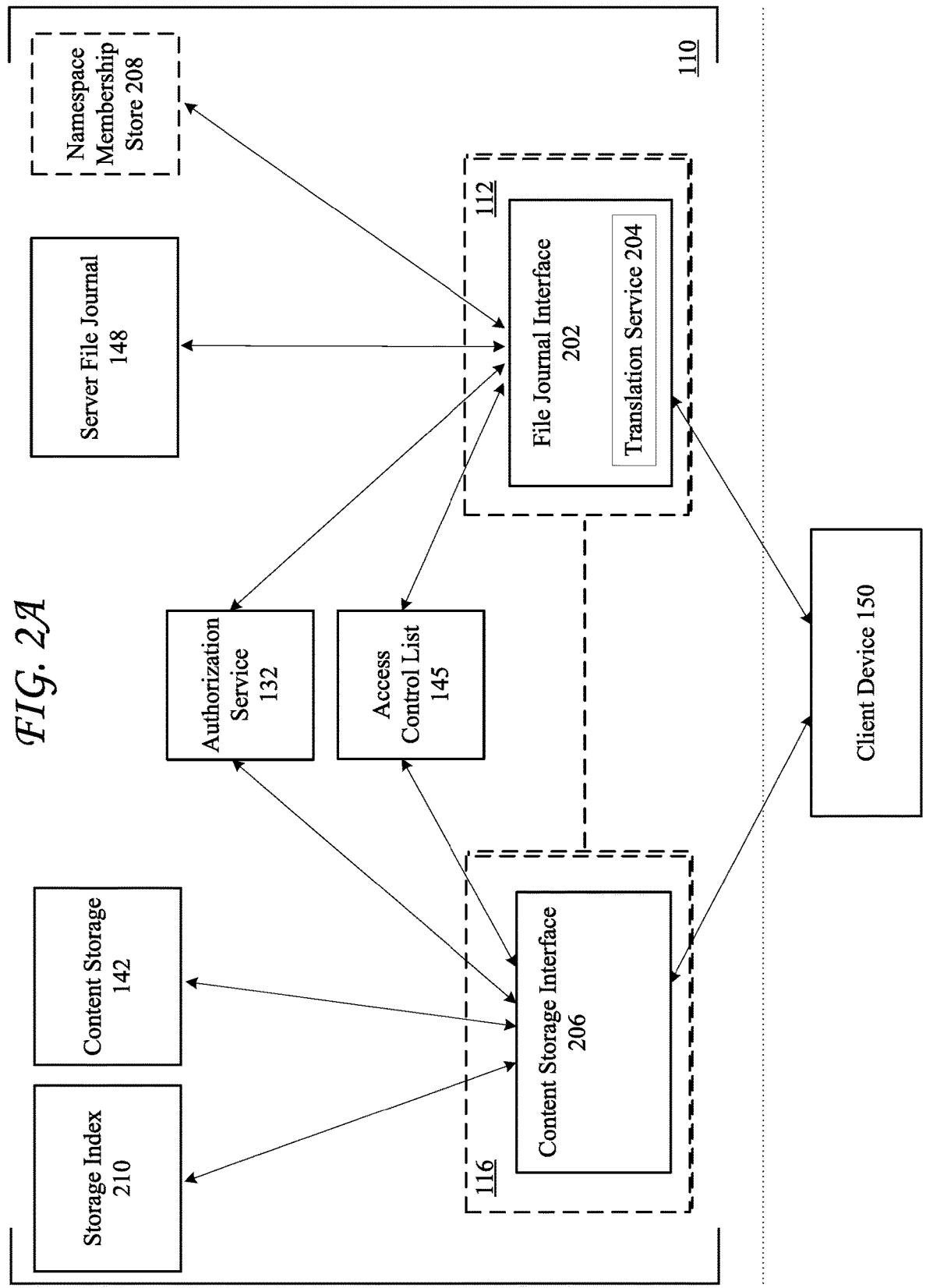

From Mount Table:

| mounts for ns=directory |
|---|
| directory/user_1 |
| directory/design |
| directory/user_handbook |
| directory/finance |
| directory/marketing |

From Namespace View Builder:

| ns=user_1 |
|---|
| paths= |
| user_1/shared_with_user_Z |
| user_1/unshared.tx |
| user_1/ |

User_1's View
530

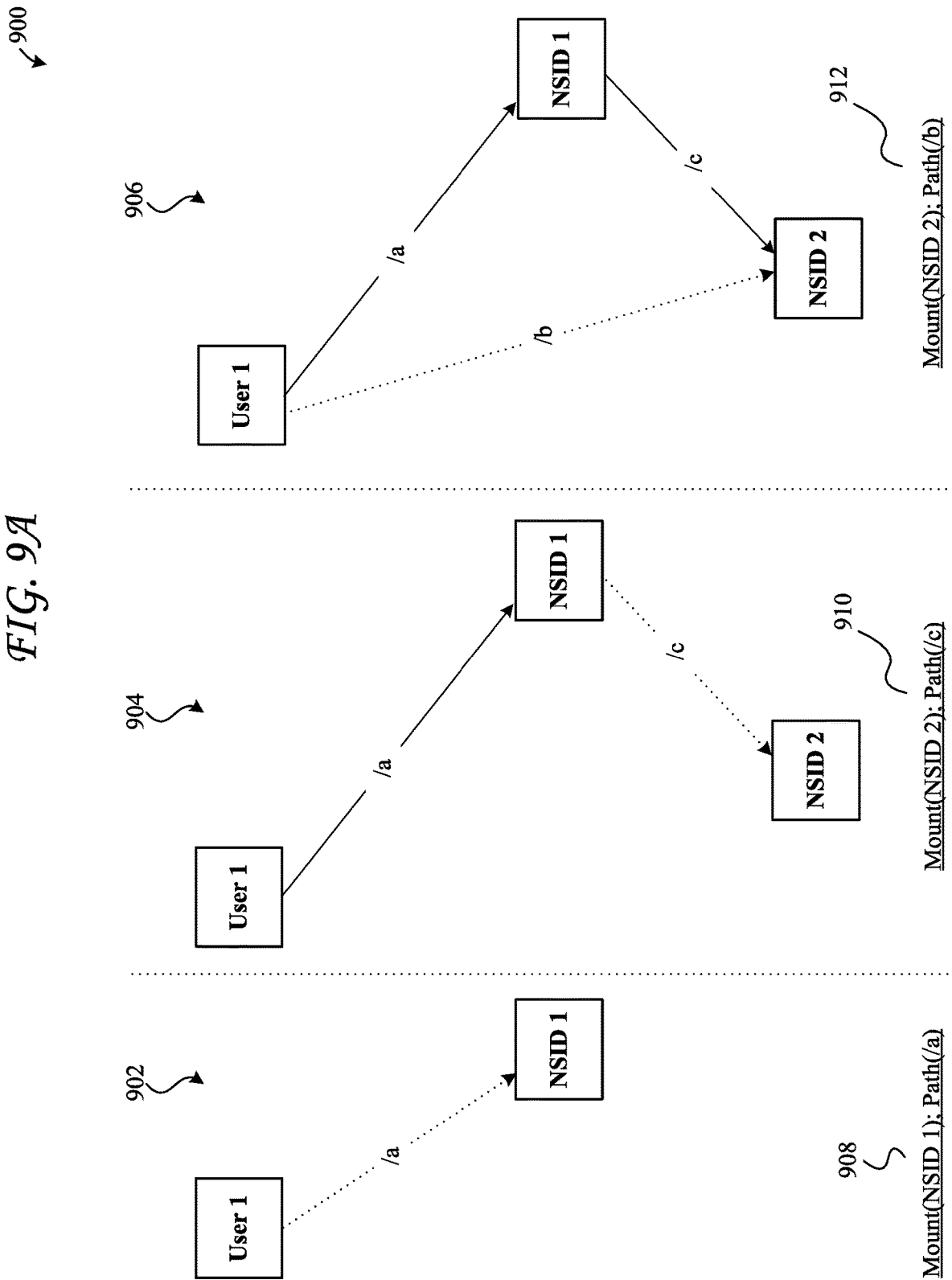

NSID 1

| OPERATION | CLOCK |
|---|---|
| Mount(/a, NS1) | 1 |

908 — 934

NSID 2

| OPERATION | CLOCK |
|---|---|
| Mount(/c, NS2) | 0 |
| Unmount(/c, NS2) | 1 |
| Mount(/b, NS2) | 2 |

| NSID | OPERATIONS | CURSOR |
|---|---|---|
| 1 | Mount(/a, NS1) | {1:1} |
| 2 | Mount(/c, NS2) | {1:1, 2:0} |
| 2 | Unmount(/c, NS1) | {1:1, 2:1} |
| 2 | Mount(/b, NS1) | {1:1, 2:2} |

SERVER FILE JOURNAL 148

1102 — JOURNAL RECORDS
- NSID
- SJID
- CLOCK
- OPERATION
- MOVE_ID
- . . .

1104A — INCOMING MOVES
- MOVE_ID
- OPERATION
- SOURCE_NSID
- DESTINATION_NSID
- DESTINATION_PATH_HASH
- DESTINATION_PATH
- STATE
- START_CLOCK
- END_CLOCK
- . . .

1104B — OUTGOING MOVES
- MOVE_ID
- OPERATION
- SOURCE_NSID
- DESTINATION_NSID
- SOURCE_PATH_HASH
- SOURCE_PATH
- STATE
- CLOCK
- CURSOR
- . . .

110

| | TARGET AND SYMBOLIC LINK ARE CONTAINED IN THE SAME NAMESPACE | |
|---|---|---|
| OPTIONS 1505 | RELATIVE PATH 1440 | ABSOLUTE PATH 1430 |
| Option 1 Synchronize Sym. Link as a Sym. Link | - Maintains data integrity<br>- Consistency across platforms<br>- Inconsistencies across hosts for targets that have synchronization disabled | - Maintains data integrity<br>- Consistency across platforms<br>- Inconsistencies across hosts for targets that have synchronization disabled<br>- Inconsistencies across hosts based on incorrect path at a host |
| Option 2 Follow Sym. Link to Target and Synchronize Target | - Corrupts content items that rely on sym. Link (e.g., Application Bundles)<br>- Consistent behavior<br>- Synchronization asymmetry<br>- Potential security problems | - Corrupts certain content items<br>- Consistency across platforms<br>- Synchronization asymmetry<br>- Potential security problems |
| Option 3 Ignore Sym. Link | - Consistency across platforms<br>- Consistency across hosts<br>- Corrupts content items that rely on sym. Link (e.g., Application Bundles) | - Consistency across platforms<br>- Consistency across hosts<br>- Corrupts content items that rely on sym. Link (e.g., Application Bundles) |

 Symbolic Link

*FIG. 15A*

TARGET AND SYMBOLIC LINK ARE CONTAINED ON DIFFERENT NAMESPACES

| OPTIONS 1505 | RELATIVE PATH 1440 | ABSOLUTE PATH 1430 |
|---|---|---|
| Option 1<br>Synchronize Sym. Link as a Sym. Link | - Maintains data integrity<br>- Consistency across platforms<br>- Inconsistency problems across hosts for targets that have synchronization disabled | - Maintains data integrity<br>- Consistency across platforms<br>- Inconsistency problems across hosts for targets that have synchronization disabled<br>- Inconsistency problems across hosts based on incorrect path at a host |
| Option 2<br>Follow Sym. Link to Target and Synchronize Target | - Corrupts content items that rely on sym. link<br>- Consistency across platforms<br>- Potential security problems<br>- Synchronization asymmetry<br>- Potential inconsistencies | - Corrupts content items that rely on sym. link<br>- Consistency across platforms<br>- Synchronization asymmetry<br>- Potential security problems<br>- Potential inconsistencies |
| Option 3<br>Ignore Sym. Link | - Consistency across platforms<br>- Consistency across hosts<br>- Corrupts content items that rely on sym. link (e.g., Application Bundles) | - Consistency across platforms<br>- Consistency across hosts<br>- Corrupts content items that rely on sym. link (e.g., Application Bundles) |

1510

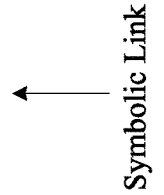
Symbolic Link

FIG. 15B

INTERNAL TARGET

| OPTIONS 1505 | RELATIVE PATH 1440 | ABSOLUTE PATH 1430 |
|---|---|---|
| Option 1 Synchronize Sym. Link as a Sym. Link | - Maintains data integrity<br>- Consistency across platforms<br>- Inconsistencies across hosts for targets that have synchronization disabled<br>- Potential inconsistency for sym. links spanning multiple namespaces | - Maintains data integrity<br>- Consistency across platforms<br>- Inconsistencies across hosts for targets that have synchronization disabled<br>- Inconsistencies across hosts based on incorrect path at a host<br>- Potential inconsistency for sym. links spanning multiple namespaces |
| Option 2 Follow Sym. Link to Target and Synchronize Target | - Corrupts content items that rely on sym. link (e.g., Application Bundles)<br>- Consistency across platforms<br>- Synchronization asymmetry<br>- Potential inconsistency for sym. links spanning multiple namespaces | - Corrupts content items that rely on sym. link (e.g., Application Bundles)<br>- Consistency across platforms<br>- Synchronization asymmetry<br>- Potential security problems<br>- Potential inconsistency for sym. links spanning multiple namespaces |
| Option 3 Ignore Sym. Link | - Consistency across platforms<br>- Consistency across hosts<br>- Corrupts content items that rely on sym. link (e.g., Application Bundles) | - Consistency across platforms<br>- Consistency across hosts<br>- Corrupts content items that rely on sym. link (e.g., Application Bundles) |

← Symbolic Link

*FIG. 15C*

EXTERNAL TARGET

| OPTIONS 1505 | RELATIVE PATH 1440 | ABSOLUTE PATH 1430 |
|---|---|---|
| Option 1 Synchronize Sym. Link as a Sym. Link | - Maintains data integrity<br>- Inconsistencies across platforms<br>- Invalid sym. links | - Maintains data integrity<br>- Inconsistencies across platforms<br>- Inconsistencies across hosts based on incorrect path at a host<br>- Invalid sym. links |
| Option 2 Follow Sym. Link to Target and Synchronize Target | - Corrupts content items that rely on sym. link (e.g., Application Bundles)<br>- Synchronization asymmetry<br>- Inconsistencies across platforms | - Corrupts content items that rely on sym. link (e.g., Application Bundles)<br>- Inconsistencies across platforms<br>- Synchronization asymmetry<br>- Potential security problems |
| Option 3 Ignore Sym. Link | - Consistency across platforms<br>- Consistency across hosts<br>- Corrupts content items that rely on sym. link (e.g., Application Bundles) | - Consistency across platforms<br>- Consistency across hosts<br>- Corrupts content items that rely on sym. link (e.g., Application Bundles) |

1530

 Symbolic Link

*FIG. 15D*

ALLOCATION AND REASSIGNMENT OF UNIQUE IDENTIFIERS FOR SYNCHRONIZATION OF CONTENT ITEMS

CROSS-REFERENCE TO RELATED APPLICATIONS

This application is a continuation of U.S. application Ser. No. 15/870,221, filed on Jan. 12, 2018, entitled, ALLOCATION AND REASSIGNMENT OF UNIQUE IDENTIFIERS FOR SYNCHRONIZATION OF CONTENT ITEM, Ser. No. 15/858,357, filed on Dec. 29, 2017, entitled, ALLOCATION AND REASSIGNMENT OF UNIQUE IDENTIFIERS FOR SYNCHRONIZATION OF CONTENT ITEM, which claim the benefit of priority under U.S.C. § 119(e) to U.S. Provisional Patent Application 62/611,473, filed on Dec. 28, 2017, entitled, SYNCHRONIZED CONTENT MANAGEMENT SYSTEM, all of which are hereby expressly incorporated by reference herein in their entireties.

TECHNICAL FIELD

The present technology pertains to distributed storage, collaboration and synchronization systems.

BACKGROUND

Cloud storage systems allow users to store and access data on the cloud. Some cloud storage systems allow users to share data with other users and access the data in a collaborative fashion. In some cases, users may also store and access local copies of the data on their client devices. The local copies of the data may provide users with faster access to the data. Additionally, the local copies can allow the user to access the data when the user is offline. Cloud storage systems may also allow users to synchronize their local copies of the data with the data on the cloud to ensure consistency. Cloud storage systems may attempt to synchronize copies of data across a number of client devices and servers so each copy of data is identical. However, synchronization of data across multiple devices can be an extremely difficult task, often resulting in undesirable loss of data and inconsistencies.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 2A shows a schematic diagram of an example architecture for synchronizing content between the content management system and client devices shown in FIG. 1A;

FIG. 9A shows an example mount state violation generated by a series of mount operations executed for a user;

FIG. 9C shows an example lamport clock configuration calculated for mount operations based on the example method shown in FIG. 9B;

FIG. 9D shows an example listing of operations serialized according to lamport clocks;

FIG. 11A shows example tables in a server file journal for tracking move operations;

FIG. 15A shows a table of an example scenario for synchronizing symbolic links when the target and the symbolic link are contained in the same namespace;

FIG. 15B shows a table of an example scenario for synchronizing symbolic links when the target and symbolic link are contained on different namespaces;

FIG. 15C shows a table of an example scenario for synchronizing symbolic links when the target of the symbolic link is an internal target;

FIG. 15D shows a table of an example scenario for synchronizing symbolic links when the target of the symbolic link is an external target.

DETAILED DESCRIPTION

Figure 1A:
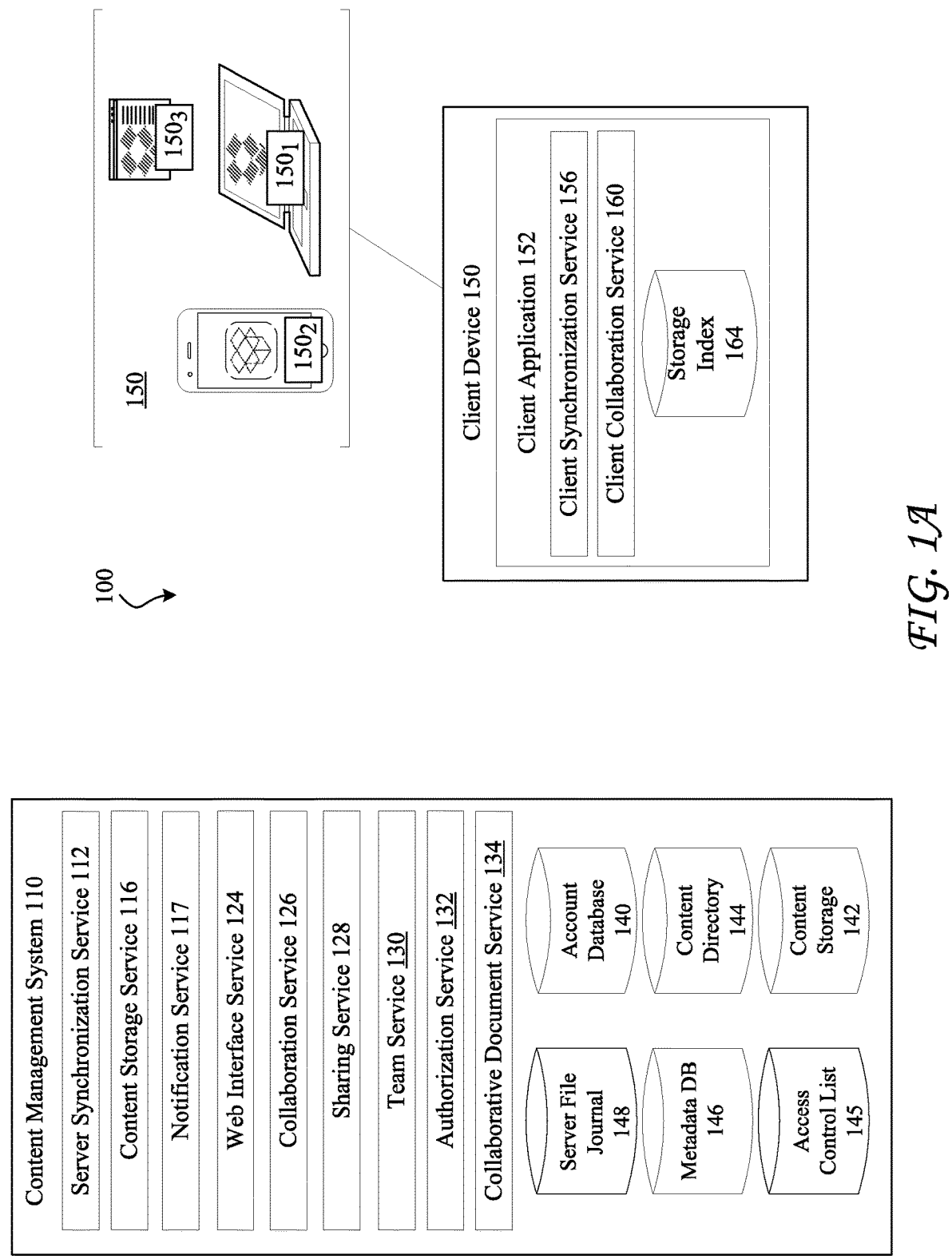
FIG. 1A shows an example of a content management system and client devices.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Cloud storage systems allow users to store and access content items across multiple devices. The content items may include, but are not limited to, files, documents, messages (e.g., email messages or text messages), media files (e.g., photos, videos, and audio files), folders, or any other unit of content. Content items may be shared with multiple users, edited, deleted, added, renamed, or moved. However, synchronizing content items shared or stored across several devices and user accounts has remained flawed and rife with technical obstacles.

To illustrate, a first machine (e.g., a client device or server) may send communications to a second machine that provides information about how a user's modification of content items on a cloud storage system. These communications may be used by the second machine to synchronize the content items on the second machine such that actions performed on content items on the first machine are reflected in content items on the second machine, and the content items on the first machine are substantially identical to the content items on the second machine.

However, in many cases, there may be several communications sent between the various machines, which may be difficult to manage. Moreover, some of the communications may be received out of order as a result of various issues, such as client or network problems. This often results in conflicts and errors between content items at the various machines. The user's activity may also generate a large number of revisions which can further complicate synchronization efforts and exacerbate inconsistencies. For example, a user may perform a large number of modifications to various content items, undo modifications in a short period of time, or quickly perform additional modifications to a previously modified content item. This increases the likelihood that changes and revisions from users are received out of order, causing outdated modifications and conflicting content items. As a result, some operations may not be compatible with the current state of the content items. Moreover, it can be extremely difficult to detect whether operations are in conflict.

There is also an inherent latency with synchronization actions. For example, actions taken on the first machine are first detected by the first machine, and a communication is then generated and transmitted through a network. The communication is received by the second machine which may still be processing previous communications, and actions detailed in the communications may be taken at the second machine. In this illustrative scenario, there are several possible points of latency, including the first machine, the second machine, and the network. As latency increases, the likelihood of conflicts between content items also increases. Processing such conflicted communications and resolving conflicts are extremely difficult and computationally expensive tasks.

Further complexity is introduced when the same or different user on the second machine or other machines with access to the content items make modifications to the content items. Moreover, it is difficult to uniquely identify content items stored across multiple systems, such as a cloud storage system and client devices. When a content item is generated at a client device, the client device cannot guarantee that an identifier assigned by the client device to the content item is unique at other systems, even if the identifier is randomly generated and otherwise unique at the client device. In addition, as content items are created, modified, moved, and deleted across devices, the content items can be extremely difficult to track across the various locations, often resulting in duplicate identifiers and metadata at one or more locations. Duplicate identifiers and metadata can create inconsistencies between content items and limit the ability to process operations and synchronize changes across systems.

Additional technical issues arise when content items are modified locally and remotely in a large collaboration environment, and race conditions are created by various operations generated across systems. As illustrated here, these issues can quickly multiply and grow in complexity, creating a wide array of problems and inconsistencies in the content items.

Content Management System

In some embodiments the disclosed technology is deployed in the context of a content management system having content item synchronization capabilities and collaboration features, among others. An example system configuration 100 is shown in FIG. 1A, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1A.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device 1452 is a computing device wherein content items are only accessible to a specific application or by permission given by the specific application, and the content items are typically stored either in an application specific space or in the cloud. Client device $150_3$ is any client device accessing content management system 110 via a web browser and accessing content items via a web interface. While example client devices $150_1$, 1452, and $150_3$ are depicted in form factors such as a laptop, mobile device, or web browser, it should be understood that the descriptions thereof are not limited to devices of these example form factors. For example a mobile device such as client 1452 might have a local file system accessible by multiple applications resident thereon, or client 1452 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system service 116. In some embodiments, client synchronization service 156 can perform some functions of content management system service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created.

In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Client Synchronization Service

Figure 1B:
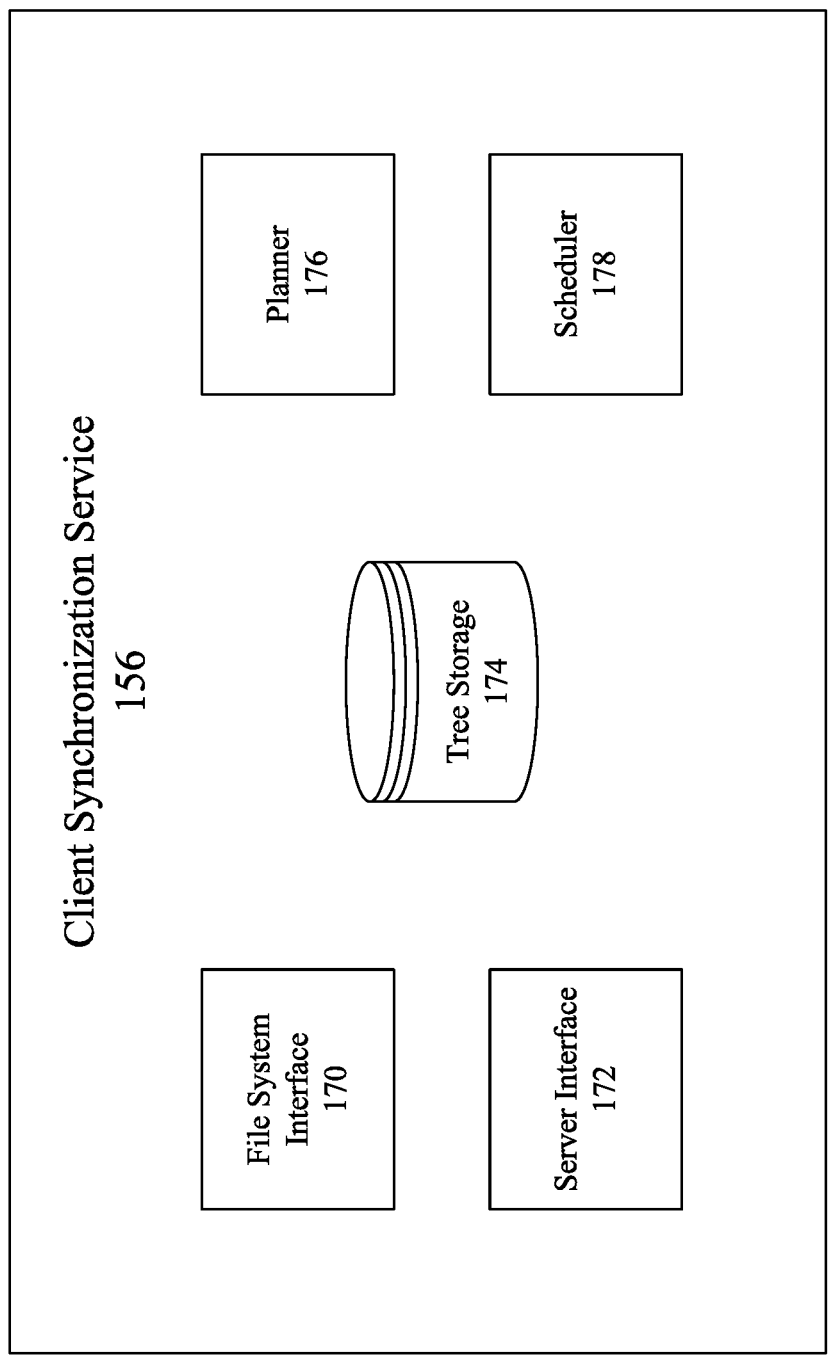
FIG. 1B shows an example of a client synchronization service in accordance with some aspects.

FIG. 1B shows an example of a client synchronization service 156, in accordance with some embodiments. According to some embodiments, client synchronization service 156 may be implemented in client device 150 shown in FIG. 1A. However, in other embodiments, client synchronization service 156 may be implemented on another computing device. Client synchronization service 156 is configured to synchronize changes to content items between a content management system and the client device on which client synchronization service 156 runs.

Client synchronization service 156 may include file system interface 170, server interface 172, tree storage 174, planner 176, and scheduler 178. Additional or alternative components may also be included. High level descriptions of client synchronization service 156 and its components are discussed below with respect to FIG. 1B. However, further details and embodiments of client synchronization service 156 and its components are discussed throughout.

File system interface 170 is configured to process changes to content items on the local filesystem of the client device and update the local tree. For example, file system interface 170 can be in communication with client synchronization service 156 to detect changes to content items on the local filesystem of the client device. Changes may also be made and detected via client application 152 of FIG. 1A. File system interface 170 may make updates to the local tree may be made based on the changes (new, deleted, modified, copied, renamed, or moved content items) to content items on the client device.

Server interface 172 is configured to aid in the processing of remote changes to content items at a remote storage of the content management system and updating of the remote tree. For example, server interface 172 can be in communication with server synchronization service 112 of FIG. 1A to synchronize changes to content items between client device 150 and content management system 110. Changes (new, deleted, modified, copied, renamed, or moved content items) to content items at content management system 110 may be detected and updates may be made to the remote tree to reflect the changes at content management system 110.

Tree storage 174 is configured to store and maintain the tree data structures used by client synchronization service 156. For example, tree storage 174 may store the local tree, the sync tree, and the remote tree. According to some embodiments, tree storage 200 may store the tree data structures in persistent memory (e.g., a hard disk or other secondary storage device) as well as in main memory (e.g., RAM or other primary storage device) in order to reduce latency and response time. For example, on start-up of the client device or client synchronization service 156, the tree data structures may be retrieved from persistent memory and loaded into main memory. Tree storage 174 may access and update the tree data structures on main memory and, before the client device or client synchronization service 156 is shut down, tree storage 174 may store the updated tree data structures on persistent memory. Because main memory is expensive in cost and often limited in size on most client devices, additional technological improvements are implemented to decrease the footprint of the tree data structures on main memory. These technological solutions are described further below.

Planner 176 is configured to detect differences between the server state associated with the content management system and the file system state associated with the client device based on the state of the tree data structures. For example, planner 176 may determine if there is a difference between the remote tree and the sync tree. A difference between the remote tree and the sync tree indicates that an action performed remotely on one or more content items stored at the content management system has caused the server state and the file system state to become out of sync. Similarly, planner 176 may also determine if there is a difference between the local tree and the sync tree. A difference between the local tree and the sync tree indicates that an action performed locally on one or more content items stored on the client device has caused the server state and the file system state to become out of sync. If a difference is detected, planner 176 generates a sequence of operations that synchronize the tree data structures.

In some scenarios, a sequence of operations generated based on a difference between the remote tree and the sync tree and a sequence of operations generated based on a difference between the local tree and the sync tree may conflict. Planner 176 is may also be configured to merge the two sequences of operations into a single merged plan of operations.

Scheduler 178 is configured to take the generated sequence of operations and manage the execution of those operations. According to some embodiments, scheduler 178 converts each operation in the sequence of operations into a series of one or more tasks that need to be executed in order to perform the operation. In some scenarios, some tasks may become out dated or no longer relevant. Scheduler 178 is configured to identify those tasks and cancel them.

File Journal and Storage Systems (Tomahawk and Waterfall)

FIG. 2A illustrates a schematic diagram of an example architecture for synchronizing content between content management system 110 and client device 150 in system configuration 100. In this example, client device 150 interacts with content storage 142 and server file journal 148 respectively via content storage interface 206 and file journal interface 202. Content storage interface 206 can be provided or managed by content storage service 116, and file journal interface 202 can be provided or managed by server synchronization service 112. For example, content storage interface 206 can be a subcomponent or subservice of content storage service 116, and file journal interface 202 can be a subcomponent or subservice of server synchronization service 112.

Content storage interface 206 can manage communications, such as content requests or interactions, between client device 150 and content storage 142. Content storage interface 206 can process requests from client device 150 to upload and download content to and from content storage 142. Content storage interface 206 can receive content requests (e.g., downloads, uploads, etc.) from client device 150, verify permissions in access control list 145, communicate with authorization service 132 to determine if client device 150 (and/or the request from client device 150) is authorized to upload or download the content to or from content storage 142, and interact with content storage 142 to download or upload the content in content storage 142 to client device 150. If the request from client device 150 is a request to download a content item, content storage interface 206 can retrieve the content item from content storage 142 and provide the content item to client device 150. If the request from client device 150 is a request to upload a content item, content storage interface 206 can obtain the content item from client device 150 and upload the content item to content storage 142 for storage.

Figure 2B:
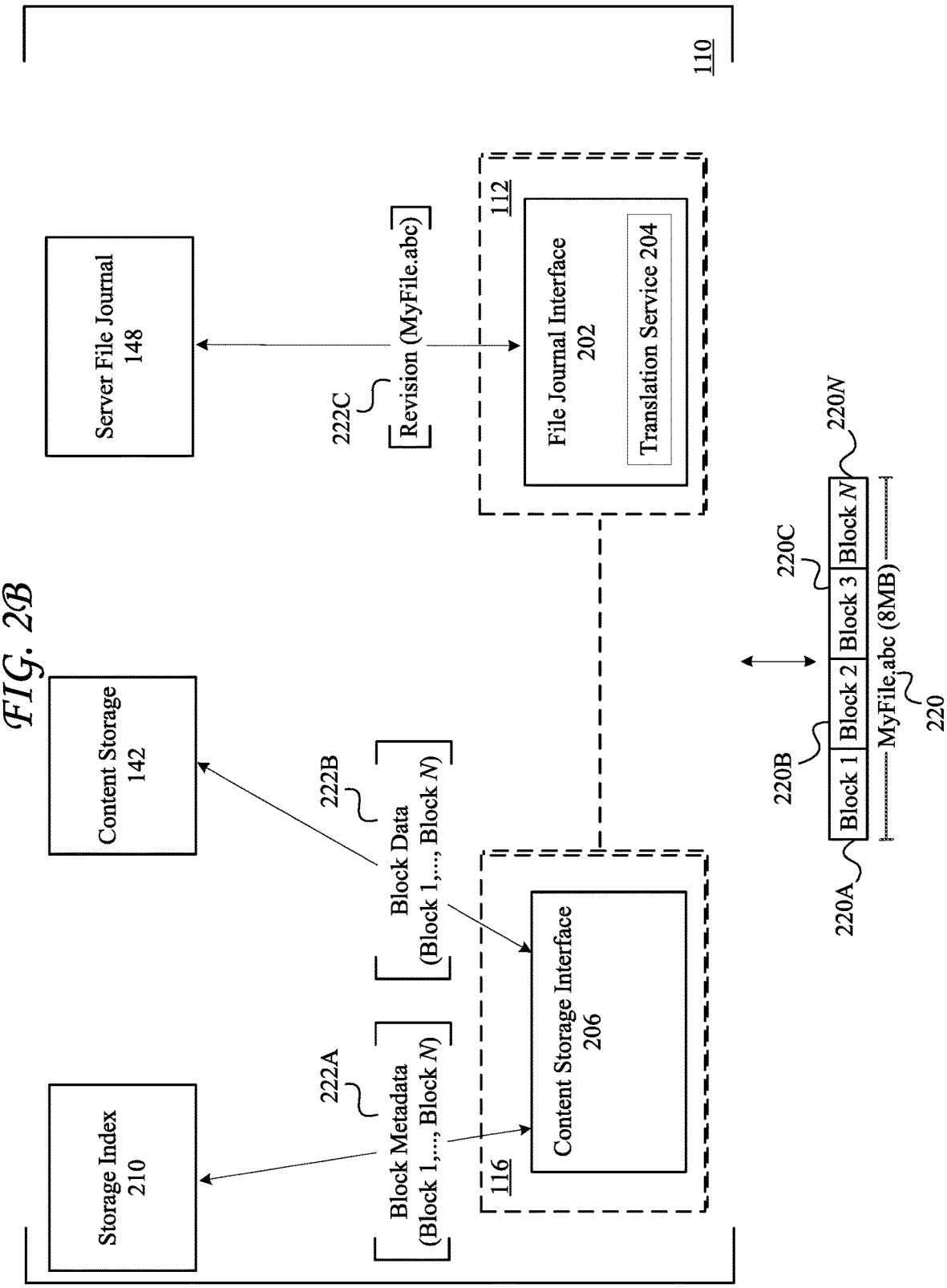
FIG. 2B shows an example configuration for storing and tracking blocks of content items in the example architecture for synchronizing content between the content management system and client devices shown in FIG. 2A.

When processing content requests from client device 150, content storage interface 206 can communicate with storage index 210 to check the availability and/or storage location of the requested content in content storage 142, and track content items in content storage 142. Storage index 210 can maintain an index of content items on content storage 142 which identifies the content items on content storage 142 and can also identify a respective location of the content items within content storage 142. Thus, storage index 210 can track content items on content storage 142 as well as storage locations of the content items. Storage index 210 can track entire content items, such as files, and/or portions of the content items, such as blocks or chunks. In some cases, content items can be split into blocks or chunks which can be stored at content storage 142 and tracked in storage index 210. For example, content storage 142 can store a content item as blocks or chunks of data which include respective data portions of the content item. Storage index 210 can track the blocks or chunks of the content item stored in content storage 142. FIG. 2B described below illustrates an example configuration for storing and tracking blocks of content items.

File journal interface 202 can manage communications, such as metadata requests and content synchronizations and operations, between client device 150 and server file journal 148. For example, file journal interface 202 can translate, validate, authenticate, and/or process operations, configurations, and state information between client device 150 and server file journal 148. File journal interface 202 can verify permissions from an FSAuth token in a cursor or through authorization service 132 to authorize, or verify authorization of, requests sent by client device 150 to server file journal 148. When processing requests or operations from client device 150, file journal interface 202 can access namespace membership store 208 to determine or verify namespace ownership information for any namespaces associated with the requests or operations from client device 150, and retrieve permissions information from access control list 145 to verify permissions of content associated with the requests or operations from client device 150.

Translation service 204 in file journal interface 202 can perform linearization and translation operations for communications between client device 150 and server file journal 148. For example, translation service 204 can translate communications from client device 150 to a different format consistent with the structure and format of data in server file journal 148, and vice versa. To illustrate, in some cases, client device 150 can process content item information (e.g., state, changes, versions, etc.) at client device 150 as operations, while server file journal 148 can process the same information as content item revisions reflected by rows in a data structure such as a database table. To enable synchronization of content item information between client device 150 and server file journal 148, translation service 204 can translate operations from client device 150 into revisions suitable for server file journal 148, and can translate revisions reflected in rows of data on server file journal 148 to operations suitable for client device 150.

In some cases, authorization service 132 can generate a token that verifies or indicates that client device 150 is authorized to access, update, download, or upload a requested content item. The token can include a device identifier associated with client device 150, an account identifier associated with a user account authenticated or authorized at client device 150, a session identifier associated with an authorized session at client device 150, a view context, and access permissions to identified collections. The token can be included in a cryptographically signed data object called a cursor, which will be described in greater detail below. Content management system 110 and/or authorization service 132 can send the token(s) to client device 150, and client device 150 can provide the token to content management system 110 when requesting content item revisions and/or updates to server file journal 148 as further described below. Client device 150 can also provide the token to content storage interface 206 to validate any content requests (e.g., downloads, uploads, etc.). Content storage interface 206 can use the token to authorize queries to storage index 210 and upload or download content items to or from content storage 142.

For example, client device 150 can send to content storage interface 206 a request to upload a content item to content storage 142. The request can include the token and the content item to be uploaded. Content storage interface 206 can use the token to authorize a query to storage index 210 to check if the content item already exists on content storage 142, and authorize the upload of the content item to content storage 142. Client device 150 can also provide the token to file journal interface 202 to authorize a request to store metadata on server file journal 148 to track the upload and revision of the content item.

FIG. 2B illustrates an example block storage and synchronization configuration. In this example, content storage 142 can store blocks of data, which can be opaque chunks of content items (e.g., files) up to a particular size (e.g., 4 MB). Content items can be split into blocks and the blocks can be stored at content storage 142 for access. Storage index 210 can track blocks stored at content storage 142, as well as the respective locations of the blocks stored at content storage 142. File journal interface 202 can interact with server file journal 148 to track revisions to the content items and/or blocks stored at content storage 142.

For example, content item 220 (e.g., MyFile.abc) can be split into blocks 220A, 220B, 220C, 220N. Content storage interface 206 can receive blocks 220A, 220B, 220C, 220N and send block data 222B to content storage 142 for storage at content storage 142. Block data 222B can include blocks 220A, 220B, 220C, 220N associated with content item 220.

Blocks 220A, 220B, 220C, 220N can be stored on one or more storage devices or volumes at content storage 142 and/or aggregated within one or more logical storage containers (e.g., buckets) or data clusters. In some cases, blocks 220A, 220B, 220C, 220N can be stored together on a same location (e.g., storage device, volume, container, and/or cluster). In other cases, some or all of blocks 220A, 220B, 220C, 220N can be stored on two or more different locations (e.g., two or more different storage devices, volumes, containers, and/or clusters).

Content storage interface 206 can also store block metadata 222A at storage index 210. Block metadata 222A can identify blocks 220A, 220B, 220C, 220N, and allows storage index 210 to track blocks 220A, 220B, 220C, 220N at content storage 142. Block metadata 222A can include an identifier for each block 220A, 220B, 220C, 220N. The identifier for a block can be a name or key, such as a hash of the block, which identifies the block.

Block metadata 222A can also include location information for blocks 220A, 220B, 220C, 220N, which indicates the respective storage location of blocks 220A, 220B, 220C, 220N. The location information of a block can identify the storage device or volume where the block is stored and/or a logical storage container or data cluster where the block is contained. The location information can be used to access or retrieve the associated block.

Content storage interface 206 can store block metadata 222A at storage index 210 before or after storing blocks 220A, 220B, 220C, 220N at content storage 142. For example, content storage interface 206 can store blocks 220A, 220B, 220C, 220N at content storage 142 and subsequently store block metadata 222A at storage index 210 to indicate that blocks 220A, 220B, 220C, 220N have been stored at content storage 142.

In some cases, content storage interface 206 can query storage index 210 prior to storing blocks 220A, 220B, 220C, 220N at content storage 142, to determine if (or where) blocks 220A, 220B, 220C, 220N are stored at content storage 142. For example, content storage interface 206 can query storage index 210 based on block metadata 222A to check if blocks 220A, 220B, 220C, 220N are stored at content storage 142. Storage index 210 can compare block identifiers in block metadata 222A with block identifiers at storage index 210 to check for any matches. A match between block identifiers indicates that an associated block is stored at content storage 142.

As previously mentioned, server file journal 148 tracks content item revisions, including content item adds, edits, moves or renames, deletes, etc. Accordingly, file journal interface 202 can store revision 222C at server file journal 148 to indicate that content item 220 and/or blocks 220A, 220B, 220C, 220N were added to content storage 142. Revision 222C can represent a revision of content item 220 within a journal of content item revisions at server file journal 148.

Revision 222C can identify content item 220 and an operation associated with content item 220, such as an add operation (e.g., upload), edit operation, move or rename operation, delete operation, etc. Revision 222C can also identify a namespace in content management system 110 where content item 220 is stored, and a row in a journal of content item revisions at server file journal 148 for storing revision 222C. The row within the journal of content item revisions can represent a revision number associated with revision 222C for content item 220.

File Journal Interface (Tomahawk)

Figure 3A:
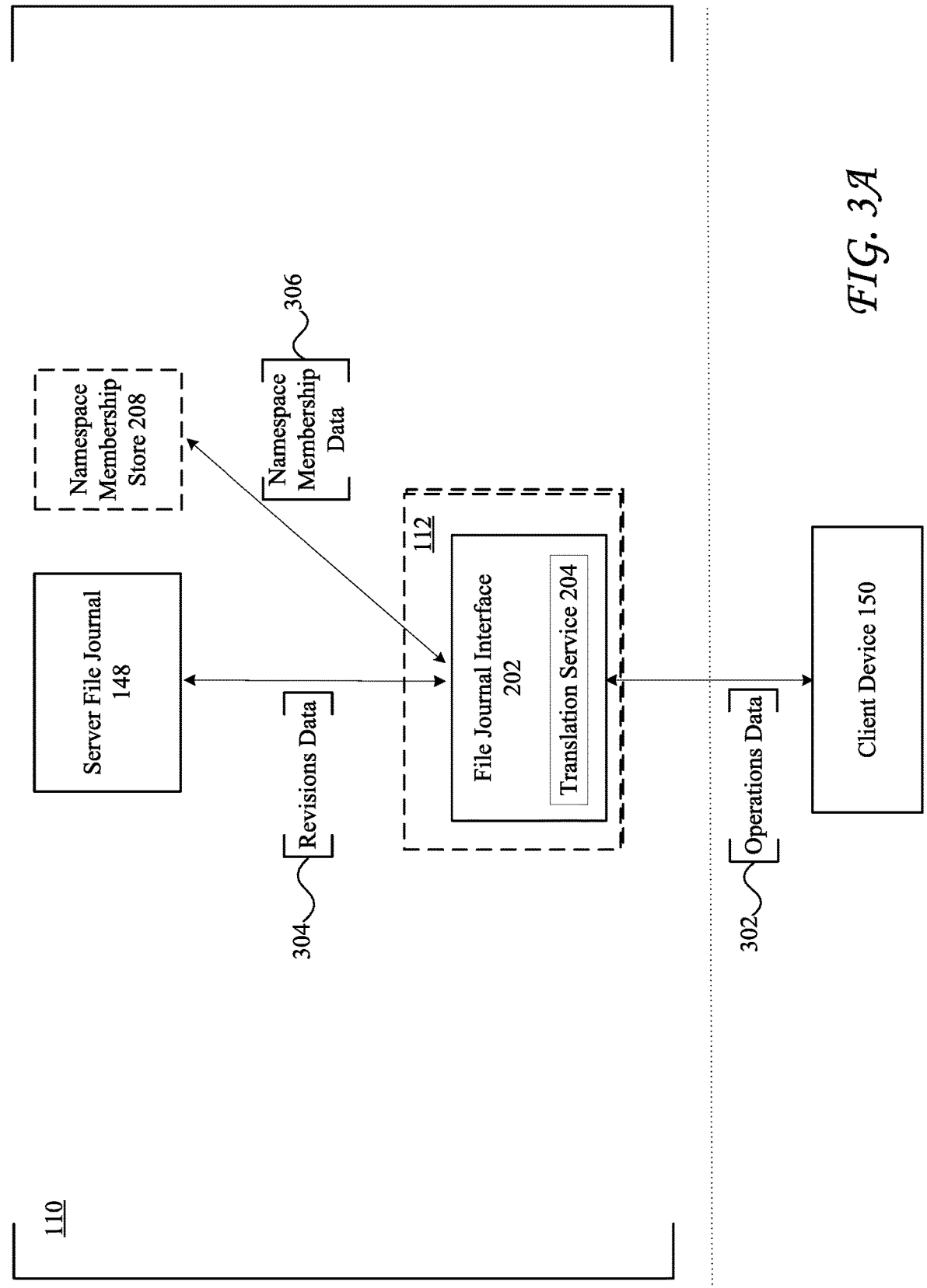
FIG. 3A shows a diagram of example communications processed by a file journal interface between a client device and a server file journal on a content management system.

FIG. 3A illustrates a diagram of communications processed by file journal interface 202 between client device 150 and server file journal 148. Server file journal 148 tracks content item state and changes (e.g., revisions) as values in rows and fields in server file journal 148. For example, server file journal 148 can maintain one or more journals of revisions to content items in content storage 142. The one or more journals can track revisions of each content item on each namespace. A row of values in a journal on server file journal 148 can identify a content item in a namespace and reflects a state of the content item in the namespace. A subsequent row in the journal corresponding to the same content item in the namespace can reflect a subsequent revision to the content item in the namespace. Thus, rows in server file journal 148 associated with a content item can identify the current state of the content item and any revisions to the content item from creation to the current state.

To synchronize content item information (e.g., state, changes or revisions, etc.) with client device 150, server file journal 148 can send or receive revisions data 304 to or from file journal interface 202, which represent revisions tracked or stored in server file journal 148 for one or more content items. Revisions data 304 can include, for example, a log of content item revisions corresponding to rows in server file journal 148. Server file journal 148 can send revisions data 304 to file journal interface 204, which can translate revisions data 304 into operations data 302 for client device 150, as further described below.

Client device 150 can perform content operations to update or modify content items at client device 150. To synchronize content item information with server file journal 148, client device 150 can send or receive operations data 302 to or from file journal interface 202. Client device 150 can send operations data 302 to file journal interface 202 to report changes at client device 150 to content items, and receive operations data 302 from file journal interface 202 to obtain the latest state of content items from server file journal 148 (e.g., revisions data 304).

For example, client device 150 can edit content item A at client device 150 and report to file journal interface 202 an edit operation indicating the edit to content item A. The edit operation can be included in operations data 302 communicated with file journal interface 202 to indicate the revision to content item A. File journal interface 202 can receive operations data 302 including the edit operation and generate a revision for storage at server file journal 148, tracking the edit to content item A. File journal interface 202 can include the revision associated with the edit operation in revisions data 304 to server file journal 148, in order to update server file journal 148 to store the revision representing the edited state of content item A.

As further described below, operations data 302 can include a cursor which identifies the latest state or revision obtained by client device 150 for each namespace associated with client device 150. For example, the cursor can identify the latest revision in server file journal 148 obtained by client device 150 for each namespace associated with client device 150. The information in the cursor allows file journal interface 202 to determine whether an operation in operations data 302 from client device 150 reflects the latest state or revisions in server file journal 148 for the namespace(s) associated with the operation. This can help file journal interface 202 ensure that operations in operations data 302 from client device 150 that correspond to older revisions in server file journal 148 are not written to server file journal 148, which can create a conflict between existing revisions in server file journal 148 and revisions translated from operations data 302.

To enable synchronization of content item information between client device 150 and server file journal 148, file journal interface 202 can translate (e.g., via translation service 204) operations data 302 to revisions data 304, and vice versa. When receiving operations data 302 from client device 150, file journal interface 202 can convert operations data 302 to revisions data 304, which includes content item revisions interpreted from operations in operations data 302. When receiving revisions data 304 from server file journal 148, file journal interface 202 can convert revisions data 304 to operations data 302, which include operations for implementing revisions in revisions data 304 at client device 150. Revisions data 304 includes data in server file journal 148 describing what happened to one or more content items (i.e., revisions to the one or more content items), and operations data 302 includes operations that have been executed or should be executed at client device 150 to modify the one or more content items. Thus, file journal interface 202 can translate data describing revisions to one or more content items from server file journal 148 (e.g., operations data 304) to operations that have or should be executed at client device 150 to modify the one or more content items at client device 150.

As previously noted, in addition to translating operations data 302 from client device 150 to revisions data 304 for server file journal 148, file journal interface 202 can convert revisions data 304 from server file journal 148 to operations data 302 for client device 150. File journal interface 202 can obtain revisions data 304 from server file journal 148 and translate revisions in revisions data 304 to operations for execution at client device 150 to revise one or more content items at client device 150 according to such revisions. The operations generated from the revisions in revisions data 304 are included in operations data 302 provided by file journal interface 202 to client device 150. This translation between operations data 302 and revisions data 304 allows client device 150 and server file journal 148 to synchronize content item information with each other as necessary.

Prior to writing to server file journal 148 any revision data 304 generated from operations data 302 provided by client device 150, file journal interface 202 can check a cursor in operations data 302 and/or query server file journal 148 to ensure any revisions in revisions data 304 do not create a conflict in server file journal 148. For example, file journal interface 202 can query server file journal 148 to check whether the version of a content item associated with a revision in revisions data 304 is the same the version of the content item at server file journal 148, or whether the version of the content item at server file journal 148 is an updated or different version as the content item to which the revision in revisions data 304 pertains. If server file journal 148 shows that the latest version of the content item is a different version than the version to which revision data 304 pertains, the two versions are in conflict.

File journal interface 202 can update server file journal 148 to store new revisions included in revisions data 304 derived from operations data 302. When querying and/or updating revisions in server file journal 148, file journal interface 202 can query namespace membership store 208 to retrieve namespace ownership information associated with any namespaces affected by the revisions in revisions data 304. The namespace ownership information can indicate which user account(s) own or are members of a particular namespace, and thus are able to access the particular namespace. Thus, file journal interface 202 can analyze the namespace ownership information to ensure server file journal 148 is not updated to include a revision to a namespace from a user account that is not a member of the namespace.

Figure 3B:
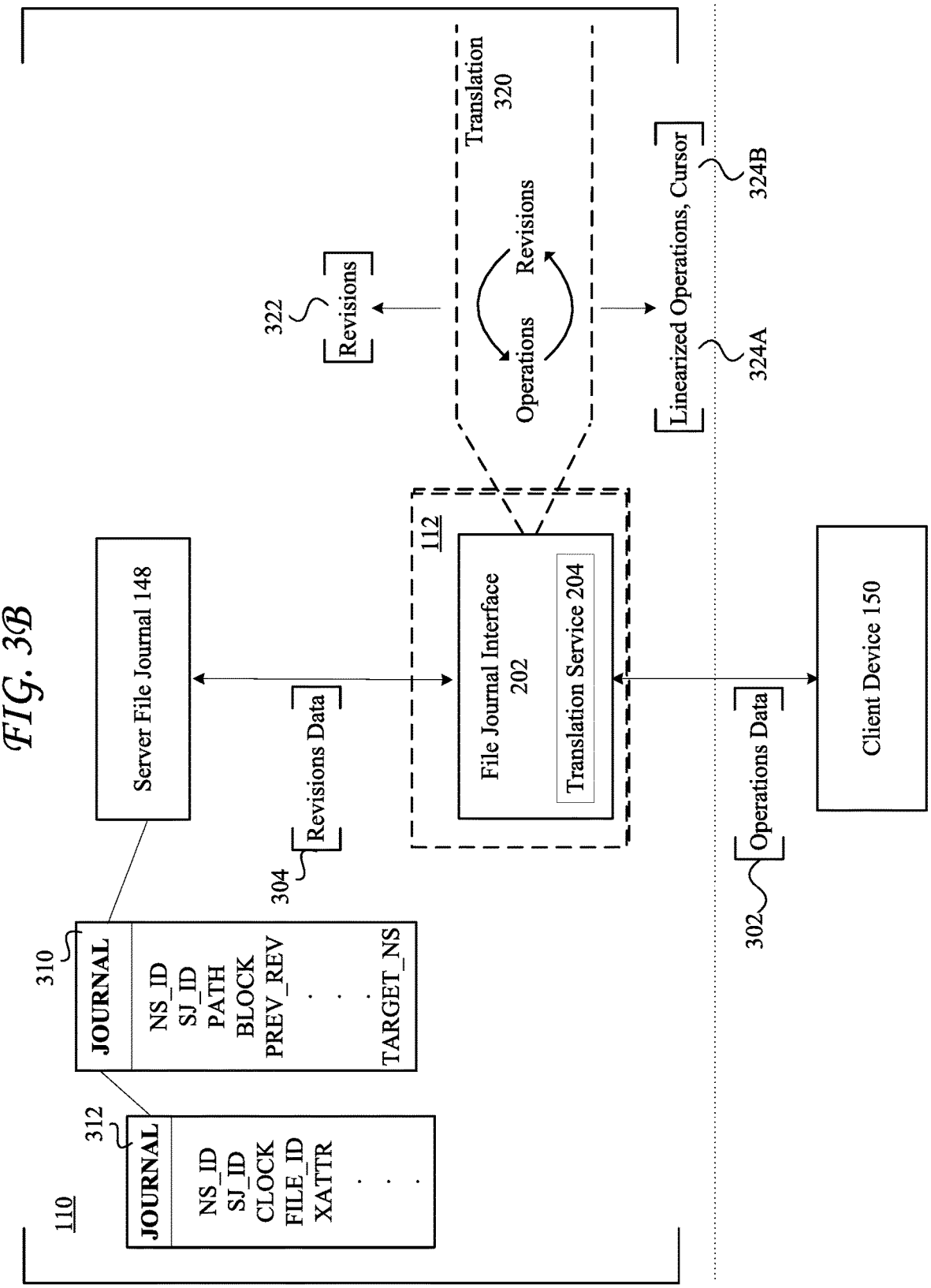
FIG. 3B shows a diagram of an example process for translating communications between a client device and a server file journal on a content management system.

With reference to FIG. 3B, server file journal 148 can store journals 310, 312 to track and identify content item revisions and state. In this example, journal 310 includes records containing a namespace identifier (NS_ID), server journal identifier (SLID), path, block, previous revision (Prev Rev), and target namespace (Target_NS). NS_ID can include one or more values for uniquely identifying a namespace in server file journal 148. SJ_ID include monotonically increasing values which map to a row in a given namespace and provides an ordering of operations or revisions within that namespace. The path can be a namespace-relative path that identifies an associated content item. Prev Rev identifies the SJ_ID of the row which corresponds to the previous state of the content item associated with the path. Target_NS identifies the NS_ID of the target namespace for a mount point of a mounted namespace. The Target_NS field is not set for rows (e.g., revisions) which do not correspond to mount points.

Journal 312 includes records containing an NS_ID, SLID, clock (e.g., timestamp), file identifier (File ID), extended attribute(s) (xattr), etc. The xattr can store metadata associated with content items or operations.

In some cases, journal 310 can include other fields such as a size field which represents the size of an associated content item, a directory field (e.g., Is Dir) which can be set to indicate when a content item is a directory, a file identifier that uniquely identifies the associated file, a clock or timestamp field, etc.

File journal interface 202 can perform translation 320 based on operations data 302 and revisions data 304 as previously mentioned. When performing translation 320, translation service 204 can transform operations data 302 into revisions 322, which include linearized revisions for storage at server file journal 148. Translation service 204 can also transform revisions data 304 into linearized operations 324A, included in operations data 302 sent to client device 150, which can be applied by client device 150 to update content item information (e.g., state, changes, etc.) at client device 150. Translation service 204 can also generate or update cursor 324B and provide cursor 324B in operations data 302 to client device 150. Cursor 324B identifies a respective revision or row in server file journal 148 corresponding to each namespace and/or content item associated with linearized operations 324B.

For example, cursor 324B can identify a namespace (e.g., NS_ID) and row in server file journal 148 for that namespace (e.g., SLID), which indicate the latest revision in server file journal 148 for that namespace. The namespace and row in cursor 324B can be associated with an operation in linearized operations 324A. Cursor 324B can identify a specific position on a log of revisions in server file journal 148 for the particular namespace, indicating the revision or state of the namespace in server file journal 148 after and/or before linearized operations 324A are applied at client device 150. Thus, cursor 324B can indicate the state of a namespace and/or content item in server file journal 148 before or after linearized operations 324A, which can help avoid revision conflicts and track the order of revisions before and after linearized operations 324A are applied.

Figure 4A:
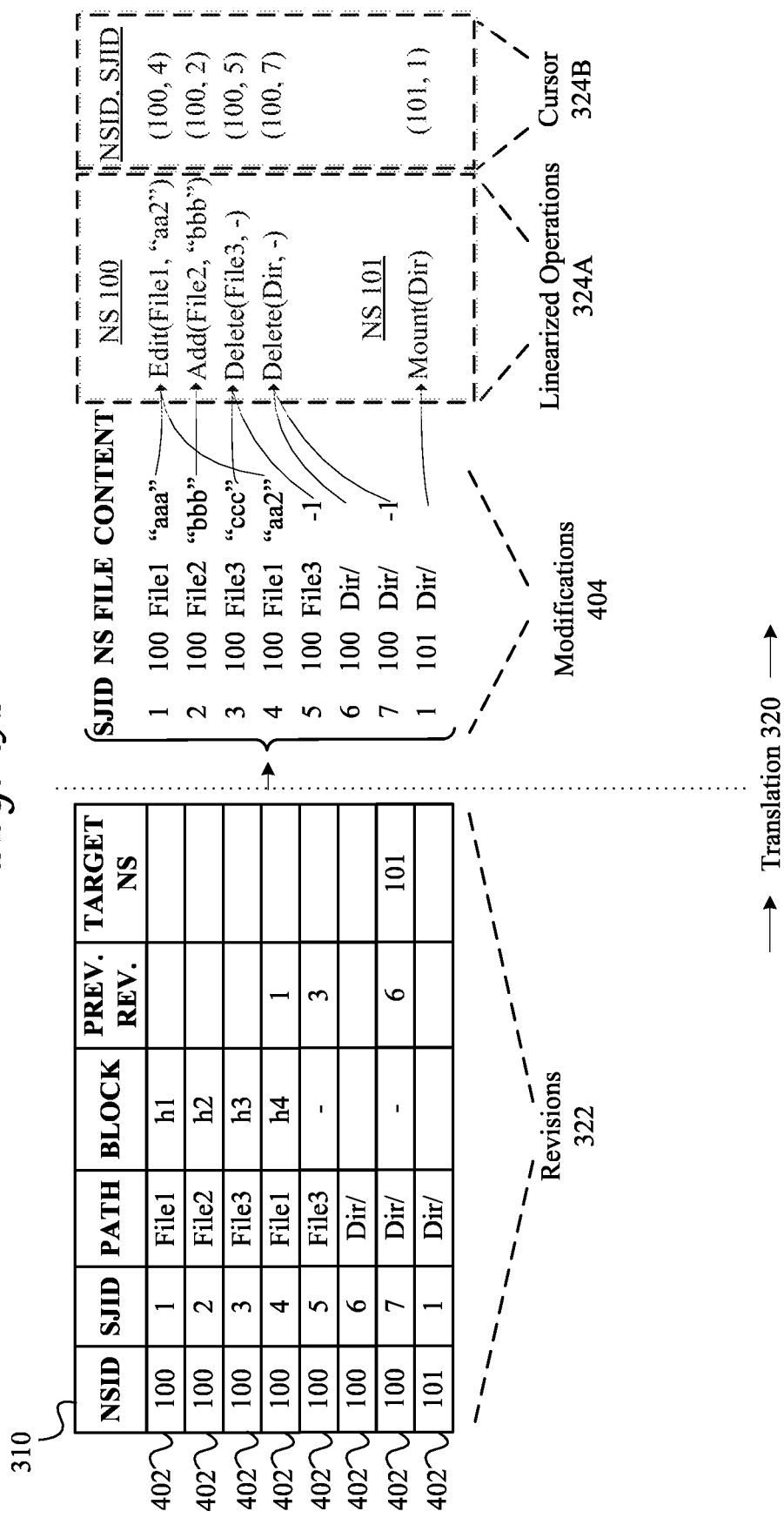
FIG. 4A shows a diagram of an example translation and linearization process for translating server file journal data to linearized operations.

FIG. 4A illustrates a diagram of an example translation and linearization process for translating server file journal data to linearized operations. In this example, journal 310 in server file journal 148 includes rows 402 with revisions 322 tracked by server file journal 148. Revisions 322 in journal 310 are associated with namespaces 100 and 101 (i.e., NS IDs 100 and 101). In some cases, server file journal 148 can store namespace-specific journals that track revisions specific to respective namespaces. The rows (e.g., 402) in a namespace-specific journal include data specific to that namespace, and each row reflects a revision specific to that namespace.

Each row (402) in journal 310 includes a namespace identifier field (NS_ID) for uniquely identifying a namespace associated with that row, a server journal identifier field (SJ_ID) that includes monotonically increasing values which map to a row in a given namespace and provides an ordering of operations or revisions within that namespace. Journal 310 also includes a path field (Path) for identifying a namespace-relative path of a content item, a block field (Block) for identifying a block or blocklist associated with the content item, a previous revision field (Prev Rev) for identifying the row (i.e., SJ_ID) in journal 310 that represents the previous state or revision of the content item, and a target namespace field (Target NS) for identifying a target namespace for a mount point of a mounted namespace (if the row corresponds to amount). There is no data for the Target_NS field for rows (e.g., revisions) which do not correspond to mount points.

The first of rows 402 in journal 310 identifies the first revision (SJ_ID 1) for "File1" (Path field value File1) in namespace "100" (NS ID 100), which corresponds to block "h1" and has no previous revisions (Prev Rev) or target namespaces (Target_NS). Since the row does not include a previous revision or a target namespace, the revision represented by the row corresponds to an addition at namespace "100" of "File1" associated with block "h1". The row in journal 310 containing SJ_ID "4" represents the last revision in journal 310 for "File1" on namespace "100", since this row is the last row or SJ_ID in journal 310 corresponding to "File1" on namespace "100". This row containing SJ_ID "4" indicates that "File1" on namespace "100" was edited after being added in SLID "1", and the edit corresponds to block "h4".

Modifications 404 depict an example of modifications representing revisions 322. In this example, each of modifications 404 illustrates a content revision from a corresponding row (402) in journal 310. Each modification corresponds to an SJID and NSID in journal 310, and a file associated with the corresponding SJID and NSID in journal 310. In this example, the content associated with modifications 404 represents example content values of the blocks (e.g., "h1", "h2", "h3", "h4") in journal 310. The content values in modifications 404 are provided for illustration purposes to depict example modifications to content associated with each revision.

For example, the first modification in modifications 404 represents SJID "1" and NSID "100" in journal 310, and depicts "File1" in namespace "100" being added. Content "aaa" represents a value of "h1" for "File1" at SJID "1" of NSID "100". Modifications 404 also depict an edit of "File1" in namespace "100" representing SJID "4" and NSID "100" in journal 310, which illustrates the content "aaa" (e.g., "h1") associated with "File1" in namespace "100" being modified to "aa2" (e.g., "h4").

In translation 320, revisions 322 from rows 402 in journal 310 are converted to linearized operations 324A. Linearized operations 324A are generated from revisions 322 in journal 310 and represent modifications 404 after linearization. As illustrated by linearized operations 324A, an operation in linearized operations 324A can be based on multiple revisions (322) and/or modifications (404), or a single revision (322) and/or modification (404).

For example, modifications 404 depict a revision adding "File1" to namespace "100", which corresponds to SJID "1" and NSID "100" in journal 310, and a revision editing "File1" in namespace "100", which corresponds to SJID "4" and NSID "100" in journal 310. The add revision can be inferred from the content value "aaa" (e.g., "h1") associated with "File1" and NSID "100" and the lack of any previous revisions for "File1" and NSID "100". In other words, the content "aaa" indicates that content (e.g., "h1") was either added or edited, and the lack of a previous revision for "File1" and NSID "100" suggests that the content "aaa" represents content (e.g., "h1") being added as opposed to edited. The edit revision can be inferred from the content value "aa2" (e.g., "h4") associated with "File1" and NSID "100" and the previous revision (SJID "1" and NSID "100") associated with "File1" and NSID "100". In other words, the change from content "aaa" to "aa2" associated with "File1" and NSID "100" suggests that the content "aa2" represents an edit.

In linearized operations 324A, the add and edit modifications (404) corresponding to SJID "1" and SJID "4" for NSID "100" can be converted into a single linearized operation (Edit operation) which edits the content value associated with "File1" from "aaa" (e.g., "h1") to "aa2" (e.g., "h4"). The single linearized operation editing content (e.g., "h1") of "File1" to "aa2" (e.g., "h4") reflects the modification adding "File1" associated with content "aaa" (e.g., "h1") to namespace "100", as well as the modification editing content "aaa" (e.g., "h1") associated with "File1" in namespace "100" to "aa2" (e.g., "h4"). Accordingly, this linearized operation is based on two modifications 404 and two corresponding revisions in revisions 322.

The modification in modifications 404 corresponding to SJID "2" and NSID "100" in journal 310 represents a revision adding "File1" associated with content "bbb" (e.g., "h2") to namespace "100". This modification represents the only revision 322 from journal 310 corresponding to "File1" on namespace "100". Accordingly, linearized operations 324A include a single operation for "File1" on namespace "100", which adds "File1" associated with content "bbb" (e.g., "h2") to namespace "100" and is based on a single modification 404 (add of "File1" on namespace "100") and revision 322.

Modifications 404 in this example also include for a modification adding "File3" associated with content "ccc" (e.g., "h3") to namespace "100", which corresponds to SJID "3" and NSID "100" in journal 310, and a delete (represented as "−1") of "File3" from namespace "100", which corresponds to SJID "5" and NSID "100" in journal 310. Thus, revisions 322 include two modifications 404 associated with "File3" on namespace "100". Since the last revision in journal 310 associated with "File3" and namespace "100" corresponds to the delete modification representing SJID "5" and NSID "100" in journal 310, the add and delete modifications 404 associated with "File3" and namespace from revisions 322 can be linearized to a single operation deleting "File3" from namespace "100".

Accordingly, linearized operations 324A include a single operation for "File3" and namespace "100", which is the single operation deleting "File3" from namespace "100".

SJIDs "6" and "7" for NSID "100" and SJID "1" for NSID "101" in journal 310 represent "Dir" being added to namespace "100" and later moved from namespace "100" to namespace "101". For example, SJID "6" and NSID "100" identifies "Dir" and namespace "100" and does not include a previous revision, which indicates "Dir" was added to namespace "100" at SJID "6". SJID "7" identifies "Dir" being moved from namespace "100" to namespace "101", as reflected by the block field ("-"), the previous revision field (SJID "6"), and the target namespace field ("101"). SJID "1" for NSID then identifies "Dir" being added to namespace "101", as indicated by the lack of prior rows or revisions for "Dir" and namespace "101". The add and move revisions in SJIDs "6" and "7" in NSID "100" and SJID "1" in NSID "8" are depicted by three modifications 404: an add of "Dir" to namespace "100" which corresponds to SJID "6" and NSID "100", a delete of "Dir" from namespace "100" which corresponds to SJID "7" and NSID "100", and an add of "Dir" to namespace "101" which corresponds to SJID "1" and NSID "101".

The add and delete modifications 404 of "Dir" and namespace "100", which respectively correspond to SJIDs "6" and "7" of NSID "100" in journal 310, are linearized to a single operation deleting "Dir" from namespace "100, since the last revision in journal 310 corresponding to "Dir" and namespace "100" is a delete of "Dir" from namespace "100" at SJID "7" and NSID "100". The add of "Dir" to namespace"101", which corresponds to SJID "1" and NSID "101" in journal 310, is the only modification 404 and revision 322 corresponding to "Dir" and namespace "101". Accordingly, the add is provided in linearized operations 324A as a single mount operation for "Dir" and namespace "101". Therefore, the three modifications 404 from revisions 322 corresponding to SJIDs "6" and "7" in NSID "100" and SJID "1" in NSID "101" (i.e., the add and delete of "Dir" on namespace "100", and the add of "Dir" on namespace "101"), are linearized to two operations in linearized operations 324A: a delete operation for "Dir" in namespace "100" and a mount operation for "Dir" in namespace "101".

As illustrated above, linearized operations 324A include an edit operation for "File1" and namespace "100", an add operation for "File2" and namespace "100", a delete operation of "File3" in namespace "100", a delete operation for "Dir" in namespace "100", and a mount operation for adding "Dir" to namespace "101". These operations in linearized operations 324A are generated from revisions 322 and reflect the latest state of each content item in journal 310. File journal interface 202 can generate linearized operations 324A and send linearized operations 324A to client device 150 to ensure client device 150 contains the latest state from revisions 322 in journal 310.

When providing linearized operations 324A to client device 150, file journal interface 202 can include cursor 324B along with linearized operations 324A to client device 150. Cursor 324B can identify the last revision (SJID) for each namespace (NSID) in journal 310. In some embodiments, cursor 324B can also include an FSAuth token including the user ID, and the last observed access permissions to the NS ID provided in the cursor. The last revision for each namespace can indicate a position in journal 310 corresponding to the latest revisions sent to client device 150 for each namespace.

In some cases, cursor 324B can also map each operation in linearized operations 324A to a namespace (NSID) and row (SJID) in journal 310. The namespace and row associated with an operation can indicate the position in journal 310 corresponding to the operation. In other words, the namespace and row associated with an operation can indicate the revision number in journal 310 represented by that operation. The namespaces and rows in cursor 324B correspond to the latest state in journal 310 for each namespace and content item associated with linearized operations 324A. Cursor 324B can provided to client device 150 as a tool for client device 150 to identify to file journal interface 202 the latest state or revisions obtained by client device 150 for one or more namespaces and/or content items when attempting to apply changes (e.g., via operations data 302) from client device 150 to the one or more namespaces and/or content items. When file journal interface 202 receives cursor 324B from client device 150, it can use cursor 324B to identify the position of client device 150 at journal 310 (e.g., the latest revisions from journal 310 obtained by client device 150) and detect or avoid conflicts caused by operations from client device 150.

For example, if file journal interface 202 receives an operation from client device 150 modifying "File1" in namespace "100", file journal interface 202 can use cursor 324B, which it receives from client device 150 along with the operation, to check whether journal 310 has any newer revisions for "File1" in namespace "100" than the revision identified in cursor 324B from client device 150. If the revision in cursor 324B is the most current revision in journal 310, file journal interface 202 can commit the edit operation as a new revision in journal 310 (e.g., SJID "8" in NSID "100") for "File1" in namespace "100".

Alternatively, if the revision in cursor 324B is not the most current revision in journal 310 for "File1" in namespace "100", file journal interface 202 can determine that the edit operation from client device 150 is not based on the most current version in journal 310 for "File1" in namespace "100". For example, if cursor 324B identifies SJID "4" and NSID "100" in journal 310 and file journal interface 202 determines that journal 310 includes a revision at SJID "12" and NSID "100" for "File1" in namespace "100", file journal interface 202 can determine that the edit operation from client device 150 pertains to an older version of "File1" on namespace "100" (e.g., SJID "4" and NSID "100"), and the edit operation can create a conflict as it edits a file that has since been modified. File journal interface 202 can detect this conflict created by the edit operation and reject the edit operation, attempt to reconcile the conflict, or provide the latest revisions to client device 150 and allow client device 150 to reconcile the conflict.

Each time file journal interface 202 sends linearized operations to client device 150, it can include a cursor as described here which identifies a respective position in journal 310 for each namespace and/or content item. Similarly, any time client device 150 sends an operation to file journal interface 202, it can include its latest cursor which file journal interface 202 can use to map the state at client device 150 with the state at journal 310.

Figure 4B:
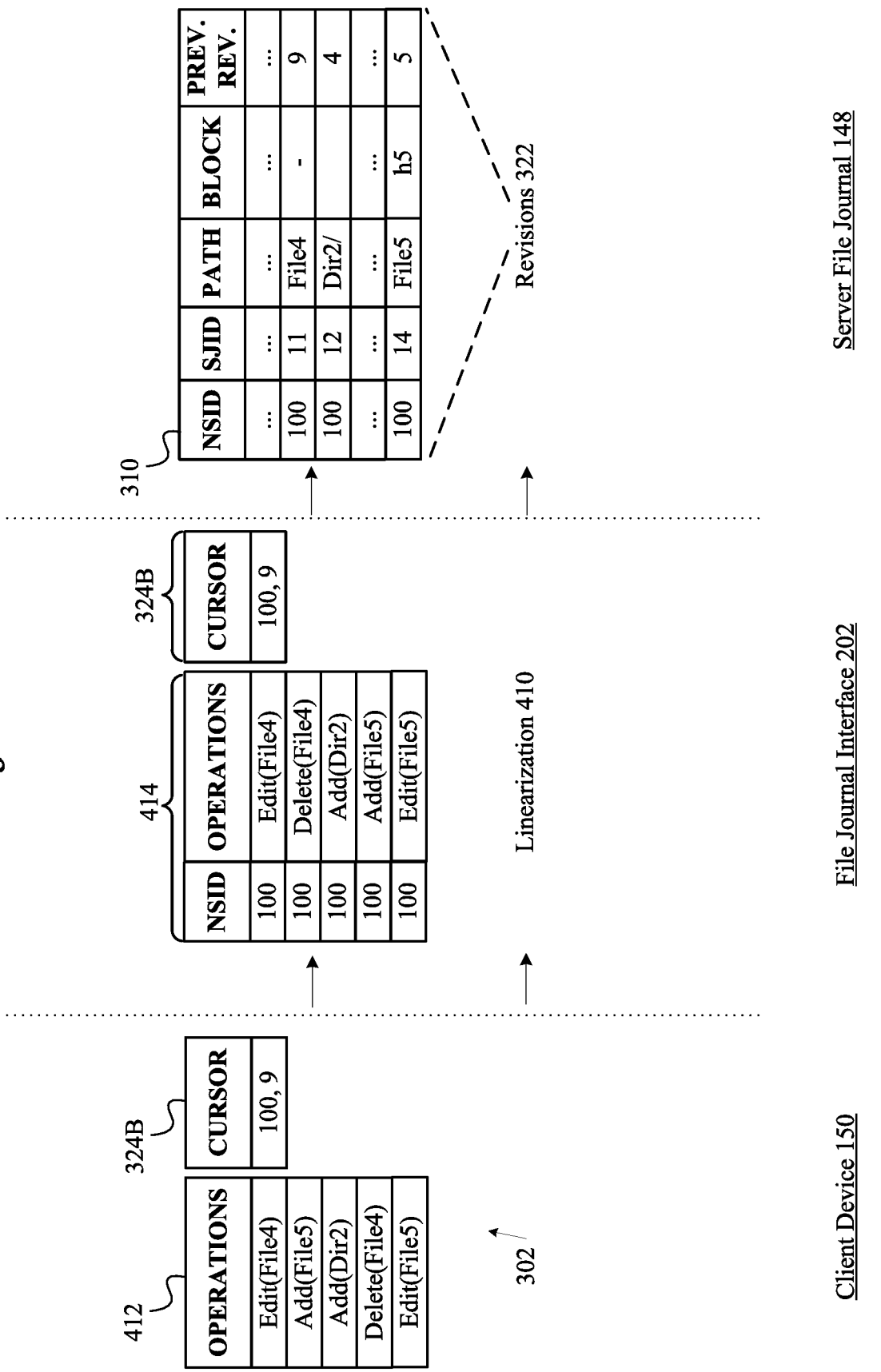
FIG. 4B shows a diagram of an example translation and linearization process for translating operations from a client device to revisions for a server file journal.

Journal 310 in this example depicts a journal with multiple namespaces. As previously noted, in some examples, server file journal 148 can maintain namespace-specific journals. Cursor 324B may include an SJID and NSID for each namespace, to indicate the latest revision for each namespace. Based on cursor 324B, file journal interface 200 can query multiple journals, in embodiments where multiple journals are maintained, and/or retrieve revisions from multiple journals, as further explained herein. [0173] FIG. 4B illustrates a diagram of an example process for linearization 410 to convert operations data 302 from client device 150 to revisions 322 for journal 310 at server file journal 148. Client device 150 can provide operations data 302 to file journal interface 202. Operations data 302 in this example includes operations 412 at client device 150, such as content item edit, add, rename, move, mount, or delete operations. In some cases, operations 412 can include multiple operations to a same content item. For example, operations 412 can include an operation editing "File4" on namespace "100" and an operation deleting "File4" from namespace "100".

Operations data 302 also includes cursor 324B previously received by client device 150 from file journal interface 202. Cursor 324B can identify the state (e.g., NSID and SJID) or latest revisions in journal 310 for one or more namespaces and/or content items. Client device 150 can provide cursor 324B to file journal interface 202 as a reference point for operations 412. In this example, cursor 324B provides the latest state for namespace "100", which is represented by SJID "9".

In some cases, the cursor is cryptographically signed by content management system 110, which allows file journal interface 202 to determine that the cursor has not been tampered with. Further, since client device 150 commit revisions to server file journal 148 when it has received the most recent revisions from server file journal 148 for the namespace, file journal interface 202 can accept that the last observed access permissions to the NS ID are still valid, and therefore client device 150 has access to the namespace.

File journal interface 202 can receive operations 412 and cursor 324B and perform linearization 410, to linearize and transform operations 412 from client device 150 to revisions 322 for journal 310. Based on operations 412, file journal interface 202 can generate log 414 of operations. Log 414 can include a list of operations from operations 412 mapped to respective namespace(s) in journal 310. In some cases, log 414 can include linearized operations (324A) generated from operations 412 as previously explained.

File journal interface 202 can use cursor 324B to verify that operations 412 reflect the latest state or revisions in journal 310 before updating journal 310 to reflect the operations in log 414. If file journal interface 202 confirms that cursor 324B reflects the latest state or revisions in journal 310 for the namespaces and/or content items associated with log 414, file journal interface 202 can add revisions 322 to journal 310 based on log 414. Revisions 322 can include the latest state or revision of each content item and/or namespace associated with the operations in log 414.

The operations in log 414 include an add and edit operation for "File5". Accordingly, revisions 322 include the edit of "File5", which file journal interface 202 can write to journal 310 as the latest state of "File5" (i.e., the state after the add and edit operations are applied to "File5" in a linearized fashion). The operations in log 414 also include an add operation for "Dir2" as well as edit and delete operations for "File4" on namespace "100". Revisions 322 can thus include an operation adding "Dir2" to namespace "100" and an operation deleting "File4" from namespace "100" as the latest state of "Dir2" and "File4" respectively.

In FIG. 4B, the revisions (322) depicted in journal 310 reflect the latest state of each content item ("File4", "File5", "Dir2") associated with operations 412. However, it should be noted that, in some cases, file journal interface 202 can write every revision represented by log 414 to journal 310 in order to reflect not only the latest state revision of each namespace and/or content item resulting from log 414, but also any previous states or revisions leading up to the latest state or revision. For example, file journal interface 202 can write a revision in journal 310 for the edit of "File4" and a subsequent revision for the delete of "File4", as opposed to only writing the edit of "File4" reflecting the latest state from operations 412, to indicate in journal 310 the full sequence of revisions of "File4" from operations 412.

File journal interface 202 can transform operations in log 414 to revisions 322 and update journal 310 to include revisions 322. File journal interface 202 can write revisions 322 to journal 310 at respective rows in journal 310. File journal interface 202 can add revisions 322 to the next available rows (e.g., SJIDs) in journal 310. In some cases, file journal interface 202 can add revisions 322 based on a relative order which can be determined based on linearization 410 and/or respective timestamps or clocks.

As shown in FIG. 4B, the delete operation of "File4" in namespace "100" is included in row "11" or SJID "11" for namespace "100". The revision in SJID "11" of journal 310 indicates that "File4" in namespace "100" has been deleted, as reflected by the minus symbol in the block field, and identifies SJID "9" as the previous revision in journal 310 for "File4" in namespace "100". The addition of "Dir2" and edit of "File5" are included respectively in rows or SJIDs 12 and 14.

Journal 310 in FIG. 4B has been updated to include revisions 322 based on log 414 and cursor 324B, to reflect the state of each content item modified in log 414. The path field at each row in journal 310 identifies a content item within the associated namespace (e.g., namespace "100"). The path field of a row is based on the file and namespace from a corresponding operation in log 414. The block field in journal 310 represents the content item. In some cases, the block field can include a hash of a respective content item or data block. The block field can be empty if the content item has been deleted and/or is a directory, folder, mount, etc.

When updating journal 310 to include revisions 322 based on log 414 and cursor 324B, translation service 204 can identify the path of each content item to include in the path field of journal 310. In some cases, translation service 204 can translate an identifier of a content item (e.g., File ID) to a path of the content item (e.g., /directory/filename). For example, client device 150 can use identifiers to identify content items (e.g., content items in operations data 302) without having to track or calculate respective paths for the content items. Journal 310 may instead use a content item's path to identify the content item. Translation service 204 can use the identifiers of content items from client device 150 to calculate the paths of the content items for journal 310, and update journal 310 using the paths calculated for the content items. Translation service 204 can also perform a reverse translation to obtain a content item's identifier based on the content item's path, and use the content item's identifier when referencing the content item in communications with client device 150.

For example, translation service 204 can use the path in journal 310, NSID in journal 310, and/or a directory field in journal 310 (or elsewhere in server file journal 148) to identify a content item and obtain an identifier (e.g., File ID) of that content item. If file journal interface 202 sends an update or information to client device 150 pertaining to that content item, file journal interface 202 can provide the identifier of the content item to client device 150, which client device 150 can use to identify the content item with or without the path of the content item.

As previously mentioned, before writing revisions 322 to journal 310 from operations 412, file journal interface 202 can check if cursor 324B reflects the latest state or revision in journal 310 for each namespace and/or content item associated with operations 412. In some cases, after confirming that cursor 324B reflects the latest state or revisions in journal 310, file journal interface 202 can also perform a second check to ensure that a revision generated from operations 412 will not conflict with an existing revision in journal 310. For example, if SJID "5" in namespace "100" at journal 310 represents a delete operation of "File5", the edit revision 322 of "File5" depicted in SJID "14" emitted from operations 412 received by file journal interface 202 from client device 150 would create a conflict by attempting to edit "File5" even though "File5" was deleted at SJID "5". Thus, file journal interface 202 can reject the edit operation and revision in this example, and communicate to client device 150 that the edit operation is invalid. File journal interface 202 can update cursor 324B and provide the updated cursor to client device 150 to inform client device 150 of the latest state or revision in journal 310 for "File5" (and any other content item) as necessary.

Figure 4C:
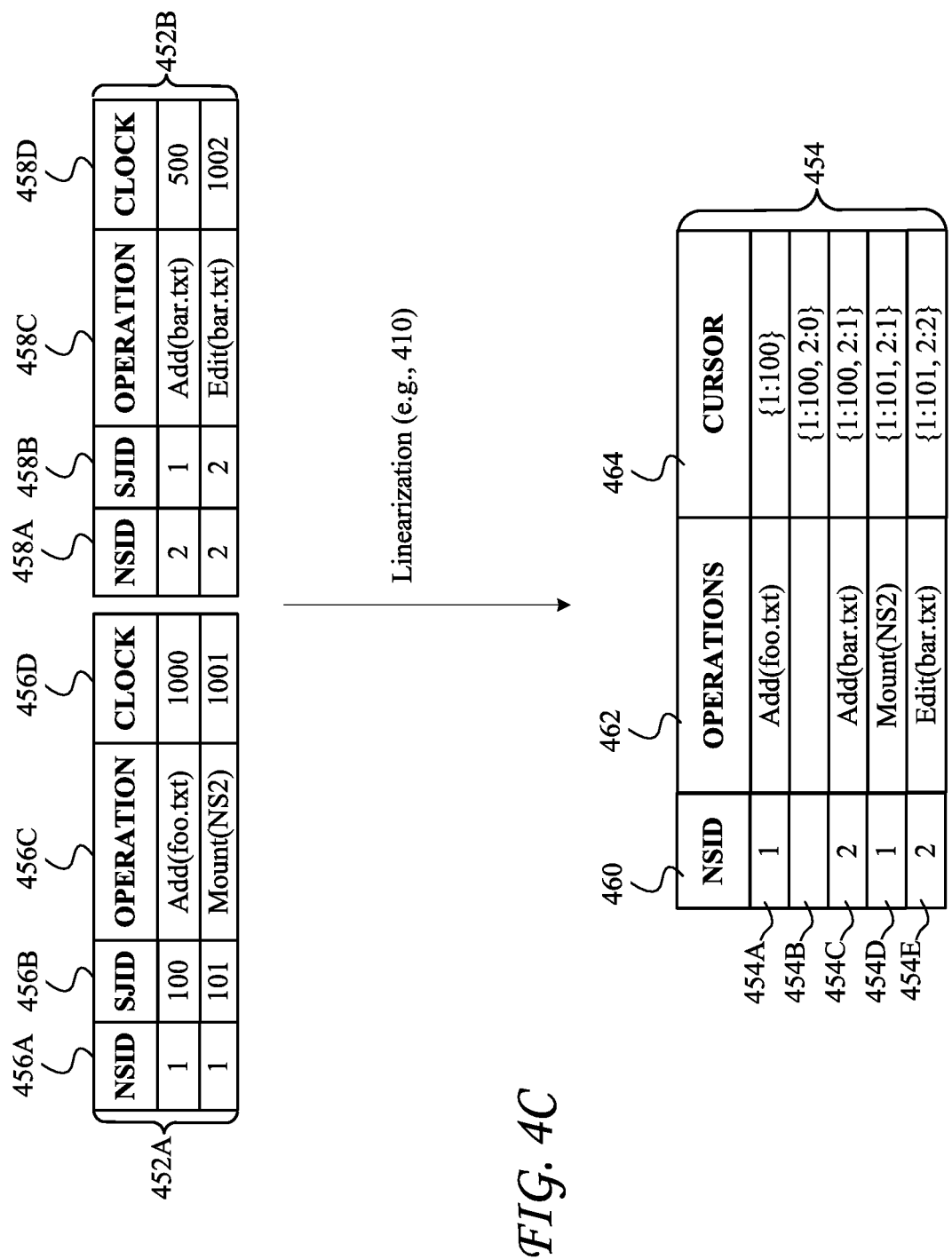
FIG. 4C shows an example linearization of cross-namespace operations.

FIG. 4C illustrates a diagram of an example linearization of cross-namespace operations. Cross-namespace linearization and cross-shard or cross-namespace listing can be performed via clock ordering. Tables 452A, 452B (collectively "452") illustrate a batch of cross-namespace operations for linearization. Tables 452A, 452B respectively include columns 456A, 458A, which are namespace (NSID) fields for identifying a namespace for the records in tables 452A, 452B, columns 456B, 458B are SJID fields for identifying rows or SJIDs in tables 452A, 452B for respective namespaces in columns 456A, 458A, columns 456C, 458C are operations fields for identifying operations associated with each SJID, and columns 456D, 458D are clock fields for identifying a timestamp associated with the operations in columns 456C, 458C.

In this example, table 452A depicts SJIDs "100" and "101" for NSID "1". SJID "100" is associated with an operation adding "foo.txt" to namespace "1" at timestamp "1000", and SJID "101" is associated with an operation mounting namespace "2" at timestamp "1001". Table 452B depicts SJIDs "1" and "2" for NSID "2". SJID "1" is associated with an operation adding "bar.txt" to namespace "2" at timestamp "500", and SJID "2" is associated with an operation editing "bar.txt" at timestamp "1002".

A linearizer (e.g., translation service 204) can obtain the batch of operations in tables 452 and emit a single stream of operations (462) with a cursor (464). The linearizer can identify all namespaces having at least one operation in tables 452 and linearize the operations for all namespaces based on the respective timestamps, NSIDs, SJIDs. In this example, the batch of operations in tables 452 linearize to the stream of operations shown in table 454.

Table 454 includes NSID column 460 which includes NSID fields for identifying the namespace of each operation, operations column 462 which includes operation fields for identifying the operations in table 454, and cursor column 464 which includes cursor fields for identifying a cursor state for each operation. Row 454A in table 454 includes the add operation from SJID "100" of namespace "1" in table 452A. The cursor state in cursor column 464 for row 454A is namespace "1" and SJID "100", which indicates the add operation corresponds to SJID "100" in namespace "1" shown in table 452A. Row 454B in table 454 does not include a value in NSID column 460 or operations column 462, but updates the cursor state in cursor column 464 to include a cross-namespace cursor state, which in this example adds SJID "0" for namespace "2".

Row 454C in table 454 includes the add operation from SJID "1" in namespace "2" shown in table 452A. The cursor state in cursor column 464 for row 454C includes the respective SJIDs "100" and "1" for namespaces "1" and "2" associated with the add operation in row 454C. As shown, the cursor state indicates the cursor is at SJID "100" in namespace "1" and SJID "1" in namespace "2". In other words, the row or SJID in namespace "1" has not increased as the add operation does not affect the state of namespace "1", but the row or SJID in namespace "2" has increased by one as the add operation represents a revision in namespace "2" and affects the state of namespace "2". Thus, the cursor state in row 454C tracks the respective SJIDs for namespace "1" and namespace "2" after the add operation at SJID "1" in namespace "2".

Row 454D in table 454 includes the mount operation at SJID "101" and namespace "1" at table 452A. The mount operation mounts namespace "2" at namespace "1". The mount operation increases the SJID in namespace "1" from "100" to "101", but does not increase the SJID in namespace "2". Accordingly, the cursor state in cursor column 464 for row 454D includes SJID "101" for namespace "1" and remains SJID "1" for namespace "2". This cursor state reflects the state and/or order at namespaces "1" and "2".

Row 454E in table 454 includes the edit operation at SJID "2" and namespace "2" in table 452A, which according to the respective timestamps of the mount and edit operations, is after the mount operation at SJID "101" in namespace "1". The cursor state in cursor column 464 of row 454E maintains the cursor state for namespace "1" at SJID "101" but increases the cursor state for namespace "2" to SJID "2".

As illustrated in table 454, operations 462 are listed as a stream of operations linearized based on causality and timestamps across namespaces "1" and "2". Once operations 462 are linearized in table 454 to reflect cross-namespace causality and sequencing, operations 462 can be converted to revisions in server file journal 148 (e.g., revisions 322 in journal 310) and written to server file journal 148.

For example, a journal for namespace "1" in server file journal 148 can be updated to include a revision at SJID "100" representing the add operation adding "foo.txt" to namespace "1", and a revision at SJID "101" representing the mount operation mounting namespace "2" on namespace "1". Moreover, a journal for namespace "2" in server file journal 148 can be updated to include a revision at SJID "1" representing the add operation adding "bar.txt" to namespace "2", and a revision at SJID "2" representing the edit operation editing "bar.txt" on namespace "2".

Namespace Views and Snapshots

Figure 5A:
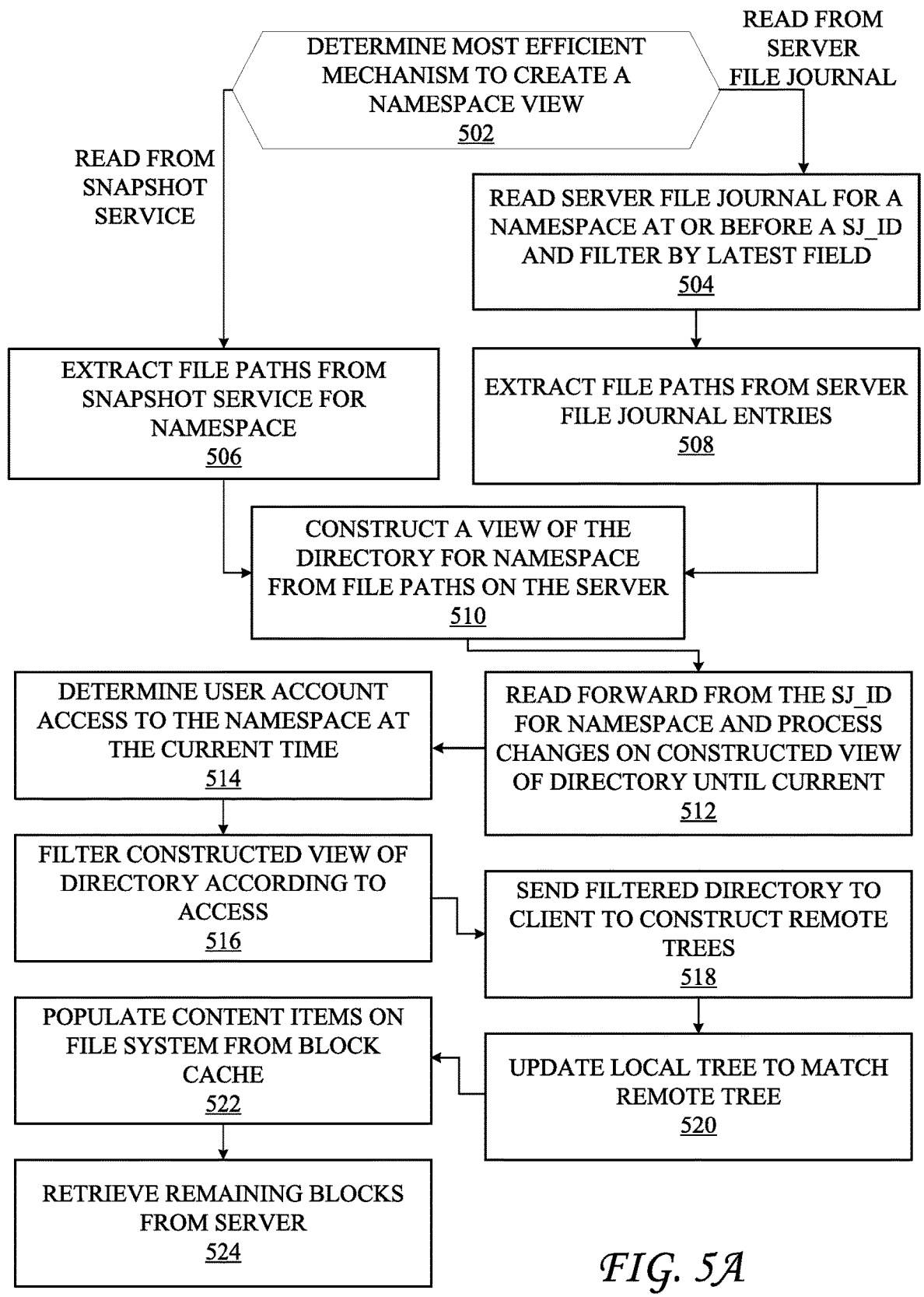
FIG. 5A shows an example method of creating a namespace view in accordance with some aspects of the present technology.

FIG. 5A illustrates an example process for constructing an up-to-date namespace view by content management system 110. First content management system 110 can determine (502) a most efficient mechanism to create namespace view.

A first method is to choose an arbitrary point in server file journal from which to read for the namespace, and to identify all paths in the namespace at that point in time. As addressed above, server file journal 148 is a collection of rows describing revisions to content items. The rows are organized by namespace identifiers and server file journal identifiers. The combination of a namespace identifier and a server file journal identifier (ns_id, sj_id) corresponds to a specific row in server file journal 148 and a specific revision within the namespace that is identified. Content management system 110 can read (504) from server file journal 148 for a specific namespace ID at or before a recent row in server file journal 148. The revisions in server file journal 148 can be filtered by a latest tag, which identifies rows in server file journal 148 as being the last revision to any specific path. Accordingly, by reading all rows of server file journal 148 for a specified namespace having the latest tag applied will yield a list of revisions that identify every file path for the specified namespace. These file paths can be extracted (508) from the server file journal 148 entries and used to construct (510) a namespace view directory structure.

The second method is to read from a snapshot service provided by content storage service 116, which stores condensed snapshots of a namespace in content storage 142 at a recent point in time. The snapshot service is described in more detail below, however, by way of introduction, the snapshot service stores a condensed view of a namespace including all of the content items in it—for a recent point in time. Large namespaces may need to be sharded over multiple discs, and shard names can include a hash that identifies each file path stored on that shard. A benefit of storing path information in the shard names is that the shards don't need to be opened to extract file paths, and you can use file path information to only open the shard(s) you are looking for when using the snapshot service. Each snapshot is current for a particular namespace at a specific server file journal ID (ns is, sj_id).

Returning to FIG. 5A, file paths can be extracted (506) from the snapshot service for a namespace, and from these file paths are used to construct (510) a namespace view directory structure.

Content management system 110 can heuristically determine (502) which mechanism is likely to be the most efficient mechanism. If the namespace is not very active, and therefore there are not too many rows of revisions in server file journal 148 for any given content item, content management system may decide that the server file journal method is preferred. If however the namespace is very active, or some other factor causes content management system 110 to determine that it is more efficient to read from snapshot service, that method can be used.

Both mechanisms result in using extracted file paths to construct (510) a namespace view directory structure for a particular point in time in the past. In the server file journal method, content management system reads entries from server file journal 148 at or before a given server file journal ID, and in the snapshot method, the paths were extracted from a snapshot that was current as of a given server file journal ID. Accordingly content management system 110 can bring the namespace view into a more current state by processing revisions (512) stored in rows in server file journal 148 that are after the server file journal ID that was used when paths were extracted from server file journal entries or snapshot service as described above.

Now that the server has a current view of a particular namespace that view needs to be filtered for the user account requesting the namespace view since, as described above, a given user account may not be able to see every content item in a namespace. Content management system can determine (514) access for the user account in the namespace using principles describe with respect to FIG. 4 above, and can filter (516) the constructed namespace view according to access permissions for the user account. Content management system 110 can send (518) the filtered namespace view two client device 1502 construct a remote tree.

Client device 150 can update (520) its local tree to match the remote tree. When updating its local tree, creating new directories is a relatively easy task however; storing the content items can require downloading a large amount of data. Fortunately, any content items already stored on client device do not need to be downloaded. Client device 150 can recreate the content items using from a block cache on client device 150 that contains blocks for deleted content items and comments for the content items. Using those already downloaded blocks is more efficient than downloading the blocks. However, any blocks not found in the block cache need to be downloaded (524) from the server.

The process illustrated in FIG. 5A can be repeated for each namespace mounted in organization directory 532.

Figure 5B:
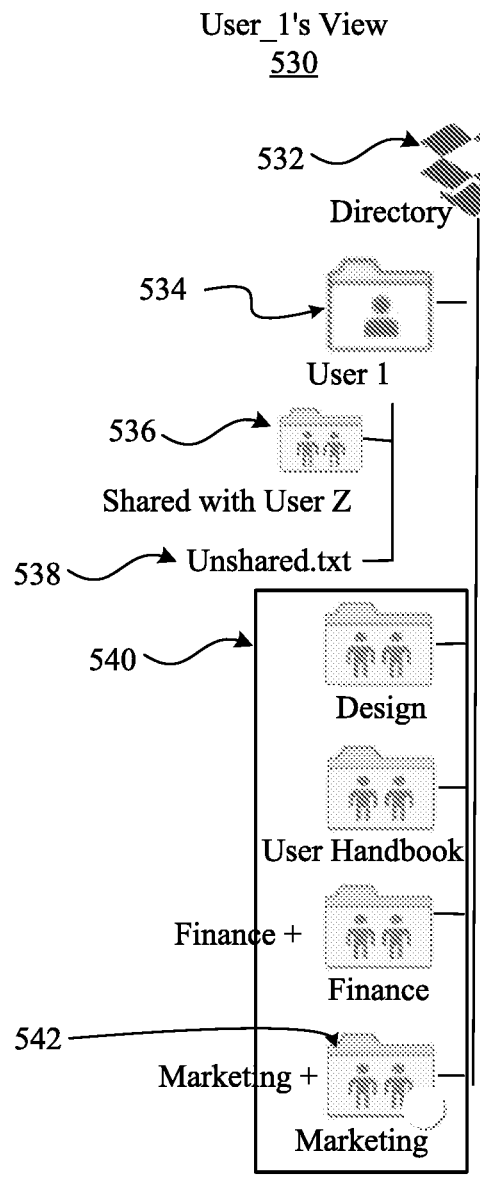
FIG. 5B shows an example constructed namespace directory in accordance with some aspects of the present technology.

FIG. 5B illustrates example information used to construct a user's (User 1) view (530) of shared directory 532. For any namespace, the namespace view builder process described with respect to FIG. 5A can result in extracted paths for the namespace that are filtered according to user 1's access rights. View 530 illustrates paths in the namespace for user account folder 534 of user 1. This can be used to determine a directory tree for the namespace, and the process can be repeated for each namespace. Each namespace can be located within organization directory based on information from the mount table.

View 530 for user 1 provides a view of namespaces and shared folders on content management system 110 from the perspective of user 1. As illustrated, view 530 includes user account folder 534 for user 1, and shared folders 540, which are visible to other user accounts on content management system 110.

Content management system 110 can provide a variety of access levels including: no access (user account can't access or see a folder); view name only (allows a user account to view the existence of a folder), traversal (allows a user account to view the existence of the folder, and open the folder, but does not allow the user account to see any folder(s) or content item(s) with the folder other than a specified folder(s) or content item(s)); read access (can view and open, but cannot change any content item or write to the folder); write access (can modify the folder or content item), etc. In some cases, these access levels can be used by content management system 110 to determine that a folder (such as those of user 1) should not be synchronized with client device 150. In such cases, client device 150 for user 1 may not be aware of the existence of other user account folders.

The access levels can thus determine what content items, including folders, user 1 can see, access, navigate, modify, etc. For example, in view 530, shared folders 540 include confidential shared folder 542. Confidential shared folder 542 is a confidential folder, which may be seen by members of directory 532 that do not have access to confidential shared folder 542, but such members of directory 532 which do not have access to confidential shared folder 542 may not be able to view content items in confidential shared folder 542.

In some instances, it can be useful to have a complete namespace saved together in one place. For example, in instances when an entire namespace needs to be constructed, such as when a namespace is shared with a new account, when a new client device is added to user account, or when transiting to an organization directory, it can be more efficient to download an entire namespace from one place instead of reading each revision from server file journal 148 and using content storage service 116 to extract blocks making up a content item from content storage 142.

Accordingly, content storage service 116 can include a snapshot service that stores namespace views at a point in time, or more specifically, as of a server journal identifier (SJID) for that namespace. A namespace view is a compressed snapshot of the contents of a namespace at that namespace (NSID). The snapshot includes the contents of a namespace, and may not be filtered for a user account's permissions, or hidden files, etc. Namespace snapshots may be large and need to be divided into pages. Each page can include representations of paths within the namespace (e.g., a subset of paths that make up the namespace).

Since each page is compressed, it may be preferable to avoid opening a page on content management system 110, where it could potentially utilize a large amount of memory. Accordingly, in some cases, each path and prefix of the path can be hashed, and the hashes can be stored in the name of the snapshot page. Therefore, it is possible to search for the hash of a path without having to open pages of the snapshot to find that path. This optimization also works in reverse where the path names can be extracted from the snapshot pages to reconstruct a directory tree for a namespace.

To reconstruct a directory tree, the paths can be topologically sorted (parent prefix hash 4 path hash). The initial set of paths with no dependencies are the children of the root of the namespace, and the full path (e.g., "/foo/bar/baz") can be reconstructed from the set of paths (e.g., "/foo," "/foo" 4 "/foo/bar", "/foo/bar" 4"/foo/bar/baz"). Each path state along this set contains the last component of its path, e.g. "foo" "bar" "baz".

As addressed above, the namespace snapshots are not filtered for user account access permissions. Instead, after constructing the directory tree from the namespace, the paths in the directory tree can be filtered according to user account access permissions. User account access permissions can be obtained from content management system 110. Each path to which the user account has access to can be designated as allowed, e.g., represent the set of filters as follows:

ALLOW ONLY (hash1, hash2, hash3, . . . )
ALLOW MOUNT (hash4, hash5, . . . )

Each filter can contain full path hashes. If a filter is specified, content storage service can filter the paths out at runtime without doing a full topological sort. This allows only looking at data in a single page of a snapshot to apply the filters to that page.

Tree Data Structures

Figure 6A:
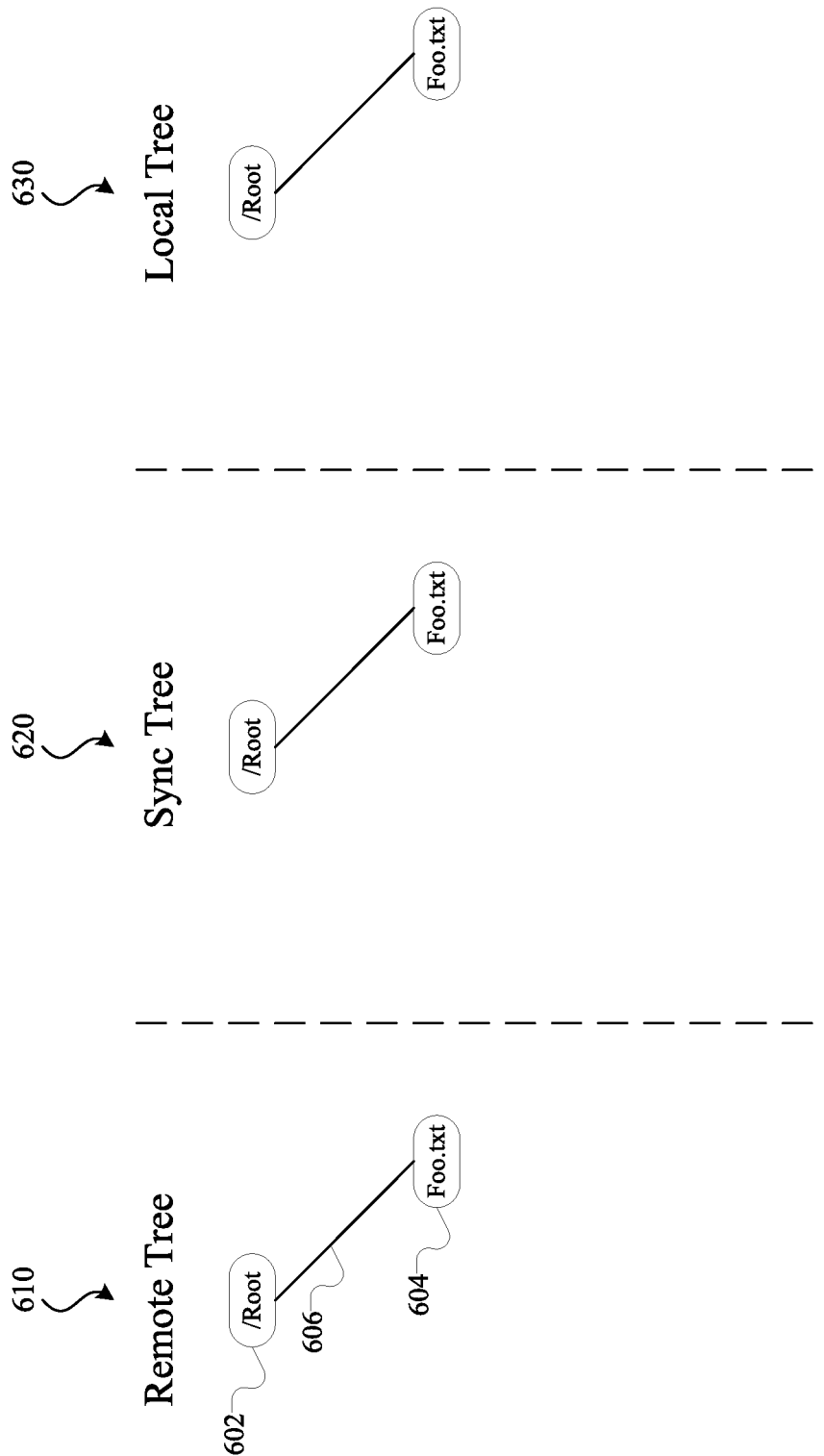
FIG. 6A shows an example of tree data structures in accordance with various aspects.

FIG. 6A shows an example of tree data structures, in accordance with various embodiments. The tree data structures may be stored at the client device and managed by a client synchronization service such as client synchronization service 156. In FIG. 6A, the tree data structures are shown including remote tree 610, sync tree 620, and local tree 630.

Remote tree 610 represents a server state or the state of content items stored remotely from the client device (e.g., on a server of the content management system). Local tree 630 represents a file system state or the state of the corresponding content items stored locally on the client device. Sync tree 620 represents a merge base for the local tree and the remote tree. The merge base may be thought of as a common ancestor of the local tree and the remote tree or a last known synced state between the local tree and the remote tree.

Each tree data structure (e.g., remote tree 610, sync tree 620, or local tree 630) may include one or more nodes. Each node may have one or more child nodes and the parent-child relationship is represented by an edge. For example, remote tree 610 includes nodes 602 and 604. Node 602 is a parent of node 604 and node 604 is a child of node 602. This parent-child relationship is represented by edge 606. A root node, such as root node 602, does not have a parent node. A leaf node, such as node 604, does not have a child node.

Each node in a tree data structure may represent a content item (e.g., a file, document, folder, etc.). For example, root node 602 may represent the root folder associated with the content management system and node 604 may represent a file (e.g., a text file named "Foo.txt") located in that root folder. Each node in a tree data structure may contain data such as, for example, a directory file identifier ("DirFileID") specifying the file identifier of a parent node of the content item, a file name for the content item, a file identifier for the content item, and metadata for the content item.

As described above, a client synchronization service may determine that the server state and the file system state of the client device are synchronized when all 3 trees (e.g., remote tree 610, sync tree 620, and local tree 630) are identical. In other words, the trees are in sync when their tree structures and the relationships that they express are identical and the data contained in their nodes are identical as well. Conversely, the trees are not in sync if the 3 trees are not identical. In the example scenario illustrated in FIG. 3, remote tree 610, sync tree 620, and local tree 630 are shown as being identical and in sync and, as a result, the server state and the file system state are synchronized.

Tracking Changes Using Tree Data Structures

Figure 6B:
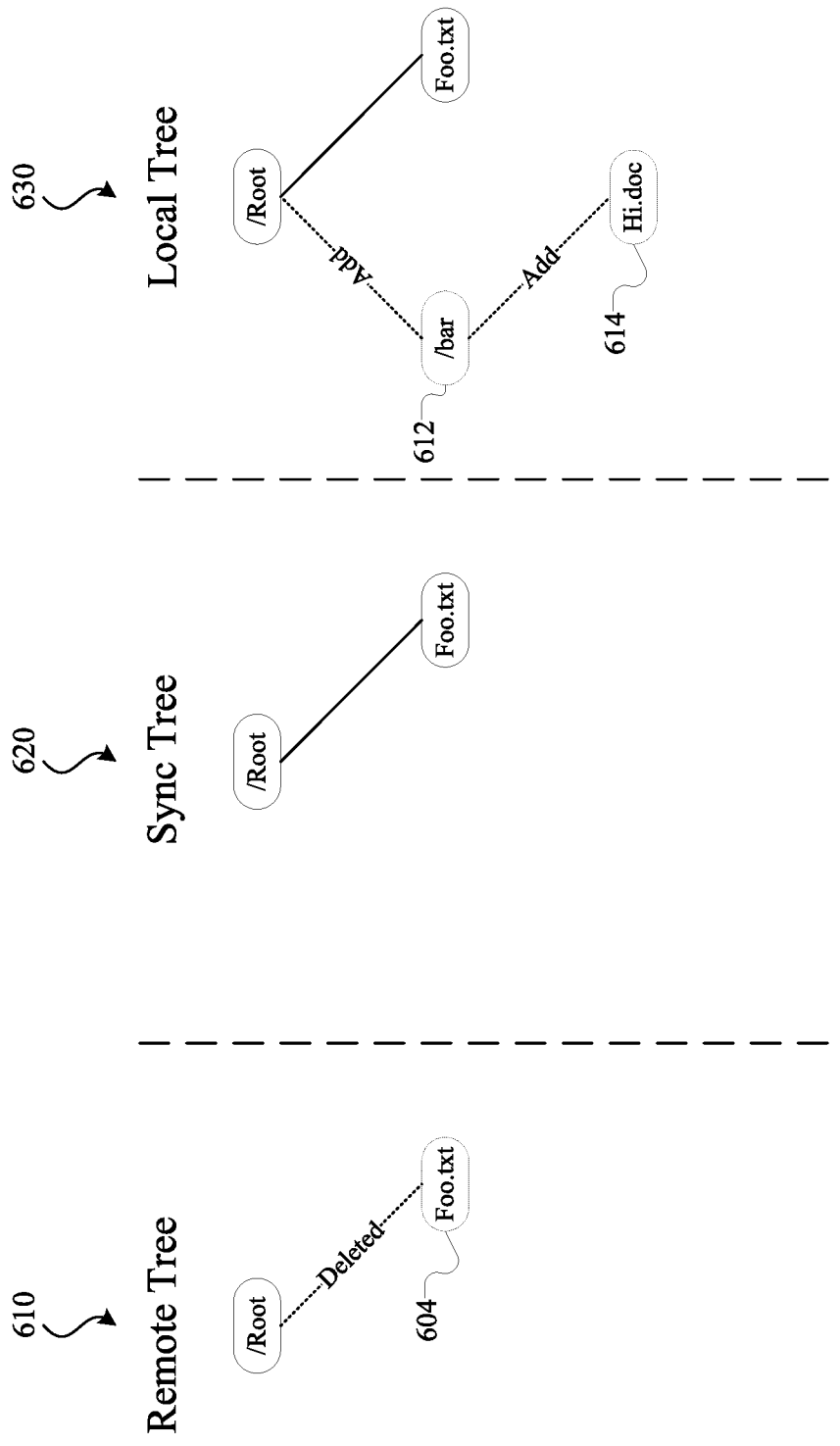
FIG. 6B shows an example of an update to the tree data structures shown in FIG. 6A.

FIG. 6B shows an example of tree data structures, in accordance with various embodiments. This example shows a scenario after a previously synchronized state, such as the scenario illustrated in FIG. 6A, additional actions are performed on the content items represented in the trees to modify the content items such that the trees are no longer in sync. Sync tree 620 maintains a representation of the previously known synchronized state and may be used by the client synchronization service to identify the differences between the server state and the file system state as well as generate operations for the content management system and/or the client device to perform to converge so that the server state and the file system state are synchronized.

For example, a user (the same user as the user associated with the client device or a different user with access to the content item) may make modifications to the "foo.txt" content item stored by the content management system. This content item is represented by node 604 in remote tree 610. The modification shown in the remote tree 610 is a removal (e.g., a removal of the content item from a space managed by the content management system) or delete of the foo.txt content item. These modifications may be performed, for example, on another client device and the modifications were synced to the content item stored by the content management system or content item stored by the content management system via a web browser.

When the change is made on the content management system, the content management system generates modification data specifying the change made and transmits the modification data to the client synchronization service on the client device. The client synchronization service updates the remote tree representing the server state for the content items stored by the content management system based on the modification data. For example, in remote tree 610, node 604 representing the foo.txt content item is shown as deleted.

The client synchronization service may identify a difference between remote tree 610 and sync tree 620 and, as a result, determine that a modification of the content items at the content management system has caused the server state and the file system state to no longer be in sync. The client synchronization service may further generate and execute a sequence of operations for the content items stored on the client device that are configured to converge the server state and the file system state so that they will be in sync.

Additionally or alternatively, a user (the same user as the user associated with modifications at the content management system or a different user with access to the content item) may make modifications to the content items stored locally on the client device that are associated with the content management system. For example, the user may add a folder "/bar" to the "/root" folder and add a "Hi.doc" document to the "/bar" folder.

When the change is made on the client device, the client device (e.g., client synchronization service 156 or client application 152) generates modification data specifying the change made and passes the modification data to the client synchronization service on the client device. The client synchronization service updates the local tree representing the file system state for the content items stored on the client device based on the modification data. For example, in local tree 630, node 612 and node 614 are shown as added. Node 612 and node 614 represent the "/bar" folder and the "Hi.doc" document respectively.

The client synchronization service may identify a difference between local tree 630 and sync tree 620 and, as a result, determine that a modification of the content items at the client device has caused the server state and the file system state to no longer be in sync. The client synchronization service may further generate a sequence of operations for the content items stored by the content management system that are configured to converge the server state and the file system state so that they will be in sync. This sequence of operations may be transmitted to the content management system for execution.

As seen in FIG. 6B, modifications to content items stored on the client device and content items stored by the content management system may occur at substantially the same time or within a particular time period. These modifications can be reflected in the tree data structures and used by the client synchronization service to generate sequences of operations for the client device and for the content management system in parallel. In other scenarios, however, modifications may not necessarily occur within the same time period and sequences of operations may be generated in an as-needed manner. Furthermore, although FIG. 6B illustrates scenarios for adding content items and deleting content items, other types of modifications such as, editing, renaming, copying, or moving content items are also supported.

According to various embodiments, identifying a difference between two tree data structures and generating operations may involve checking each node in both tree data structures and determining whether an action has been performed on the node. The actions may include, for example, the addition of the node, the deletion of the node, the editing of the node, or the moving of the node. These actions may then be used to generate the sequence of operations configured to converge the server state and the file system state.

For example, if the two tree data structures are a sync tree and a remote tree, the client synchronization service may identify each node in the sync tree by, for example, requesting the file identifiers of all nodes in the sync tree. For each node or file identifier for the node in the sync tree, the client synchronization service may determine if the node or file identifier is also in the remote tree. A node or file identifier in the sync tree that is not found in the remote tree may indicate that the node has been deleted from the server state that is represented by the remote tree. Accordingly, the client synchronization service may determine that a delete action has occurred on the remote tree. If the node or file identifier for the node is found in the remote tree, the client synchronization service may check whether the node in the remote tree has been edited or moved.

To determine whether the node in the remote tree has been edited with respect to the node in the sync tree, the client synchronization service may compare the metadata for the node in the sync tree with the metadata for the corresponding node (e.g., the node with the same file identifier) in the remote tree. The metadata may include information that may be used to determine whether the content item represented by the node has been edited. For example, the metadata may include one or more hash values that are generated based on the data in the content item or a portion thereof. The metadata may additionally or alternatively include a size value, a last modified value, or other value for the content item. The metadata for the node in the client synchronization service may be compared with the metadata for the node in the remote tree. If the metadata do not match, an edit of the content item may have been edited in the server state represented by the remote tree. Accordingly, the client synchronization service may determine that an edit action has occurred for the node on the remote tree. If the metadata matches, no edit may have occurred.

To determine whether the node in the remote tree has been moved, the client synchronization service may compare the location for the node in the sync tree with the location for the corresponding node (e.g., the node with the same file identifier) in the remote tree. The location may include, for example, a path where the node is located, a file name, and/or a directory file identifier ("DirFileID") specifying the file identifier of the node's parent. If the locations match, no move may have occurred. On the other hand, if the locations do not match, a move of the content item may have occurred in the server state represented by the remote tree. Accordingly, the client synchronization service may determine that a move action has occurred for the node on the remote tree.

To determine whether a node has been added to the remote tree, the client synchronization service may identify any nodes or file identifiers in the remote tree that are not found in the sync tree. If a node or file identifier is found in the remote tree and not found in the sync tree, the client synchronization service may determine that an add action of this node has occurred on the remote tree representing the server state.

Although the example above is described with respect to the sync tree and the remote tree, in other embodiments, a similar process may occur with the sync tree and a local tree in order to identify a difference between the sync tree and the local tree and determine which actions have occurred on the local tree representing the file system state.

File ID Allocation and Reassignment

Figure 6C:
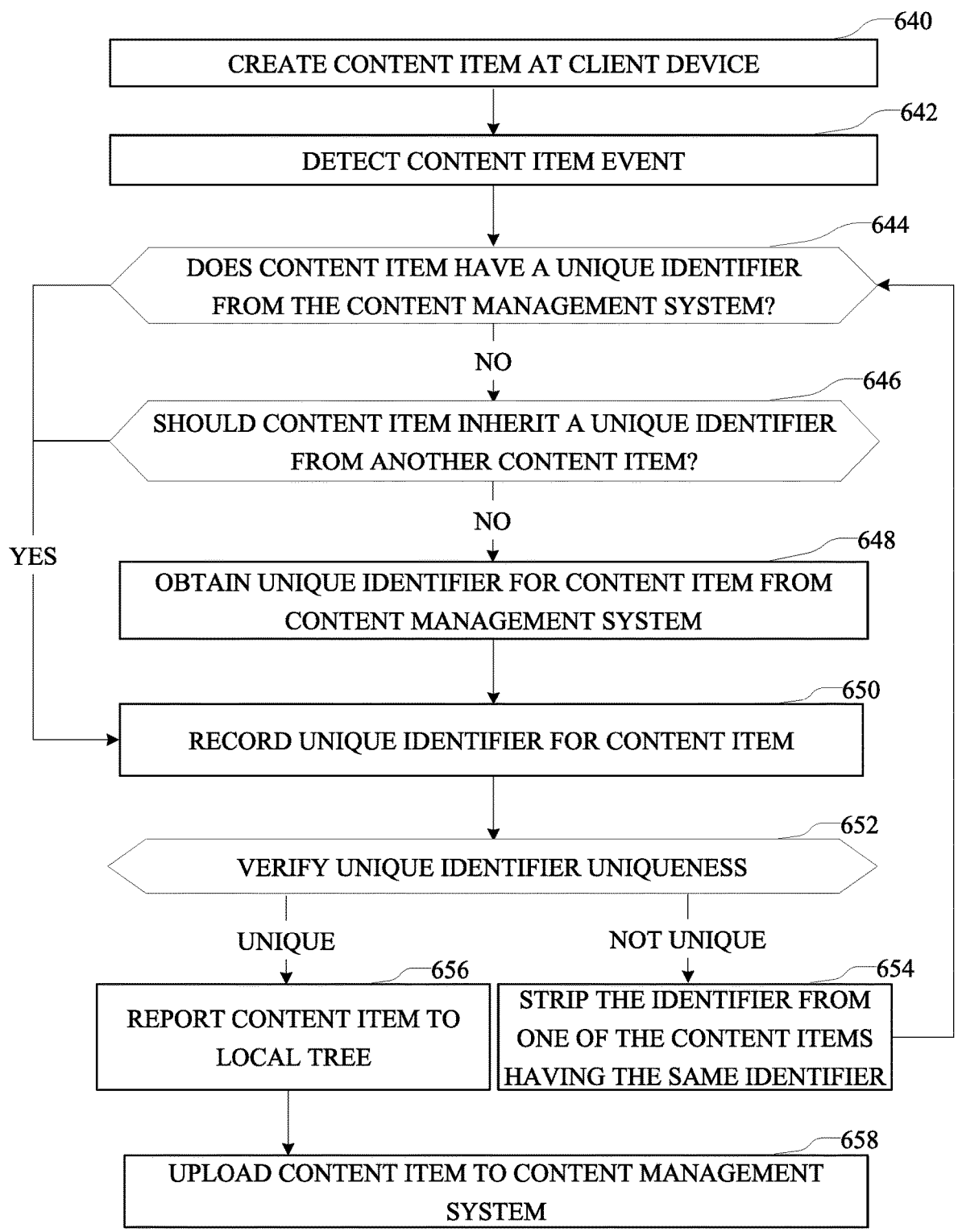
FIG. 6C shows an example method for allocating and reassigning unique identifiers for content items created at a client device and synchronized between the client device and a content management system.

FIG. 6C shows an example method for allocating and reassigning unique identifiers for content items created at client device 150 and synchronized between client device 150 and content management system 110. Although the methods and processes described herein may be shown with certain steps and operations in a particular order, additional, fewer, or alternative steps and operations performed in similar or alternative orders, or in parallel, are within the scope of various embodiments unless otherwise stated. The method may be implemented by a system such as, for example, client synchronization service 156 on client device 150.

At step 640, client device 150 creates a content item. At step 642, client application 152 (e.g., via client synchronization service 156) detects a content item event based on the content item created at step 640.

At step 644, client application 152 determines whether the content item has a unique identifier (e.g., File ID) from content management system 110. The unique identifier can refer to a globally unique identifier assigned and/or stored at content management system 110. Content management system 110 may assign unique identifiers for content items stored on content management system 110 to uniquely identify each content item at content management system 110 and any respective synchronized copies on client devices (e.g., client device 150). In some cases, a unique identifier can be associated with a particular namespace(s) on content management system 110 corresponding to the content item assigned to the unique identifier. However, in other cases, the unique identifiers may be agnostic or independent of namespaces.

Moreover, the unique identifiers assigned by content management system 110 can be created by content management system 110 and differ from any local content identifiers generated by client devices for specific content items stored and/or generated at the client devices, such as a local filesystem identifier or a local identifier generated by the operating system at a client device.

If client application 152 determines that the content item already has a unique identifier from content management system 110, client application 152 proceeds to step 650 described below. If client application 152 determines that the content item does not have a unique identifier from content management system 110, client application 152 proceeds to step 646, where it determines if the content item should inherit a unique identifier from another content item. In some cases, this process for determining whether the content item should inherit a unique identifier refers to "path parenting", and involves comparing the path of the content item with the path of another content item.

For example, if content item "A" is created at step 640 for path "/Root/Directory1/" and client application 152 determines that a previous content item with a unique identifier of "123" was previously or recently stored at "/Root/Directory1/", client application 152 may determine that the new content item, content item "A", is a version or copy of the previous content item with the unique identifier of "123" or that the previous content item was moved out of "/Root/Directory1/" and content item "A" represents the content item being re-added or moved back to "Root/Directory1", and therefore should inherit the unique identifier "123" of the previous content item.

In some cases, client application 152 determines that the content item should inherit a unique identifier from another content item that client application 152 deems to be a previous version or copy of the content item. For example, when a content item stored in a specific location (e.g., path) on a client device is edited or modified, some applications or operating systems may move the content item to a temporary location on the client device and then add the edited or modified content item back to the specific location of the content item. Thus, when client application 152 detects that a content item was created and does not have a unique identifier, and also identifies another content item that previously had the same path and/or name as the content item created, client application 152 may determine that the other content item was moved and is related or represents the same content item as the new content item. Client application 152 may therefore determine that the new content item should inherit the unique identifier of the other content item.

In some examples, client application 152 can compare metadata of the content item with metadata of other content items on client device 150 to determine if the content item should inherit the unique identifier of another content item—either because the content items are deemed to be related, equivalent, versions of each other, etc. The metadata used to compare the content items can include, for example, respective content item paths, filenames, directory identifiers, directory names, namespace identifiers (NSIDs), journal identifiers (SJIDs), revision identifiers, etc. A match of some or all of the metadata of two content items can trigger a determination that the newly-created content item should be assigned the unique identifier of the other content item. For example, if content item "A" created at step 640 has the same path, filename, directory identifier, NSID, and/or SJID as content item "B" at client device 150, client application 152 may assign a current, unique identifier of content item "B" to content item "A".

If client application 152 determines at step 646 that the content item should inherit the unique identifier of another content item, client application 152 proceeds to step 650 further described below. If client application 152 determines at step 646 that the content item should not inherit a unique identifier from another content item on client device 150 (e.g., because it fails to find a content item associated with the same path, filename, and/or any other portion of metadata), client application 152 proceeds to step 648 where it obtains a unique identifier for the content item from content management system 110.

At step 648, client application 152 can request a unique identifier for the content item from content management system 110 and receive a unique identifier assigned to the content item by content management system 110. The unique identifier can be unique across content management system 110 as previously explained. Thus, the unique identifier can be used to uniquely identify the content item at content management system 110 and client device 150.

At step 650, when the content item has a unique identifier, client application 152 records the unique identifier for the content item. For example, client application 152 can write the unique identifier as metadata for the content item. In some cases, client application 152 appends the unique identifier to the content item or assigns the unique identifier to content item as an attribute, such as an extended attributed (xattr).

At step 652, client application 152 verifies that the unique identifier recorded for the content item is unique at content management system 110. As previously mentioned, content management system 110 can require that identifiers assigned to content items be unique at content management system 110 in order to allow the identifier to uniquely identify each content item at content management system 110. Content management system 110 can use the unique identifier to track, manage, synchronize, modify, and recognize content items. This uniqueness attribute can be verified by client application 152 at step 652 to prevent inadvertently duplicating identifiers or creating conflicts or errors as a result of a same identifier being assigned to more than one content item.

To verify the uniqueness of the unique identifier, client application 152 can notify content management system 110 of the unique identifier associated with the content item and request verification or acknowledgment from content management system 110 that the unique identifier is indeed unique at content management system 110. The request for verification or acknowledgement from client application 152 to content management system 110 can identify the unique identifier and may include any other information that may help content management system 110 verify uniqueness. For example, in some cases, the request for verification or acknowledgement from client application 152 to content management system 110 can also include a block or blocklist associated with the content item, a hash of at least a portion of the content item, and/or metadata associated with the content item, such as a path, a directory identifier, a filename, etc.

Content management system 110 can receive the request from client application 152 and search for the unique identifier in content management system 110. For example, content management system 110 can query server file journal 148 for any records containing the unique identifier. If content management system 110 identifies a matching identifier assigned to another content item and/or contained in a record on server file journal 148, content management system 110 can determine that the unique identifier is not unique—at least as it pertains to the content item and any other content items on content management system 110. Content management system 110 can notify client application 152 that the unique identifier is not unique or failed a uniqueness test. In some cases, content management system 110 can also identify which other content item(s) the identifier is assigned to, as well as any information or metadata about those content items.

If content management system 110 does not identify a matching identifier assigned to another content item or contained in a record on server file journal 148, content management system 110 can acknowledge or verify that the unique identifier is indeed unique. In some cases, content management 110 can perform an additional search or verification before acknowledging to client application 152 the uniqueness of the unique identifier. For example, content management system 110 can search records in server file journal 148 for metadata associated with the content item, such as a path, filename, etc.

At step 654, if client application 152 determines that the unique identifier is not unique across content management system 110 (i.e., uniqueness verification fails), client application 152 can strip the identifier from one of the content items having the identifier and causing a duplicate identifier. For example, client application 152 can remove or unassign the identifier from the content item or from the other content item determined to have the same identifier. In some cases, client application 152 can delete an attribute (e.g., xattr), metadata, or tag containing the identifier from one of the content items having the same identifier in order to strip the identifier from that content item.

Once client application 152 has stripped the identifier from one of the content items having the same identifier, client application 152 returns to step 644 to process the content item that was stripped of the identifier. At step 644, client application 152 can process the content item without an identifier and proceed through steps 644, 646, 648, 650, 652 to obtain a unique identifier for such content item. The logic and heuristics from steps 644, 646, 648, 650, 652 allow client application 152 to obtain and verify a unique identifier for the content item and avoid duplicate identifiers.

In some cases, steps 644, 646, 648, 650, 652 can also be used to resurrect a content item that has been moved or deleted from a location. For example, if a content item needs to be re-added or moved at client device 150, client application 152 can perform steps 644, 646, 648, 650, 652 to obtain a unique identifier for the content item and store the content item at a particular path for the content item. As previously explained, in some examples, the path and/or content item identifier can be determined by analyzing content items previously associated with the path or filename of the content item.

At step 656, if client application 152 determines that the unique identifier is unique across content management system 110 (i.e., uniqueness verification succeeds), client application 152 can report the content item to local tree 630. Here, client application 152 can add a node to local tree 630 representing the content item. The node in local tree 630 for the content item can identify the content item based on the unique identifier and may include other metadata associated with the content item, such as a path, a directory identifier, a filename, a timestamp, a size, a hash, etc.

At step 658, client application 152 can upload the content item to content management system 110 with the unique identifier for the content item. When uploading the content item, client application 152 can provide the unique identifier in order to identify the content item to content management system 110. Client application 152 can provide to content management system 110 the actual data or blocks (e.g., 220A, 220B, 220C, 220N) of the content item, the unique identifier, and any other metadata such as a path, directory identifier, filename, namespace identifier, timestamp, etc.

In some cases, client application 152 can upload the content item (e.g., 220) and/or the blocks (e.g, 220A, 220B, 220C, 220N) of the content item to content storage interface 206 for storage on content storage 142, and send operations data (e.g., 302) to file journal interface 202 including a cursor (e.g., 324B) indicating the position of client device 150 at server file journal 148 and one or more operations (e.g., 412) identifying the add operation adding the content item at client device 150. File journal interface 202 can use the cursor and the one or more operations from client application 152 as previously explained to add a revision to server file journal 148 (e.g., revision 322 to journal 310) indicating the content item was added at client device 150. As previously explained, file journal interface 202 can verify that the cursor from client device 150 is "at head", meaning it reflects the latest revisions or state at server file journal 148, and convert the one or more operations to revisions for server file journal 148. Moreover, content storage interface 206 can receive the content item (e.g., 220) and/or the blocks (e.g, 220A, 220B, 220C, 220N), upload the content item (e.g., 220) and/or the blocks (e.g, 220A, 220B, 220C, 220N) to content storage 142, and record or index the content item (e.g., 220) and/or the blocks (e.g, 220A, 220B, 220C, 220N) in storage index 210.

When uploading the content item, client application 152 commit the addition of the content item to content management system 110 as further described below with reference to FIG. 13A. Committing the operation (e.g., the add of the content item at client device 150) allows client application 152 to report or record a revision to content management system 110 (e.g., server file journal 148) tracking the add of the content item. While uploading the content item and/or committing the add operation to content management system 110, client application 152 can implement crash safety procedures to prevent errors and enable recovery in the event that the upload and/or commit is not successful or fails at any point. In some cases, client application 152 can durably record the intent to commit the operation (e.g., the add and/or upload of the content item) on client device 150 to keep track of the commit until the commit either succeeds (e.g., is committed or recorded at content management system 110) or fails. Once the commit succeeds or fails, client application 152 can clear the intent to commit recorded to avoid confusion or errors, as further described in FIG. 13A.

If client application 152 succeeds in updating local tree 630 to include a node for the content item added and uploading the content item to content management storage 110, client application 152 can synchronize tree data structures 610, 620, 630 (i.e., remote tree, sync tree, and local tree) to ensure the remote and local metadata for content items at client device 150 and content management system 110 is synchronized, consistent, and error free. The synchronization can involve an incremental synchronization and/or a conflict handling procedure as described herein to synchronize remote tree 610, sync tree 620, and local tree 610.

Figure 6D:
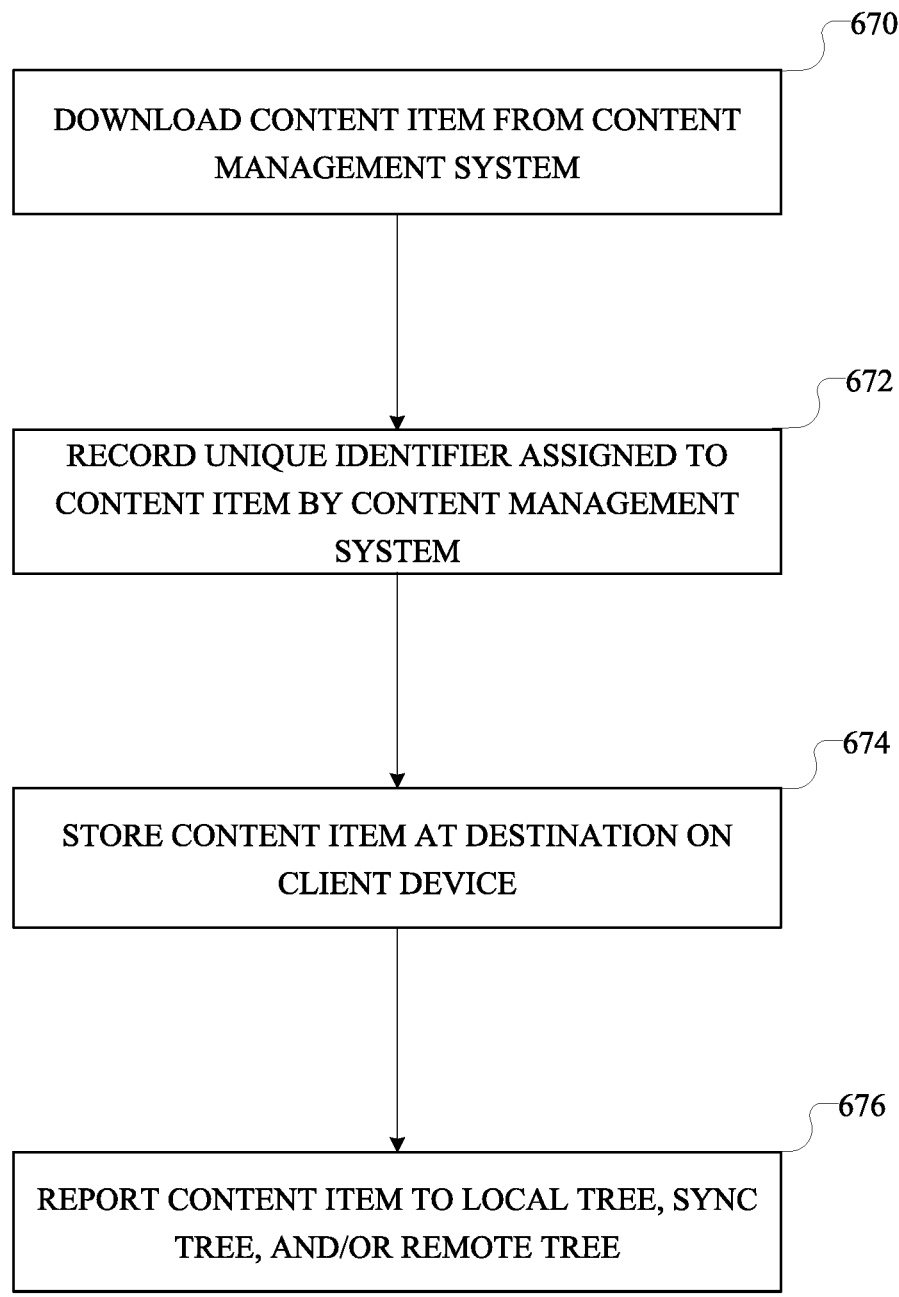
FIG. 6D shows an example method for downloading a content item to a client device from a content management system and recording the downloaded content item and unique identifier at the client device.

FIG. 6D shows an example method for adding at client device 150 a content item downloaded from content management system 110 and recording the downloaded content item and unique identifier. At step 670, client application 152 downloads a content item from content management system 110. The content item can be a content item added to content management system 110 by another user account, client device, or through a web interface (e.g., 124), and synchronized to client device 150.

The content item downloaded can include a unique identifier assigned to the content item by content management system 110. In some cases, client application 152 can receive, for the download, an operation for adding the content item to client device 150. For example, client application 152 can receive an add operation identifying the filename, path, unique identifier, etc. To illustrate, client application 152 can receive the operation "Add(/Directory/file.jpg: 321)", where "Add" identifies the operation, "file.jpg" identifies the filename, "/Directory/" identifies the directory where the file resides, "/Directory/file.jpg" identifies the full path and/or filename, and "321" identifies the unique identifier of the file.

At step 672, client application 152 records the unique identifier of the content item for use at client device 150 to identify the content item. For example, client application 152 can write the unique identifier as an attribute of the content item (e.g., xattr), append the unique identifier to the content item, tag the content item with the unique identifier, and/or write the unique identifier to a metadata record or file for the content item (e.g., co m. application. fileID).

At step 674, client application 152 can store the content item at a destination for the content item on client device 150. The destination can be the path defined for the content item. For example, the destination can include a specific directory within a namespace on client device 150.

Client application 152 can store data and/or various type of information on client device 150 for the content item. For example, client application 152 can store the contents or data of the content item, a modification date, application specific metadata, etc.

At step 676, client application 152 can report the content item to local tree 630, sync tree 620, and/or remote tree 610. For example, client application 152 can report the content item to remote tree 610, which adds a node on remote tree 610 for the content item. Client application 152 can then synchronize local tree 630, sync tree 620, and remote tree 610 based on the node added to remote tree 610 for the content item.

Synchronization Using Tree Data Structures

Figure 7A:
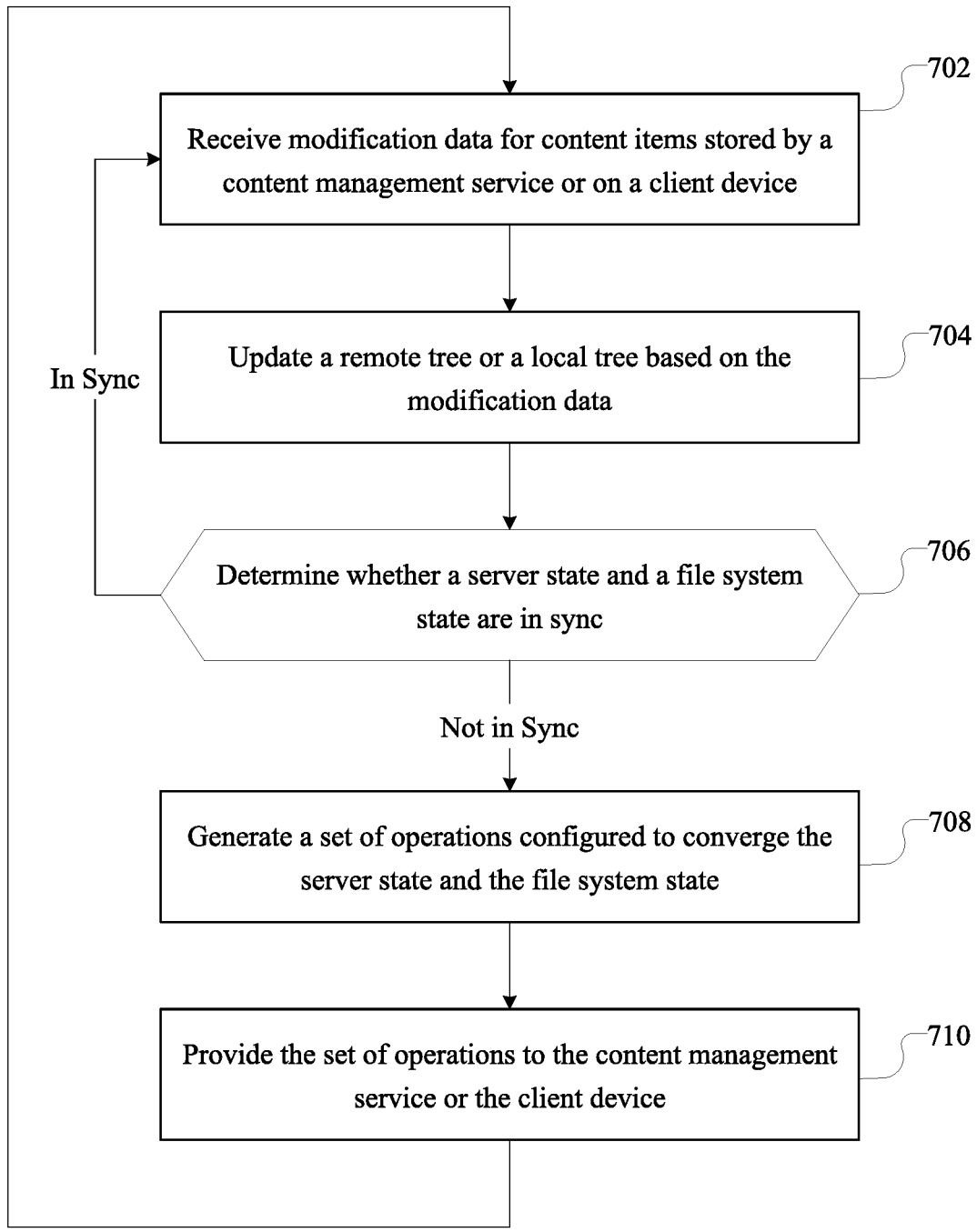
FIG. 7A shows an example method for synchronizing a server state and a file system state using tree data structures.

FIG. 7A shows an example method for synchronizing a server state and a file system state using tree data structures, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method may be implemented by a system such as, for example, client synchronization service 156 on client device 150.

The system is configured to identify a difference between a remote tree representing a server state for content items stored by the content management system, a local tree representing the file system state for the corresponding content items stored on the client device, and a sync tree representing a known synced state between the server state and the file system state. Based on these differences, a sequence of operations may be generated that, if executed, are configured to converge the server state and the file system state towards a synchronized state where the three tree data structures would be identical.

For example, at operation 702, the system may receive modification data for content items stored by a content management system or on a client device. The modification data may be used to update a remote tree or a local tree at operation 704.

The modification data is specifies what changes are done to one or more content items associated with a content management service. Accordingly, the modification data may be received from the content management system or from the client device (e.g., from client application 152). Modification data received from the content management system may be referred to as server modification data. Server modification data specifies what changes are done to one or more content items by the content management system and may be used to update the remote tree at operation 704. Modification data received from the client device may be referred to as client modification data. Client modification data specifies what changes are done to one or more content items on the client device and may be used to update the local tree at operation 704.

At operation 706, the system may determine whether a server state for content items stored by the content management system and a file system state for the content items stored on the client device are in sync. Because the local tree and the remote tree are representative of the file system state and the server state and are continually being updated to track changes that occur at the content management system and the client device, determining whether the server state and the file system state are in sync may be done by comparing the local tree and/or the remote tree to the sync tree to find differences between the trees. This process of finding differences between the trees is sometimes referred to as "diffing" the trees.

According to some embodiments and scenarios, determining whether the server state and the file system state are in sync may include one or more of identifying differences between the remote tree and the sync tree and/or identifying differences between the local tree and the sync tree. Differences between the remote tree and sync tree may indicate the occurrence of changes to content items stored by the content management system that may not be reflected at the client device. Similarly, differences between the local tree and sync tree may indicate the occurrence of changes to content items stored at the client device that may not be reflected at the content management system.

If there are no differences between the trees, the server state and the file system state are in sync and no synchronization actions are needed. Accordingly, the method may return to operation 702 and await new modification data. On the other hand, if differences are detected, the system may generate a sequence of operations configured to converge the server state and the file system state at operation 708.

The sequence of operations generated depends on the one or more differences that are detected. For example, if the difference between two trees is an added content item, the generated sequence of operations may include retrieving the added content item and adding it. If the difference between two trees is a deletion of a content item, the generated sequence of operations may include deleting the content item. The sequence of operations may also include a number of checks to ensure tree constraints are maintained. As will be described further below, the sequence of operations may conflict with the current state of the server state, the file system state, or other operations that are pending execution. Accordingly, the system may also resolve these conflicts before proceeding.

As noted above, if there are differences between the remote tree and sync tree, changes to content items stored by the content management system may have occurred that may not be reflected at the client device. Accordingly, in this scenario, the system may generate a client sequence of operations configured to operate on the content items stored on the client device to converge the server state and the file system state and this client sequence of operations may be provided to the client device for execution at operation 710.

On the other hand, if there are differences between the local tree and sync tree, changes to content items stored at the client device may have occurred that may not be reflected at the content management system. Accordingly, in this scenario, the system may generate a server sequence of operations configured to operate on the content items stored by the content management system to converge the server state and the file system state and this server sequence of operations may be provided to the content management system for execution at operation 710. In some cases, both cases may be true and a client sequence of operations and a server sequence of operations may be generated and provided to their intended recipients at operation 710.

Once the sequence(s) of operations are provided to the intended recipient(s), the method may return to operation 702 and await new modification data. The sequence(s) of operations may provide one or more steps towards the convergence of the server state and the file system state or provide all steps needed to sync the server state and the file system state. For example, the content management system may receive the server sequence of operations and execute the server sequence of operations on content items stored by the content management system. This execution of the server sequence of operations causes changes to the content items stored by the content management system, which are detected and specified in server modification data, which is transmitted back to the system. The system may then update the remote tree and determine whether the server state and the file system state are in sync.

The client device may receive the client sequence of operations and execute the client sequence of operations on content items stored on the client device. This execution of the client sequence of operations causes changes to the content items stored on the client device, which are detected and specified in client modification data, which is passed to the system. The system may then update the local tree and determine whether the server state and the file system state are in sync. These operations of method 700 may continue until the server state and the file system state are in sync.

The operations of method 700 are described with respect to a client side and a server side (e.g., a local tree and a remote tree, a file system state and a server state, a client sequence of operations and a server sequence of operations, client modification data and server modification data). In various embodiments the operations associated with the two sides may occur in parallel, in sequence, in isolation of the other side, or a combination.

Conflict Handling

As described above with respect to FIG. 7A, differences between a sync tree and a remote tree are identified and used to generate a client sequence of operations configured to converge the server state and the file system state. However, in some cases, the client sequence of operations may conflict with the current state of a local tree. Similarly, differences between the sync tree and the local tree are identified and used to generate a server sequence of operations configured to converge the server state and the file system state. However, the server sequence of operations may conflict with the current state of the remote tree. Additionally or alternatively, the client sequence of operations and the server sequence of operations may conflict with one another. Accordingly, various embodiments of the subject technology provide additional technical improvements by resolving these conflicts.

For example, the client synchronization service may identify an operation in a sequence of operations (e.g., the client sequence of operations or the server sequence of operations) that conflicts with a rule. Each rule used to identify a conflict may also be associated with a resolution for the conflict. The client synchronization service may update the sequence of operations based on the resolution for the conflict or perform resolve the conflict by performing operations associated with the resolutions for the conflict before providing the sequence of operations for execution.

Figure 7B:
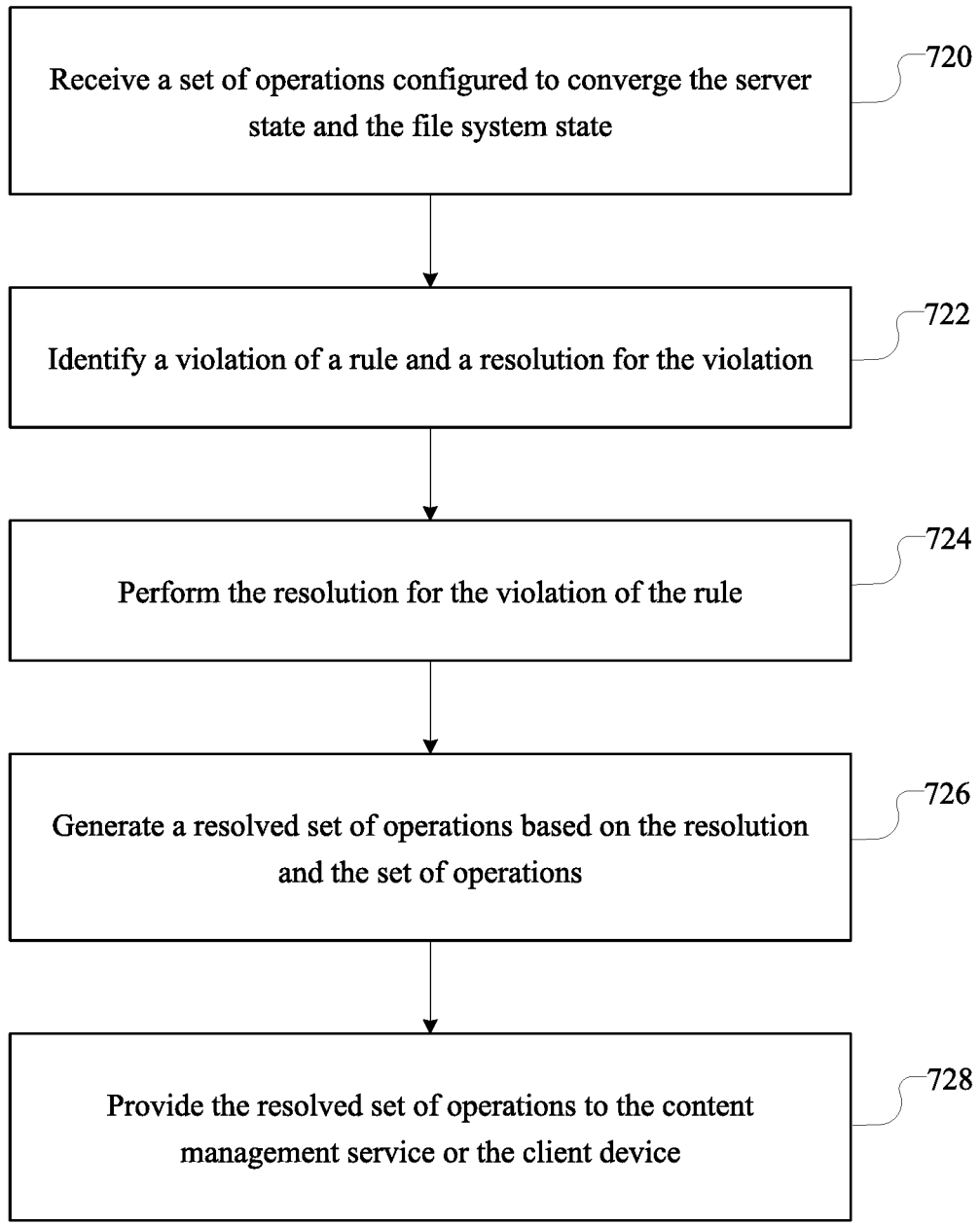
FIG. 7B shows an example method for resolving conflicts when synchronizing a server state and a file system state using tree data structures.

FIG. 7B shows an example method for resolving conflicts when synchronizing a server state and a file system state using tree data structures, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 600 may be implemented by a system such as, for example, client synchronization service 156, running on a client device.

The system may receive a sequence of operations configured to converge a server state and a file system state at operation 720. The sequence of operations may be, for example, the client sequence of operations or the server sequence of operations generated and described with respect to the method 700 of FIG. 7A.

At operation 720, the system identifies one or more violations in the sequence of operations based on a set of rules. The set of rules may be stored by client synchronization service 156 and specify a number of constraints, invariants, or conflicts that need to be resolved. The set of rules are applied to the tree data structures and help control sync behavior. Each rule in the set of rules may also be associated or otherwise linked to a resolution to a violation of that rule. For example, the resolution may include an alteration of one or more operations in the sequence of operations, a removal off one or more operations, an addition of one or more operations, one or more additional actions to the server state or the file state, or a combination of actions.

For each operation in a sequence of operations, the system may determine whether any rule in the set of rules is violated. If a rule is violated, the system identifies a resolution of the violation and, at operation 722, performs the resolution. The resolution may include actions such as modifying one or more operations in the sequence of operations, a removing or adding one or more operations, or additional actions on the server state or the file state.

Once the resolution actions are performed, the system may generate a resolved or rebased sequence of operation based on the resolution and the sequence of operations at operation 724 and, at operation 728, provide the resolved sequence of operations to the appropriate entity for execution. For example, if the sequence of operations is a client sequence of operations, the resolved sequence of operations may be provided to the client device. If the sequence of operations is a server sequence of operations, the resolved sequence of operations may be provided to the content management service. Additionally, the method may be performed on client sequence of operations and server sequence of operations in sequence, in parallel, or in various different orders.

According to some embodiments, each type of operation may be associated with the same or a different set of rules. For example, operation types may include, for example, adding a content item, deleting a content item, editing a content item, moving a content item, renaming a content item, etc. The sequence of operations may consist of operations each belonging to one of the operation types above. Each operation type may be associated with a specific set of rules.

For illustrative purposes, a set of rules for an "Add" operation type may include rules such as file identifiers for content items must be unique in a tree (e.g., no two nodes in a tree may have the same file identifier), a directory file identifier ("DirFileID") specifying the file identifier of a parent node of the content item must exist in the opposite tree data structure, and a DirFileID and file name combination for a content item are not used in the opposite tree.

Opposite tree, as used here, refers to the tree data structure that represents the state of the opposing entity. For example, a client sequence of operations configured to operate on the client device and the resulting changes to the file system on the client device will be reflected in the local tree. Accordingly, the opposite tree for the client sequence of operations is the remote tree. Similarly, a server sequence of operations is configured to be transmitted to the content management system to be executed and the resulting changes to the server state will be reflected in the remote tree. Accordingly, the opposite tree for the server sequence of operations is the local tree.

Lamport Clocks

Figure 8A:
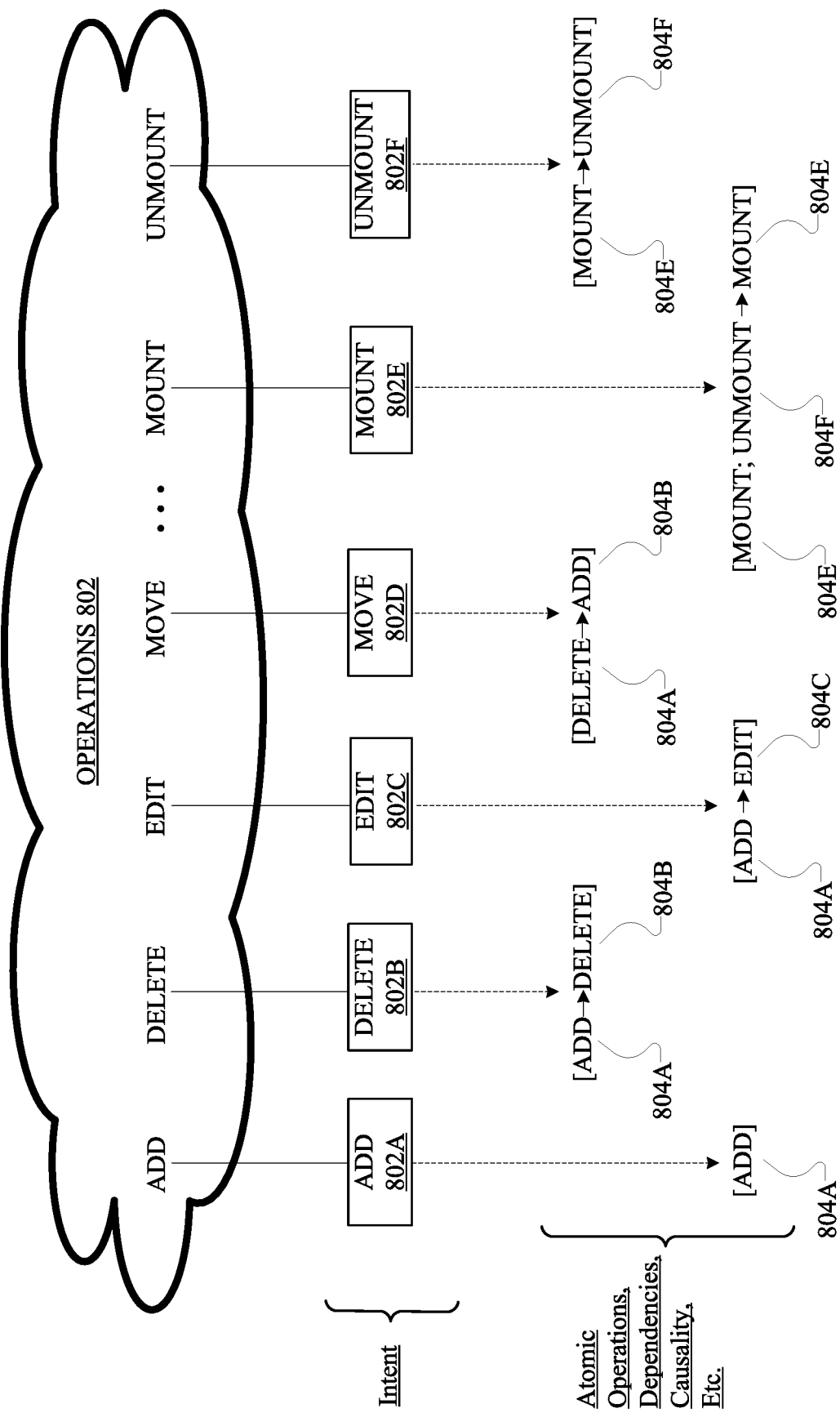
FIG. 8A shows a diagram of operations showing dependencies causalities between the operations.

FIG. 8A illustrates a diagram of operations 802 showing dependencies and causality between the various operations (802). Operations 802 include an add operation, delete operation, edit operation, move operation, mount operation and unmount operation. Each of the operations has an intent or function. The add operation has an add intent (802A), the delete operation has a delete intent (802B), the edit operation has an edit intent (802C), the move operation has a move intent (802D), the mount operation has a mount intent (802E), and the unmount operation has an unmount intent (802F). Operations 802 can include dependencies or causal relationships, and may involve one or more atomic operations for achieving their respective intents (802A-F).

For example, the add operation is an atomic operation and simply involves add 804A for performing add intent 802A. The delete operation involves delete 804B which depends on add 804A, meaning the delete operation is executed for a content item after an add operation for that content item. The edit operation involves edit 804C which similarly depends on add 804A, meaning the edit operation is executed for a content item after the add operation for that content item.

The move operation involves delete 804B and add 804A, which are atomic operations that are executed to achieve move intent 802D for the move operation. The mount operation can involve mount 804E for executing mount intent 802E. However, in some cases, the mount operation may involve unmount 804F and mount 804E for executing mount intent 802E. For example, in a cross-namespace context, a mount operation in a namespace may involve an unmount (804F) and a mount (804E). In some cases, content management system 110 may include rules that prohibit two mounts from being executed if the two mounts create two paths to a same namespace, as further described below with reference to FIG. 8B. In this case, the second mount of the same namespace may trigger an unmount of that namespace to ensure the second mount does not lead to multiple paths to the same namespace for that user. Thus, in this example, at least one of the two mount operations would involve unmount 804F and mount 804E. Unmount 804F would be a dependency of the mount operation.

The unmount operation involves mount 804E and unmount 804F for executing unmount intent 802F. In other words, to execute unmount intent 802F for a content item, the content item would have first been mounted through a mount (804E). The content item can then be unmounted through an unmount (804F).

The intents (802A-F) and atomic operations, dependencies, causalities, etc., for operations 802 can be used when calculating lamport clocks for operations 802. Lamport clocks can be used to determine an ordering and causality of events at one or more namespaces and ensure the state of events does not violate one or more rules. Lamports clocks can be used to ensure operations 802 are properly synchronized, linearized, serialized, etc., to avoid conflicts at one or more devices.

Figure 8B:
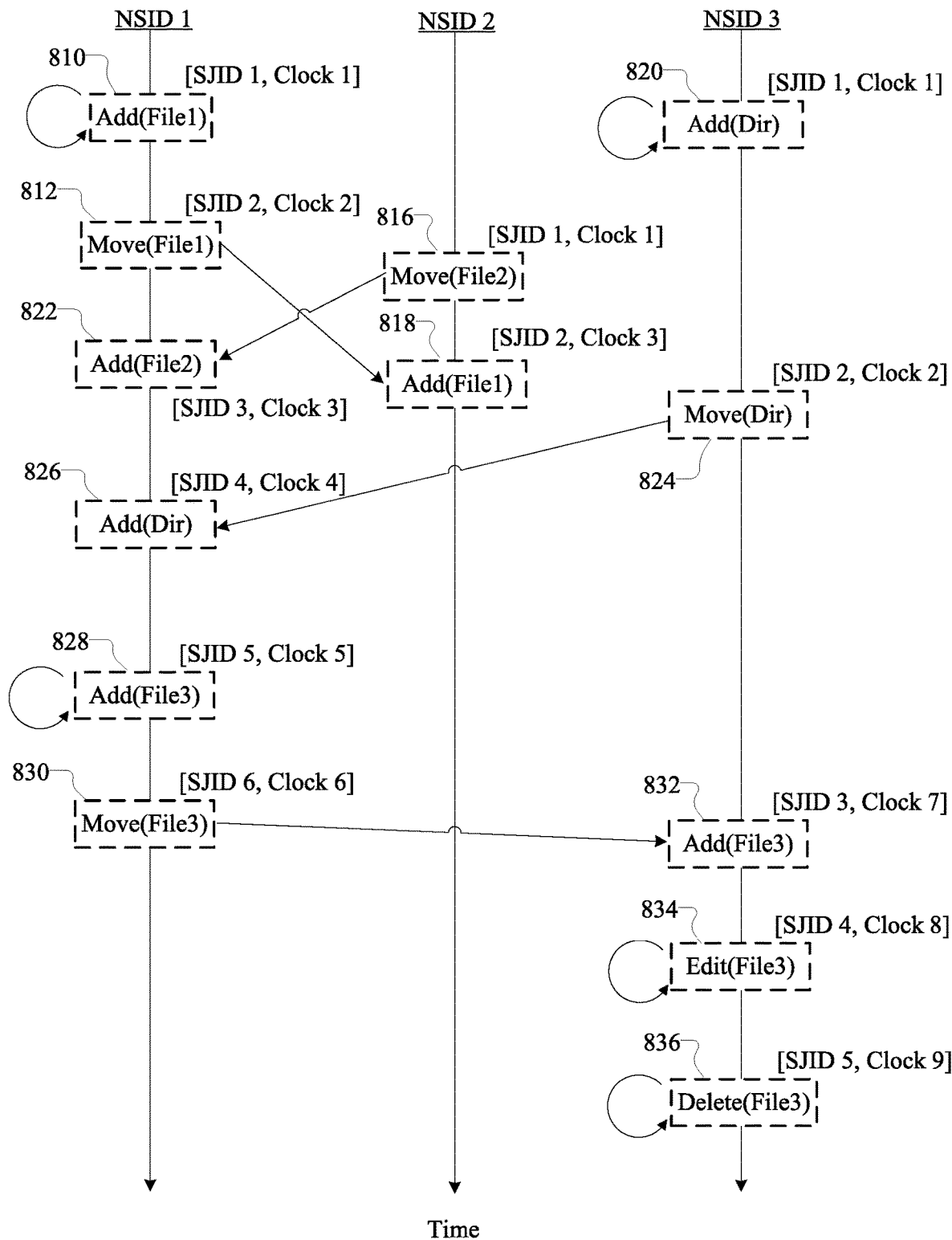
FIG. 8B shows a diagram of events across namespaces ordered according to lamport clocks calculated for the events.

FIG. 8B illustrates a diagram of events across namespaces with lamport clocks calculated for the events. In this example, various operations have been executed across namespaces NSID 1, NSID 2, and NSID 3. Each namespace maintains an SJID for every operation at that namespace in order to determine the ordering of operations within the namespace. However, the SJID of a namespace does not identify ordering and causality of operations across namespaces. Accordingly, lamport clocks are calculated for the operations in the namespaces NSID 1, 2, 3 to determine causality and obtain a cross-namespace ordering of operations.

At NSID 1, operation 810 has SJID 1 and clock 1. At NSID 2, operation 816 has SJID 1 and clock 1. At NSID, operation 820 has SJID 1 and clock 1. Operations 810, 816, 820 span multiple namespaces and do not have causal relationships. Accordingly, operations 810, 816, 820 do not affect each other's clocks.

Ordering of operations within the namespace can be determined based on the SJID at the namespace. Clocks for operations within the same namespace can simply be incremented by 1. Thus, at SJID 2 in NSID 1, the clock for operation 812 is incremented to 2.

Operation 812 in NSID 1 is a move of File1 to NSID 2. Accordingly, operation 812 triggers operation 818 at NSID 2, which is the add of File1 at NSID 2. Since operation 818 at NSID 2 is causally dependent on another operation from a different namespace, namely operation 812 from NSID 1, the clock for operation 818 is calculated based on the clock at NSID 1 and the clock at NSID 2. The algorithm can be expressed as: TargetNS clock$_{ti}$=max(Source NS$_{dock}$, TargetNS clock$_{to}$)+1. Thus, in this example, the clock for operation 818 at NSID 2 is 3 (e.g., max(2, 1)+1). Accordingly, operation 818 at NSID 2 has SJID 2 and clock 3.

Similarly, operation 816 at NSID is a move of File2 from NSID 2 to NSID 1. Operation 816 thus triggers operation 822 at NSID 1, for adding File2 at NSID 1. The clock for operation 822 is calculated based on the clock algorithm, which equals 3. Thus, operation 822 has SJID 3 at NSID 1 and clock 3.

Operation 824 at NSID 3 is causally dependent on an operation in the same namespace, namely operation 820 at NSID 3. Thus, the clock for operation 824 can be calculated by incrementing the clock of operation 820 at NSID 3. In this example, the clock for operation 824 is therefore 2. Operation 824 at NSID 3 has SJID 2 and clock 2. Since operation 824 is a move operation for moving Dir to NSID 1, operation 824 triggers operation 826 at NSID 1, adding Dir to NSID 1.

Since operation 826 is triggered by operation 824 in a different namespace (NSID 3), the clock for operation 826 is calculated based on the clock at NSID 1 and the clock for operation 824. Accordingly, the clock for operation 826 is set to 4 (e.g., max(2, 3)+1). Operation 826 thus has SJID 4 at NSID 1 and clock 4.

Operation 828 at NSID 1 adds File3 to NSID 1, and is not a cross-namespace operation. Accordingly, the clock for operation 828 is calculated by incrementing the clock at NSID 1. The clock for operation 828 is thus set to 8.

Operation 830 is causally dependent on operation 828 also within NSID 1. The clock for operation 830 is thus set to 6 by incrementing the clock of operation 828 at NSID 1. Operation 830 has SJID 6 at NSID 1 and clock 6.

Operation 830 is a move operation which moves File3 to NSID 3. Operation 830 thus triggers operation 832 at NSID 3. Since operation 832 is based on an operation from a different namespace, its clock is calculated using the clock algorithm based on the clock at NSID 3 and the clock of operation 830. In this case, the clock for operation 832 is set to 7. Operation 832 thus has SJID 3 at NSID 3 and clock 7.

Operations 834, 836 are not cross-namespace operations and are causally related to operation 830 at NSID 3. Thus, the clock for operations 834, 836 can be calculated by incrementing the clock of operation 832. In this example, the clocks for operations 834, 836 are set to 8 and 9 respectively.

FIG. 9A illustrates an example mount state violation 900 generated by a series of mount operations executed for a user. Mount state violation is based on an invariant defined for mount operations which prohibits User 1 from mounting multiple paths (e.g., /a/c/ and /b/) to the same namespace (e.g., NSID 2).

In this example, mount operations 908, 910, 912 are executed at steps 902, 904, 906. At step 902, User 1 performs mount operation 908 which mounts namespace 1 (NSID 1) at path /a. Thus, at this point, User 1 has a mount to NSID 1 through path /a.

At step 904, User 1 then performs mount operation 910 which mounts namespace 2 (NSID 2) at path /c. Thus, at this point, User 1 has a mount to NSID 1 through path /a and a mount to NSID 2 through path /a/c.

At step 906, User 1 then performs mount operation 912 which mounts namespace 2 (NSID 2) at path /b. At this point, User 1 has a mount to NSID 1 through path /a, a mount to NSID 2 through path /a/c, and a mount to NSID 2 through path /b. Thus, User 1 has two paths to NSID 2, namely /a/c and /b. This violates an invariant which prevents multiple paths from pointing to the same namespace, and thus results in mount state violation 900. To avoid violating this invariant, operation 912 which mounts NSID 2 at path /b and establishes a second path to NSID 2 can depend on an unmount operation that breaks one of the paths to NSID 2. For example, operation 912 can depend on an unmount operation for unmounting NSID 2 at path /a/c. The unmount operation should be executed before operation 912 to avoid mount state violation 900. This would resolve mount state violation 900 created by operation 912 at step 906, and leave User 1 with one path to NSID 2, namely path /b to NSID 2.

Lamport clocks and dependencies can be leveraged to ensure the unmount operation is executed before operation 912. By properly setting lamport clocks on operations 902, 904, 906 as well as any unmounts from which operations 902, 904, 906 depend on, mounts and unmounts operations can be serialized and executed in a way that prevents mount state violation 900. On the other hand, improperly set lamport clocks can result in mount state violation 900, as well as other violations.

As previously shown in FIG. 8B, lamport clocks for events in the same namespace can be calculated by incrementing the clock of each new operation in the namespace. However, in the context of multiple namespaces, the calculation of lamport clocks can become more difficult, as operations, including mounts and unmounts, are generated across multiple namespaces. Moreover, when considering the invariant for mount operations that prohibits two paths pointing to the same namespace, additional rules for calculating lamport clocks of mount and unmount operations may be necessary to ensure compliance with such invariant for mount and unmount operations. The lamport clocks, if properly calculated, can be used to enforce such invariants and prevent mount state violation 900. If not properly calculated, the lamport clocks can otherwise lead to violations such as mount state violation 900.

Figure 9B:
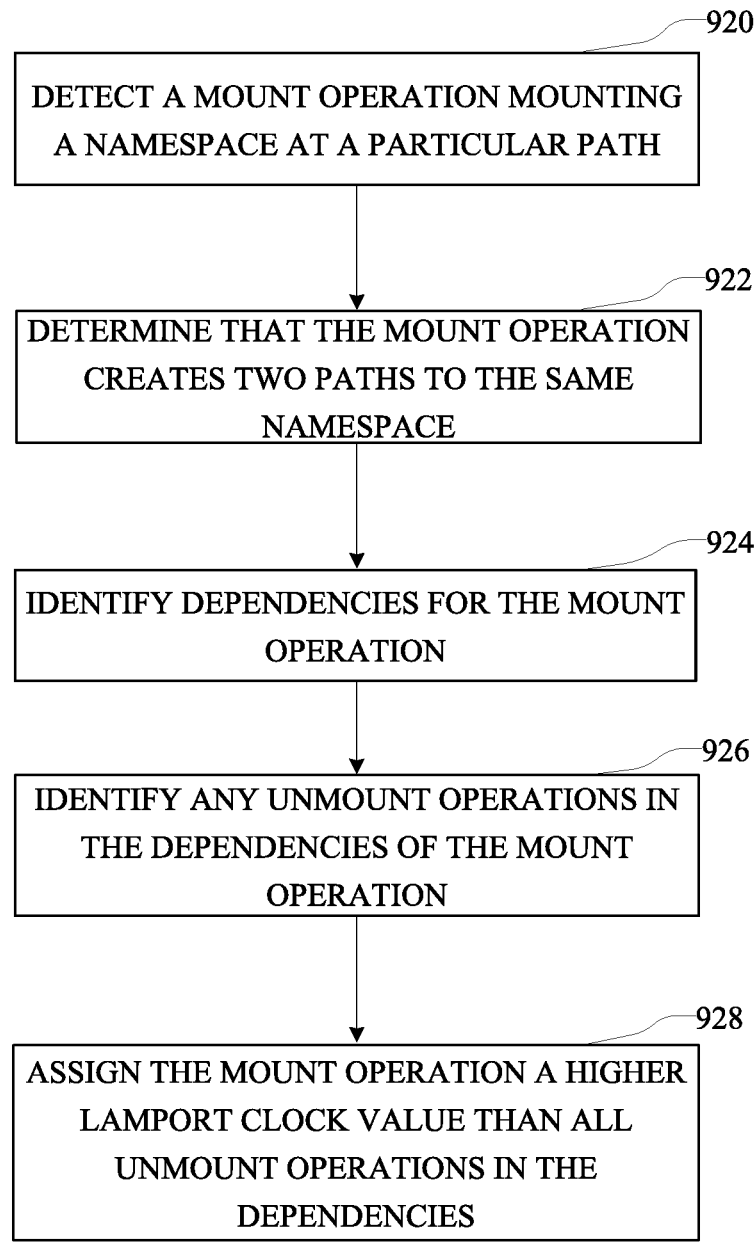
FIG. 9B shows an example method for calculating lamport clocks for mount and unmount operations in a cross-namespace context.

FIG. 9B illustrates a method for calculating lamport clocks for mount and unmount operations in a cross-namespace context. The method calculates lamport clocks in a way that allows the lamport clocks to be used to prevent violations of the invariant which provides that a mount operation should not lead to multiple paths to a same namespace (e.g., mount state violation 900). The lamport clocks are calculated such that mount and unmount operations can be linearized, serialized, and/or executed in a way that ensures that a consistent cut or state of the namespaces in content management system 110 will not lead client device 150 to have multiple paths to the same namespace. For example, the method can calculate the lamport clocks for operations 908, 910, 912 shown in FIG. 9A, to avoid mount state violation 900 by preventing the two paths to namespace 2 from being created as a result of operation 912 at step 906 mounting NSID 2 at path /b despite NSID 2 being already mounted at path /a/c/.

According to the example method, at step 920, content management system 110 detects a mount operation (e.g., operation 912) mounting a namespace (e.g., NSID 2) at a particular path (e.g., /b). At step 922, content management system 110 determines that the mount operation creates two paths to the same namespace (e.g., NSID 2). This condition is illustrated in step 906 of FIG. 9A. As previously mentioned, this condition violates an invariant prohibiting multiple paths to the same namespace, resulting in mount state violation 900. Accordingly, steps 924, 926, 928 of this example method, as described below, can be implemented to prevent this condition (e.g., mount state violation 900) from occurring.

At step 924, content management system 110 identifies dependencies for the mount operation. For example, content management system 110 can perform a mount dependency computation that identifies dependencies for the mount operation. The dependencies involve operations that have to occur prior to the mount operation for the mount operation to occur.

For example, if the mount operation violates the invariant prohibiting two paths to the same namespace, the mount operation should depend on an unmount operation that unmounts one of the two paths that points to the same namespace in order to prevent the invariant from being violated by the mount operation. To illustrate based on the example from step 906 in FIG. 9A, mount operation 912 mounting NSID 2 at path /b may depend on an unmount operation that unmounts NSID 2 at path /a/c/. As another example, amount operation can involve multiple atomic operations, such as an unmount of a source and a mount of a destination, which can generate dependencies for the mount.

At step 926, content management system 110 identifies any unmount operations in the dependencies of the mount operation. Such unmount operations would be unmount dependencies for the mount operation. For example, content management system 110 may identify an unmount operation in the dependencies for mount operation 912. The unmount operation can be an operation that unmounts NSID 2 at path /a/c/. This unmount operation would be a dependency of mount operation 912.

At step 928, content management system 110 assigns the mount operation a higher lamport clock value than all unmount operations in the dependencies. Content management system 110 can either increase the clock value of the mount operation to ensure it exceeds the clock value of all unmount operations in its dependencies, or decrease the clock value of one or more of the unmount operations in its dependencies as necessary to yield a higher clock value for the mount operation. Content management system 110 can also ensure that each unmount operation has a higher clock value than a respective mount operation from which such unmount operation depends.

With reference to the example from FIG. 9B, content management system 110 can assign mount operation 912 a higher clock value than an unmount operation for unmounting NSID 2 from path /a/c/. Content management system 110 can also set the clock value of mount operation 910, which mounts NSID 2 at path la/c/, to be lower than the clock value of the unmount operation for unmounting NSID 2 from path /a/c/. This calculation and configuration of lamport clocks can ensure that an unmount operation for NSID 2 is executed/processed between mount operation 910 mounting NSID 2 at path /a/c/ and mount operation 912 mounting NSID 2 at path /b/. As a result, the state of operations 908, 910, 912 will never lead to multiple paths pointing to the same namespace (NSID 2) and mount state violation 900 will be prevented.

FIG. 9C illustrates an example lamport clock configuration 930 calculated for mount operations 908, 910, 912 based on the method shown in FIG. 9B. In this example, lamport clock configuration 930 depicts mount operation 908 mounting NSID 1 at path /a for User 1, mount operation 910 mounting NSID 2 at /a/c/ for User 1, and mount operation 912 mounting NSID 2 at /b/ for User 1. Lamport clock configuration 930 also includes unmount operation 914, which unmounts NSID 2 from /a/c/. Consistent with the invariant prohibiting multiple paths to the same namespace, mount operation 912 depends from unmount operation 914. Accordingly, unmount operation 914 is a dependency of mount operation 912. Content management system 110 can thus identify unmount operation 914 as an unmount operation in the dependencies of mount operation 912, as previously described in step 926 of FIG. 9B.

Lamport clock configuration 930 includes lamport clocks 932, 934, 936 calculated and assigned to operations 908, 910, 912, 914. Lamport clocks 932, 934, 936 are calculated to prevent mount state violation 900 by ensuring that unmount operation 914 is listed prior to mount operation 912. For example, because mount operation 912 depends on unmount operation 914, mount operation 912 is assigned a higher clock value than unmount operation 914. In this example, unmount operation 914 has lamport clock 934 with a clock value of "1", and mount operation 912 has lamport clock 936 with a clock value of "2". Mount operation 912 is thus ordered after unmount operation 914. Moreover, since unmount operation 914 depends on mount operation 910, lamport clock 932 for mount operation 910 is set lower than lamport clock 934 for unmount operation 914. As illustrated, lamport clock 932 has a value of "0".

In some cases, content management system 110 can set lamport clocks 932, 934, 936 by decreasing the clock value for unmount operation 914 below the clock value for mount operation 912, and decreasing the clock value for mount operation 910 below the clock value for unmount operation 914. In other examples, content management system 110 can set lamport clocks 932, 934, 936 by incrementing the clock value of mount operation 912 to exceed the clock values of mount operation 910 and unmount operation 914.

Lamport clocks 932, 934, 936 can ensure that operations 908, 910, 912, 914 are properly serialized to prevent mount state violation 900 and any other mount/unmount invariant. FIG. 9D illustrates an example listing 940 of operations 908, 910, 912, 914 serialized according to lamport clocks 932, 934, 936.

Listing 940 includes operations 908, 910, 912, 914 and cursor states 942, 944, 946, 948. Listing 940 first includes mount operation 908 at NSID 1, which correlates to cursor state 942 identifying NSID 1 and SJID 1 for mount operation 908. Next, listing 940 includes mount operation 910 which has a clock value of "0" in lamport clock 932. Cursor state 944 corresponding to mount operation 910 includes SJID 1 at NSID 1 and SJID 0 at NSID 2.

Listing 940 next includes unmount operation 914 which has a clock value of "1" in lamport clock 934 and thus is ordered after mount operation 910. Cursor state 946 corresponding to unmount operation 914 includes SJID 1 at NSID 1 and SJID 1 at NSID 2. Cursor state 946 has thus incremented the SJID in NSID 2 after cursor state 944.

Listing 940 finally includes mount operation 912 which has a clock value of "2" in lamport clock 936 and thus is ordered after unmount operation 914 and mount operation 910. Cursor state 948 corresponding to mount operation 912 includes SJID 1 at NSID 1 and SJID 2 at NSID 2. Cursor state 948 has thus incremented the SJID in NSID 2 after cursor state 946.

Based on listing 940, mount operations 908, 910 would be executed first to mount NSID 1 at /a and NSID 2 at /a/c/. Before executing mount operation 912 for mounting NSID 2 at /b, unmount operation 914 would be executed to unmount NSID 2 from /a/c. Once NSID 2 has been unmounted, mount operation 912 would be executed to mount NSID 2 at /b. The resulting state would include a single path to NSID 2 and a single path to NSID 1, namely /b and /a respectively.

Mounts or namespaces can have numerous content items with different paths and timestamps. As a result, when a mount operation occurs, the mount operation can affect numerous content items in the mount, including other mounts within a mount. Improper updates to content items or lamport clocks in a mount can cause significant conflicts and inconsistencies. Accordingly, lamport clocks can be updated based on mount operations to ensure the mount has a proper lamport clock as well as any contents within the mount. Individual calculations of lamport clocks for each subitem within a mount can be computationally expensive, particularly as the number of mounts and subitems increases. To increase performance of lamport clock computations when performing mounts and reduce the computational burdens, lamport clock calculations can be propagated based on relationships between mounts and/or content items.

Figure 10A:
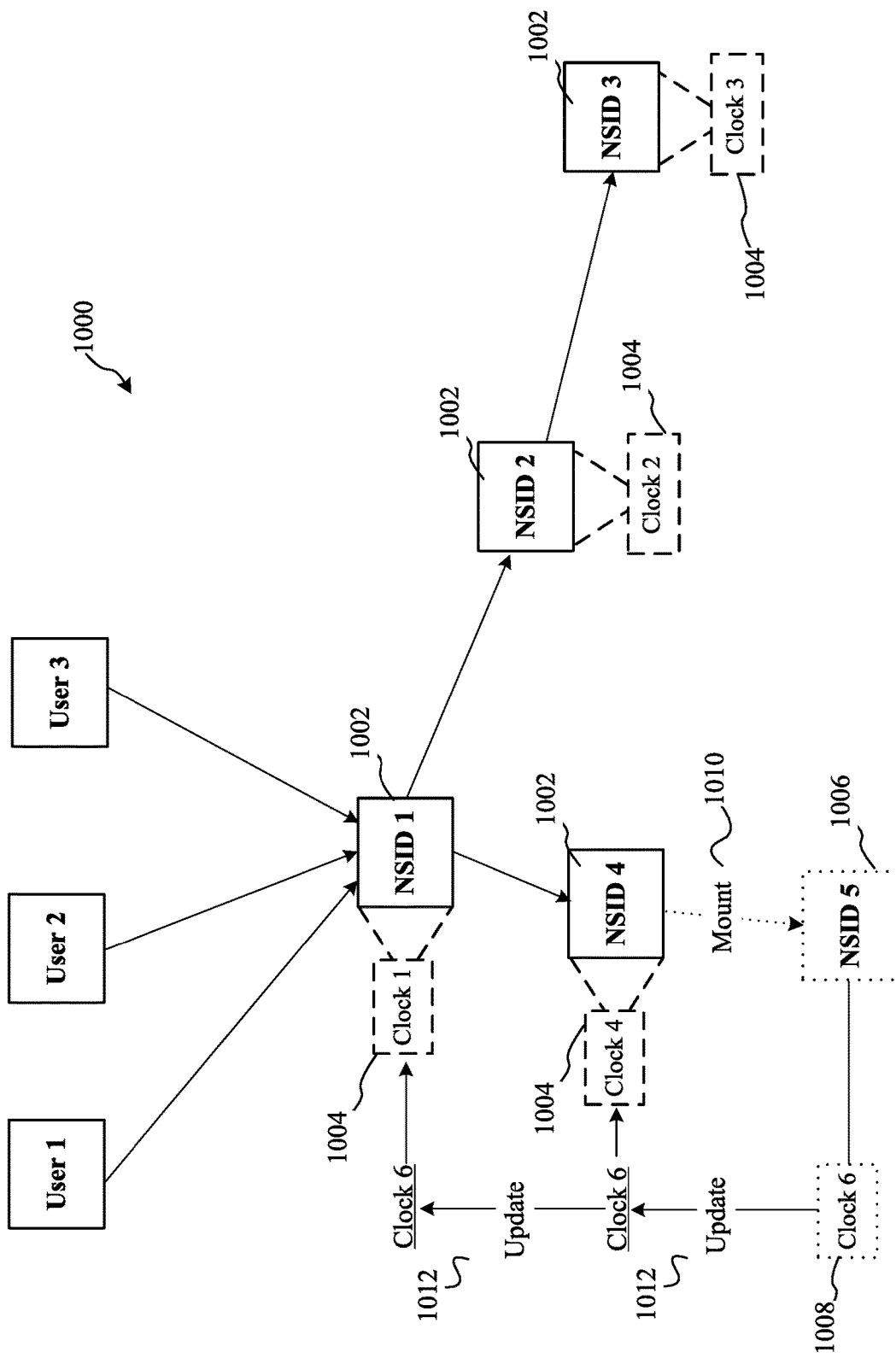
FIG. 10A shows an example process for updating lamport clocks based on a mount operation.

FIG. 10A illustrates an example process for updating lamport clocks based on a mount operation. In this example, User 1, User 2, and User 3 have mounted namespaces 1002 which are depicted in tree structure 1000 based on the interrelationships between mounted namespaces 1002. For example, NSID 3 is mounted within NSID 2, and NSID 2 is mounted within NSID 1. Accordingly, NSID 1, 2, and 3 are depicted as a branch of tree structure 1000. Similarly, NSID 4 is mounted within NSID 1 and is thus depicted as another branch within tree structure 1000.

Moreover, mounted namespaces 1002 have lamport clocks 1004 calculated for each corresponding mount. In this example, NSID 3 has a clock value of "3", NSID 2 has a clock value of "2", NSID 1 has a clock value of "1", and NSID 4 has a clock value of "4".

Mount operation 1010 represents a mount operation for mounting namespace 1006 (NSID 5) to NSID 4. When NSID 5 is mounted according to mount operation 1010, lamport clock 1008 is calculated for NSID 5. The new clock value for lamport clock 1008 is calculated by determining the max clock value of the new mount (1006) and every mount 1002 up the tree (1000) from the new mount (1006), and incrementing the max clock value determined. In this example, the clock value for lamport clock 1008 is calculated by incrementing the max of the clock values of NSID 5, 4, and 1. Based on tree 1000, mount operation 1010 for NSID 5 yields a clock value of "5". NSID 4 has a clock value of "4", and NSID 1 has a clock value of "1". Therefore, the max clock value of NSID 5, 4, and 1 is "5", corresponding to NSID 5. The max clock value of "5" is then incremented to "6" and the clock value "6" is assigned as the clock value of lamport clock 1008.

The clock value of lamport clock 1008 as previously calculated is then propagated to all lamport clocks 1004 up the tree (1000) from the new mount (1006). Thus, updates 1012 are generated to set the clock values of NSID 4 and NSID 1, which are parents of NSID 5 in tree 1000, to "6" according to lamport clock 1008. As a result, the lamport clock values stored for NSID 1, NSID 4, and NSID 5 will be "6" based on lamport clock 1008 calculated in response to mount operation 1010. Tree 1000 thus allows lamport clocks 1004 to quickly be updated as necessary when a new mount is created within tree 1000.

Figure 10B:
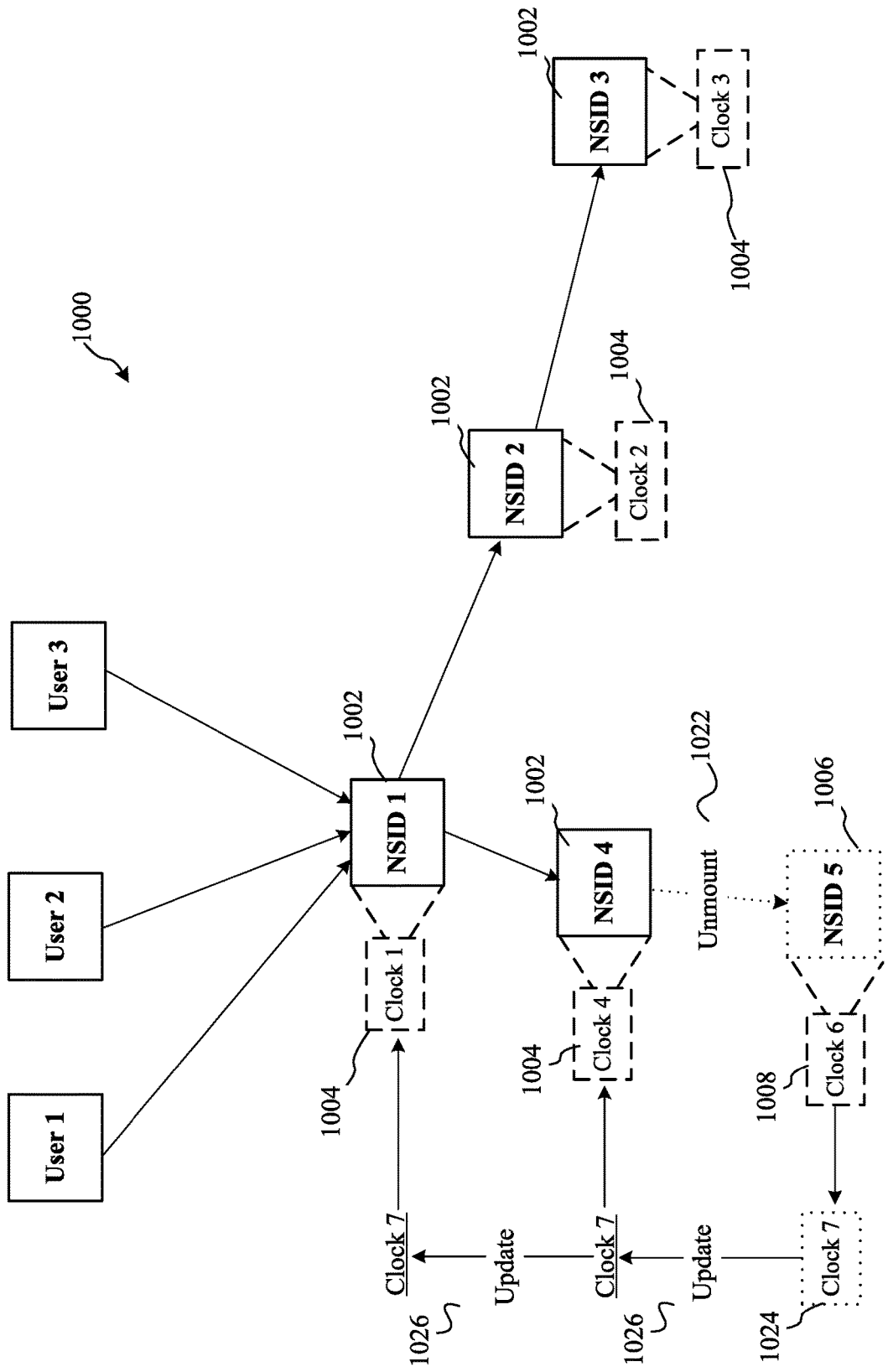
FIG. 10B shows an example process for updating lamport clocks based on an unmount operation.

Tree 1000 can also be used to calculate clock values for unmount operations by incrementing the lamport clock of an unmount and propagated the clock value to the lamport clocks up the tree from the unmount. For example, with reference to FIG. 10B, when unmount operation 1022 is generated for unmounting NSID 5 (1006), lamport clock 1024 is calculated based on the max clock value of lamport clocks 1008, 1004 for NSID 5, NSID 4, and NSID 1. The max clock value calculated is incremented and set as the clock value of the lamport clocks for each mount up the tree (1000) from NSID 5, including NSID 5, NSID 4, and NSID 1. Updates 1026 can propagate the clock value calculated for lamport clock 1024 to lamport clocks 1004 associated with NSID 4 and NSID 1.

FIG. 11A illustrates example tables in server file journal 148 for tracking move operations. Table 1102 includes journal records for operations. In some examples, table 1102 can store operations, clocks (e.g., timestamps) for the operations, namespaces (NSIDs) associated with the operations, journal identifiers (SJIDs) associated with the namespaces, etc. Example operations can include add operations, delete operations mount operations, unmount operations, move operations, etc. The operations can also include control operations. For example, a move can be associated with various move control operations which define an intent at each stage of the move. Example control operations include, without limitation, an outgoing move operation, an incoming move operation, a finish operation, etc. In some cases, table 1102 can also include an operation identifier. For example, table 1102 can include a move identifier (Move_ID) which identifies a particular move operation.

Tables 1104A, 1104B can host records defining intents for in-progress moves. For example, table 1104A can store incoming move records which reflect intents for in-progress moves on a destination namespace, and table 1104B can store outgoing move records which reflect intents for in-progress moves on a source namespace.

In table 1104A, the incoming move records can include, for example, a move identifier (Move_ID) for the move operation, an indication of the operation, a source namespace identifier (Source NSID), a destination namespace identifier (Destination NSID), a hash of the destination path, the destination path, a state of the move operation, a start clock (e.g., start timestamp), an end clock (e.g., end timestamp), etc. The state can indicate whether the move is in progress, aborted, or finished. Thus, the state can identify whether the move is being processed or has been completed or aborted.

In table 1104B, the outgoing move records can include, for example, a move identifier (Move ID) for the move operation, an indication of the operation, a source namespace identifier (Source NSID), a destination namespace identifier (Destination NSID), a hash of the source path, the source path, a state of the move operation, a clock (e.g., timestamp), a cursor (e.g., move identifier and state of operation), etc. As previously mentioned, the state can indicate whether the move is in progress, aborted, or finished.

As operations are detected, file journal interface 202 can write entries or records to tables 1102, 1104A, 1104B to track operations and state, serialize the operations, or synchronize the operations to client device 150.

Figure 11B:
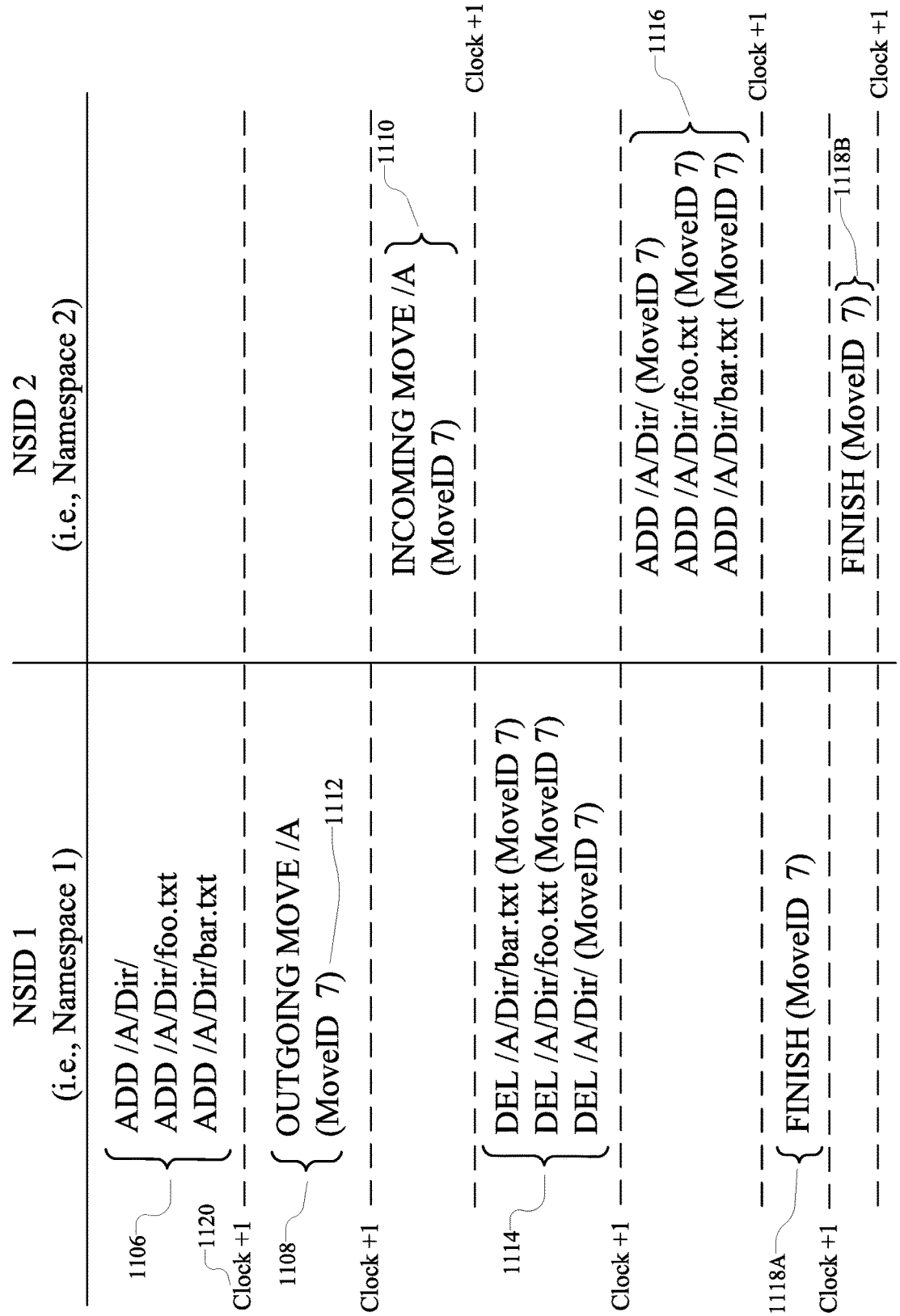
FIG. 11B shows a diagram of an example sequence for processing cross-namespace moves with lamport clocks.

FIG. 11B illustrates a diagram of an example sequence for processing cross-namespace moves with lamport clocks. In this example, the process depicts a cross-namespace move from NSID 1 (namespace 1) to NSID 2 (namespace 2). The various operations for the move are processed and serialized for NSID 1 and NSID 2 until the move is complete at both namespaces and can be emitted to client device 150.

Content management system 110 first records add operations 1106 for NSID 1 at server file journal 148. Add operations 1106 add "/A/Did", "/A/Dir/foo.txt", and "/A/Dir/bar.txt" to NSID 1. Here, "Dir" is a subdirectory within directory "A", and files "foo.txt" and "bar.txt" are added within subdirectory "Dir".

Content management system 110 then increments lamport clock 1120 for add operations 1106 and records the incremented lamport clock for add operations 1106.

After add operations 1106, content management system 110 detects a move of directory "/A/" from NSID 1 to NSID 2. Content management system 110 then records outgoing move operation 1108 for NSID 1 at table 1102. In this case, NSID 1 is the source namespace for the move operation of directory "/A/" at NSID 1. When processing outgoing move operation 1108, content management system 110 assigns move identifier 1112 to the move of "/A/" from NSID 1 to NSID 2. Moreover, content management system 110 can record information associated with the outgoing move at table 1104B containing outgoing moves. For example, content management system 110 can record move identifier 1112, identify NSID 1 as the source namespace, indicate that NSID 2 is the destination namespace, identify the source path at NSID 1, indicate a state of the move (e.g., in progress), define a cursor based on outgoing move operation 1108, and store lamport clock 1120 for outgoing move operation 1108.

When recording lamport clock 1120 for outgoing move operation 1108, content management system 110 increments the value of lamport clock 1120 based on outgoing move operation 1108 and records the incremented lamport clock value.

Next, content management system 110 records incoming move operation 1110 for NSID 2 at table 1102. Incoming move operation 1110 corresponds to the incoming move of directory "/A/" at NSID 2. Content management system 110 can also store an incoming move record for incoming move operation 1110 at table 1104A, which contains incoming moves. Incoming move operation 1110 can be associated or recorded with move identifier 1112 to correlate incoming move operation 1110 at NSID 2 to the move associated with outgoing move operation 1108 at NSID 1. Content management system 110 can record at table 1104A move identifier 1112, the source namespace (NSID 1), the destination namespace (NSID 2), the source path at NSID 1, a state of the move (e.g., in progress), a start clock, and an end clock. The start clock can be the current value of lamport clock 1120 and the end clock can be the incremented value of lamport clock 1120.

Content management system 110 then processes delete operations 1114 at NSID 1, which delete "/A/Did", "/A/Dir/foo.txt", and "/A/Dir/bar.txt" from NSID 1. Content management system 110 associates delete operations 1114 with move identifier 1112 to indicate that delete operations 1114 correspond to the move of directory "/A/" from NSID 1 to NSID 2 associated with outgoing move operation 1108, and distinguish delete operations 1114 from any other delete operations unrelated to the move. In some cases, content management system 110 tags deletes (e.g., "/A/Did", "/A/Dir/foo.txt", and "/A/Dir/bar.txt") with an attribute correlating move identifier 1112 to the deletes, such as an extended attribute (xattr).

Content management system 110 then increments lamport clock 1120 for delete operations 1114 at NSID 1 and records the incremented clock value.

Content management system 110 subsequently processes add operations 1116 at NSID 2, which add "/A/Did", "/A/Dir/foo.txt", and "/A/Dir/bar.txt" to NSID 2. Content management system 110 correlates add operations 1116 to move identifier 1112 to indicate that add operations 1116 correspond with the move associated with incoming move operation 1110, and distinguish the adds from any other adds unrelated to the move. As previously explained, content management system 110 can similarly tag the adds with an attribute (e.g., xattr) identifying move identifier 1112.

Content management system 110 then increments lamport clock 1120, and records (e.g., table 1102) the incremented clock for add operations 1116 at NSID 2.

Content management system 110 then records finish operation 1118A for NSID 1 at table 1102. Content management system 110 records move identifier 1112 with finish operation 1118A to identify finish operation 1118A at NSID 1 and correlate the finish operation with the move from outgoing move operation 1108. Content management system 110 also increments lamport clock 1120 and records the incremented clock for finish operation 1118A at NSID 1. After finish operation 1118A, the move associated with outgoing move operation 1108 has completed at NSID 1 and can be cleared. Content management system 110 can write the finished state in table 1104B containing the records for outgoing moves.

Content management system 110 then records finish operation 1118B for NSID 2 at table 1102 to complete the move at NSID 2. Content management system 110 associates finish operation 1118B with move identifier 1112 to identify finish operation 1118B and correlate it to the move associated with incoming move operation 1110 at NSID 2. Content management system 110 also increments lamport clock 1120 and records the incremented clock value for finish operation 1118B at NSID 2. At this point, the move operation has completed at NSID 2 and content management system 110 can write a finished state in table 1104A containing incoming move records.

As illustrated in this example, when processing the move, content management system 110 can process delete operations 1114 at NSID 1 prior to add operations 1116 at NSID 2. This ordering or sequence allows client device 150 to list and process the delete and add operations (1114, 1116) according to their lamport clock order and avoid a scenario where the move results in client device 150 having two instances of the same content item or content item identifier (e.g., File ID). For example, this ordering or sequence prevents a state where client device 150 processes add operations 1116 and adds "IA" to NSID 2 while "IV" is also at NSID 1 and has not been removed from NSID 1. Such a sequence could result in two instances of "/A/" at client device 150, both instances corresponding to the same content item path and ID.

To prevent such scenario, the delete operations (1114) in a move can be serialized before the add operations for the move based on lamport dependencies as described herein. Since the lamport clock (1120) is incremented at each process, the adds will causally depend on the deletes and will be listed and processed after the deletes.

In some cases, incoming move operations are also serialized before outgoing move operations. This way, incoming moves are recorded and processed before their corresponding outgoing moves. Thus, if client device 150 detects the incoming move (1110) before the outgoing move (1108), it can continue processing the move as described here with a guarantee that it will not detect adds for the move until the deletes have been processed.

Moreover, when client device 150 receives from content management system 110 an outgoing move without a prior incoming move, client device 150 can process the outgoing move as a delete. For example, if client device 150 has access to NSID 1 but does not have access to NSID 2, it may list outgoing move operation 1108 without seeing incoming move operation 1110. Since client device 150 does not have access to NSID 2, it can process delete operations 1114 and complete after the deletes. To illustrate, if client device 150 (or the user at client device 150) does not have access to NSID 2, client device 150 may detect the outgoing move of directory "IV" at NSID 1, but may not have access to view or process operations 1110, 1116, 1118B associated with NSID 2 for the move. From the perspective of client device 150, the move may appear as a delete.

The serialization and lamport clock calculations here can therefore ensure proper ordering and processing of operations in a move and prevent errors and conflicts in the various scenarios that may be encountered by client device 150, such as moves associated with a source namespace (e.g., NSID 1) or a destination namespace (e.g., NSID 2) that client device 150 does not have access to. Proper serialization and lamport clock dependencies also prevent issues and conflicts resulting from changes generated during a move. Non-limiting example scenarios that can be encountered during a move include a mount or unmount of a source and/or destination namespace during the move, a remount of a source and/or destination namespace during the move, an add or delete operation during the move, a crash during the move, etc.

Figure 11C:
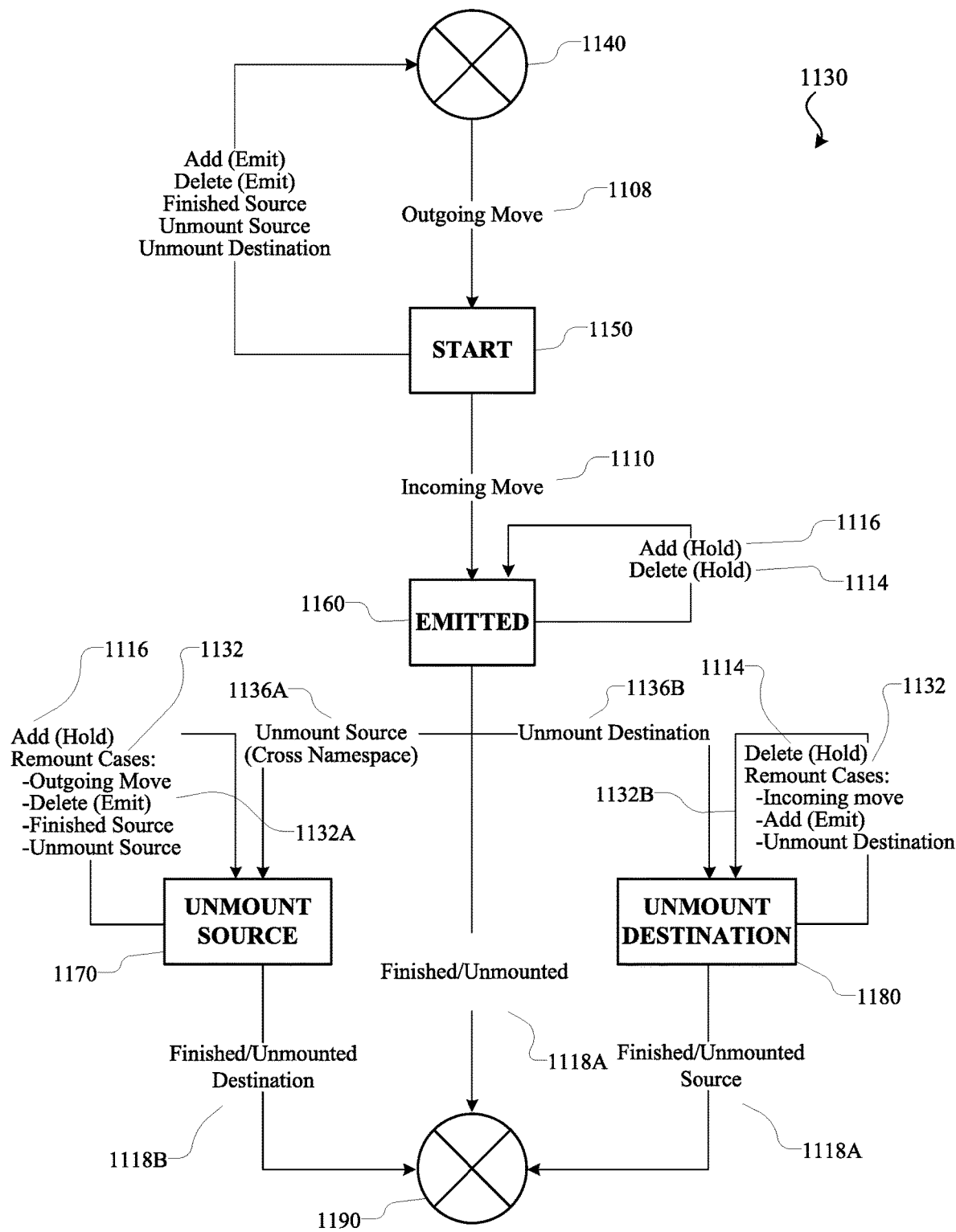
FIG. 11C shows an example state machine defining an example flow of operations at various states of a move operation.

To address the various scenarios that may be encountered in a move, a state machine can define a flow of tasks and operations for the different scenarios at each move state. FIG. 11C illustrates an example move state machine (1130) which defines the flow of operations at various states of a move. Move state machine 1130 can be processed for every move identifier in tables 1102, 1104A, 1104B. Move state machine 1130 addresses various scenarios or conditions that may be encountered in a move, including mounts or unmounts detected during a cross-namespace move as well as any other operations or access conditions during the move.

As illustrated, move state machine 1130 enters start state 1150 when outgoing move operation 1108 is detected. Outgoing move operation 1108 thus triggers move state machine 1130 to enter start state 1150 and begin processing the move. When processing a stream of operations, if move state machine 1130 detects an operation other than an outgoing move (1108), move state machine 1130 will abort 1140 and will not transition to start state 1150. For example, if move state machine 1130 detects an add operation (e.g., 1116), a delete operation (e.g., 1114), a finish operation (e.g., 1118A, 1118B), an unmount source operation, or an unmount destination operation, move state machine 1130 aborts 1140 without entering start state 1150 to initiate a move.

Once outgoing move operation 1108 is detected, move state machine 1130 transitions to start state 1150 to process the move. At start state 1150, when incoming move operation 1110 is detected, the move is emitted to client device 150 and move state machine 1130 transitions to emitted state 1160.

Incoming move operation 1110 can be recorded at table 1102 and associated at table 1104A with a lamport clock value of x−1. Outgoing move operation 1108 can be recorded at table 1102 and associated at table 1104B with a lamport clock value of x. This way, incoming move operation 1110 is serialized before outgoing move operation 1108 as previously described.

After the move is emitted (e.g., emitted state 1160), the move is set to finished or unmounted 1134 and move state machine 1130 reaches end state 1190. A finished state or operation can be processed or recorded for the move, and the finished state or operation can be correlated with the move identifier (e.g., 1112) associated with the move.

If the move is within the same namespace (e.g., asynchronous), the source in the namespace can be set to finished 1134 or unmounted. If the move is across namespaces (e.g., NSID 1 to NSID 2), the move can be set to finished 1134 at the source namespace (e.g., NSID 1) and/or the destination namespace (e.g., NSID 2). In some cases, a finished operation is correlated to the move identifier (e.g., 1112) of the move and recorded for the source namespace and/or the destination namespace.

If add operations 1114 or delete operations 1116 are detected after the move has been emitted (e.g., emitted state 1160), move state machine 1130 ignores the adds and deletes (1114, 1116) and proceeds to end state 1190. Thus, move state machine 1130 skips add operations 1114 and delete operations 1116 detected between emitted state 1160 and end state 1190.

In a cross-namespace move (e.g., NSID 1 to NSID 2), if unmount source operation 1136A is detected after the move is emitted (e.g., emitted state 1160) but before the move reaches end state 1190, move state machine 1130 transitions to unmount source state 1170. At unmount source state 1170, move state machine 1130 ignores any add operations 1116 detected. Move state machine 1130 sets the destination namespace (e.g., NSID 2) to finished or unmounted 1118B and proceeds to end state 1190. Setting the destination namespace to finished or unmounted 1118B can involve processing a finished or unmounted operation with the move identifier and/or recording a finished or unmounted state for the move identifier.

At unmount source state 1170, if remount scenario 1132 is detected, move state machine 1130 processes the outgoing move (e.g., 1108) for the source namespace (e.g., NSID 1), processes or emits delete operations (e.g., 1114) for the source namespace (e.g., NSID 1), and ignores any add operations 1116 detected for the destination namespace (e.g., NSID 2). From unmount source state 1170, move state machine 1170 proceeds when the source namespace is finished or unmounted, and sets the destination namespace to finished or unmounted 1118B and reaches end state 1190.

Remount scenario 1132 after unmount source operation 1136A can include remounting the source namespace (NSID 1) at any point before end state 1190. In some cases, unmount source operation 1136A and remount scenario 1132 can occur more than once prior to end state 1190. For example, a user can unmount the source namespace and remount the source namespace multiple times during the move. Each time the source namespace is unmounted and remounted, move state machine 1130 processes remount scenario 1132 at unmount source state 1170, until the source namespace is finished or unmounted and move state machine 1130 proceeds to end state 1190. Thus, in some cases, move state machine 1130 can loop through remount scenario 1132 at unmount source state 1170 until the source and destination namespaces are finished and end state 1190 is reached.

If unmount destination operation 1136B is detected after the move is emitted (e.g., emitted state 1160), move state machine 1130 transitions to unmount destination state 1180. At unmount destination state 1180, move state machine 1130 determines the source namespace (e.g., NSID 1) is finished or unmounted 1118A and proceeds to end state 1190. The source namespace can be set to a finished or unmounted state and a finished or unmounted record or operation can be correlated to the move identifier of the move.

If remount scenario 1132 is detected at unmount destination state 1180, move state machine 1130 processes the incoming move (e.g., 1110) on the destination namespace (e.g., NSID 2), processes add operations 1116 at the destination namespace (e.g., NSID 2), and ignores delete operations 1114 detected. Move state machine 1130 proceeds from unmount destination state 1180 when the destination namespace finishes or unmounts. After unmount destination state 1180, move state machine 1130 proceeds to end state 1190 when the source namespace is finished or unmounted 1118A.

Remount scenario 1132 after unmount destination operation 1136B can include remounting the destination namespace (NSID 2) at any point after unmount destination operation 1136B and prior to end state 1190. In some cases, unmount destination operation 1136B and remount scenario 1132 can occur more than once prior to end state 1190, causing move state machine 1130 to loop through remount scenario 1132 at unmount destination state 1180 until proceeding to end state 1190.

Figure 11D:
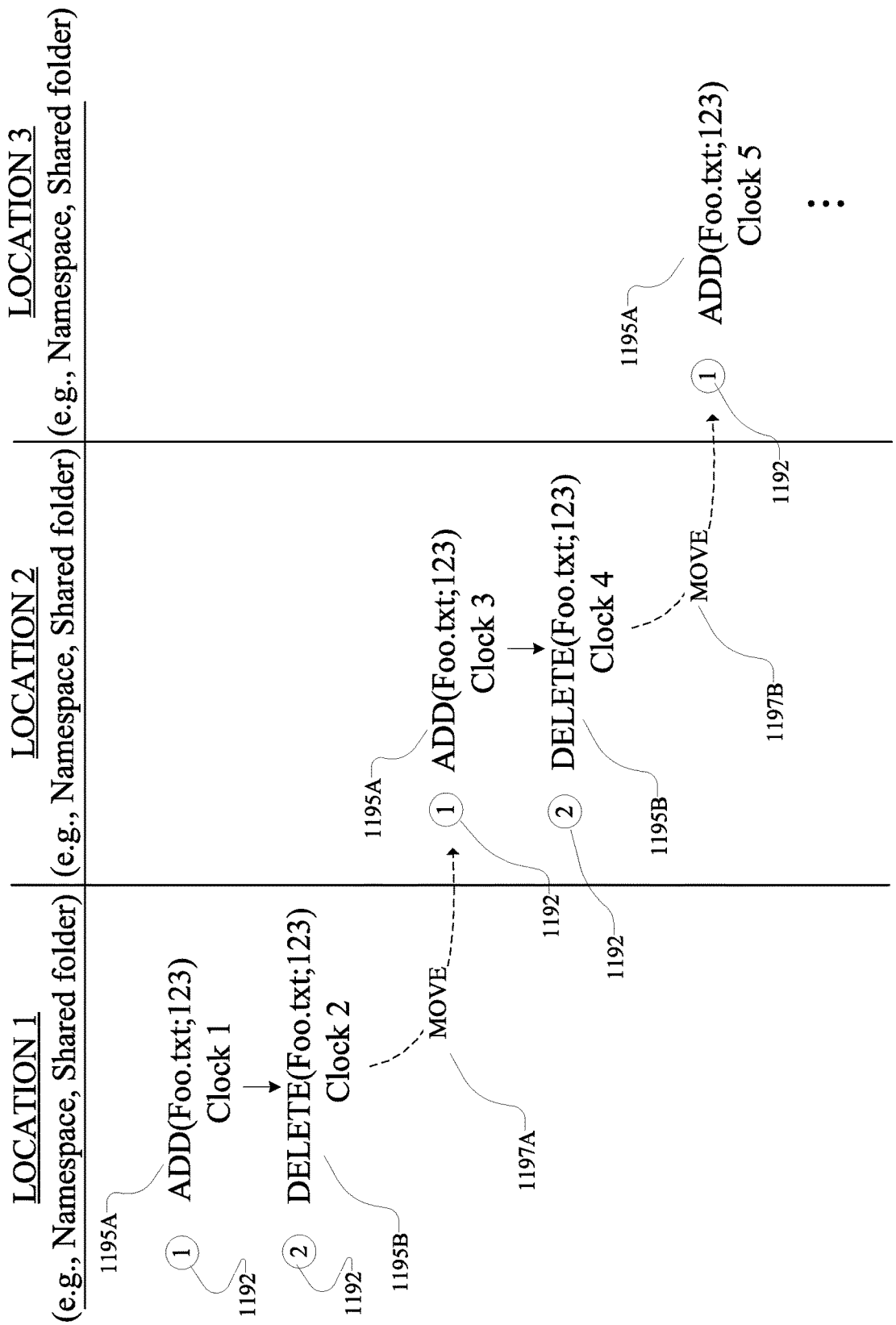
FIG. 11D shows a diagram of example move operations across locations based on a unique identifier of a content item and linearized based on causal relationships.

FIG. 11D shows a diagram of example move operations across locations based on a unique identifier of a content item and linearized based on causal relationships. In this example, move operations 1197A-B are performed across location 1, location 2, and location 3 based on operations 1195A, 1195B. Locations 1, 2, 3 can represent different namespaces or shared folders, for example. Revision numbers 1192 represent the ordering of operations 1197A-B within locations 1, 2, 3.

At add operation 1195A in location 1, file "Foo.txt" with unique identifier "123" is added to location 1. Add operation 1195A is assigned revision number 1 in location 1 and lamport clock 1. When move operation 1197A is generated to move file "Foo.txt" with unique identifier "123" from location 1 to location 2, delete operation 1195B is first processed at location 1 and designated revision number 2 in location 1 with lamport clock 2. Add operation 1195A is then processed at location 2 to add file "Foo.txt" with unique identifier "123" to location 2. Add operation 1195A at location 2 obtains revision number 1 at location 2 and lamport clock 3. As illustrated, the file ("Foo.txt") retains its unique identifier "123" when moved from location 1 to location 2. Thus, the unique identifier "123" uniquely identifies the file at any location.

When processing move operation 1197A, delete operation 1195B at location 1 and add operation 1195A at location 2 are serialized such that the delete of the file from the source (i.e., location 1) occurs before the add of the file to the destination (i.e., location 2). This serialization can be guaranteed by causally relating the delete and add operations and assigning the add operation on the destination (i.e., add operation 1195A at location 2) a higher lamport clock (clock 3) than the delete operation on the source (i.e., delete operation 1195B at location 1 with clock 2).

Move operation 1197B triggers a move of file "Foo.txt" with unique identifier "123" from location 2 to location 3. Move operation 1197B involves delete operation 1195B at location 2, which deletes file "Foo.txt" with unique identifier "123" from location 2, and add operation 1195A at location 3, which adds the file "Foo.txt" with unique identifier "123" to location 3. Again, the file "Foo.txt" retains its unique identifier "123" before and after the move. Delete operation 1195B at location 2 is assigned revision number 2 at location 2 and lamport clock 4, and thus is causally after add operation 1195A at location 2, which has lamport clock 3. Add operation 1195A at location 3 is assigned revision number 1 at location 3 and lamport clock 5.

As illustrated, move operations 1197A-B are processed using the unique identifier of the content item being moved (i.e., file "Foo.txt"), and the operations for implementing the moves are serialized according to respective lamport clocks and ordered by revision numbers 1192 within their respective locations. When serializing the add and delete operations for the moves, delete operations at the source are listed before add operations at the destination and designated lower lamport clocks than the add operations at the destination.

Commit Protocol

Figure 12:
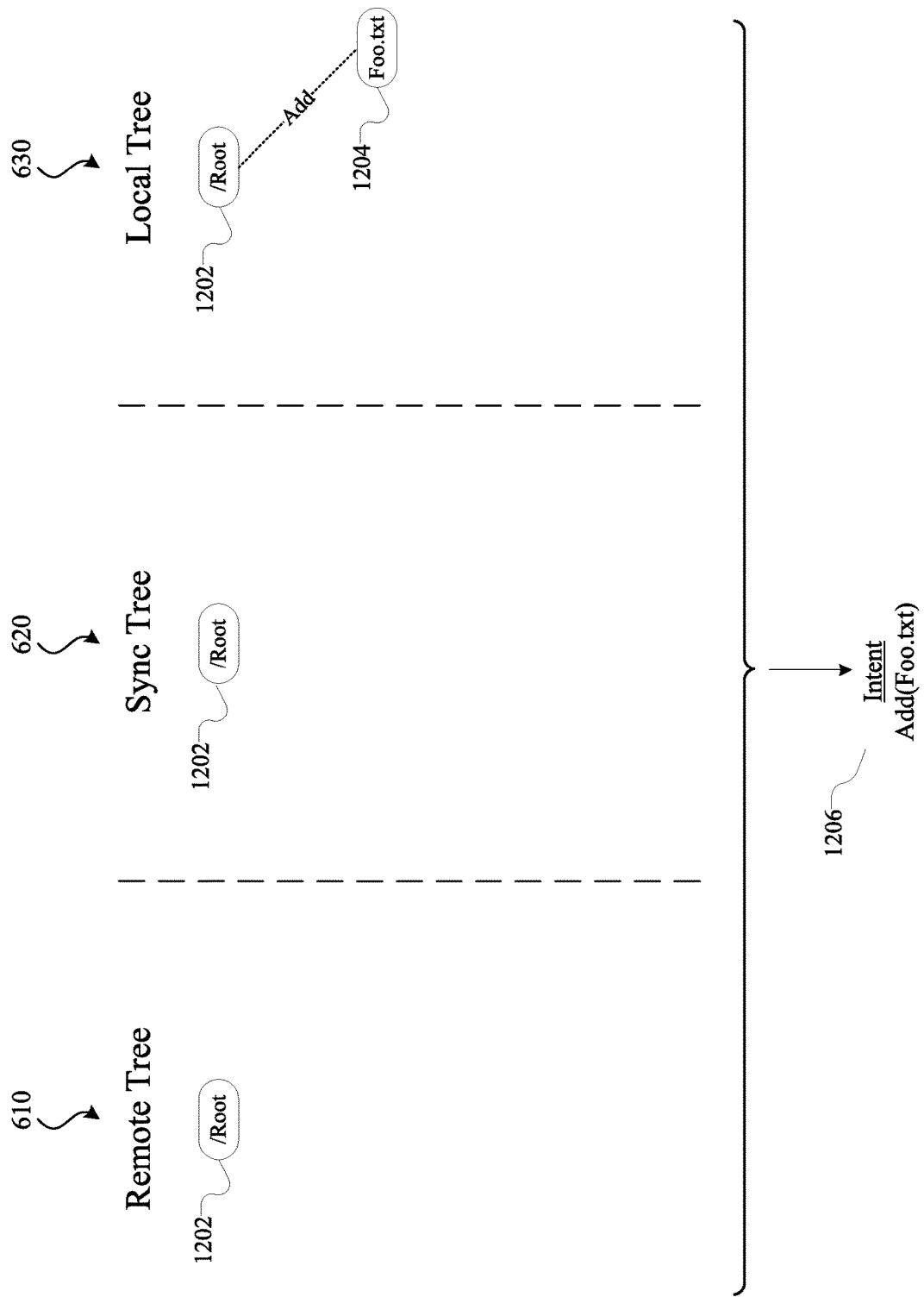
FIG. 12 shows an example update to the tree data structures shown in FIG. 6A, reflecting an intent to modify a content item based on a content item operation.

FIG. 12 illustrates an example state of tree data structures 610, 620, 630 reflecting an operation at client device 150. Intent 1206 represents the intended result of the operation at client device 150. In this example, intent 1206 shows an add operation for adding "Foo.txt" at client device 150. Local tree 630 has been modified to add node 1204 based on intent 1206. Node 1204 modifies local tree 630 to depict an add of "Foo.txt" within root node 1202. As previously explained, when intent 1206 is synchronized with content management system 110, client device 150 can update remote tree 610 and sync tree 620 to include node 1204 and thus synchronize tree data structures 610, 620, 630 at client device 150. When synchronized, tree data structures 610, 620, 630 reflect a synchronized state at client device 150.

To synchronize intent 1206 with content management system 110, client device 150 can commit intent 1206 to content management system 110. In this example, client device 150 commits the add of "Foo.txt" to content management system 110 in order to synchronize intent 1206 with content management system 110.

Figure 13A:
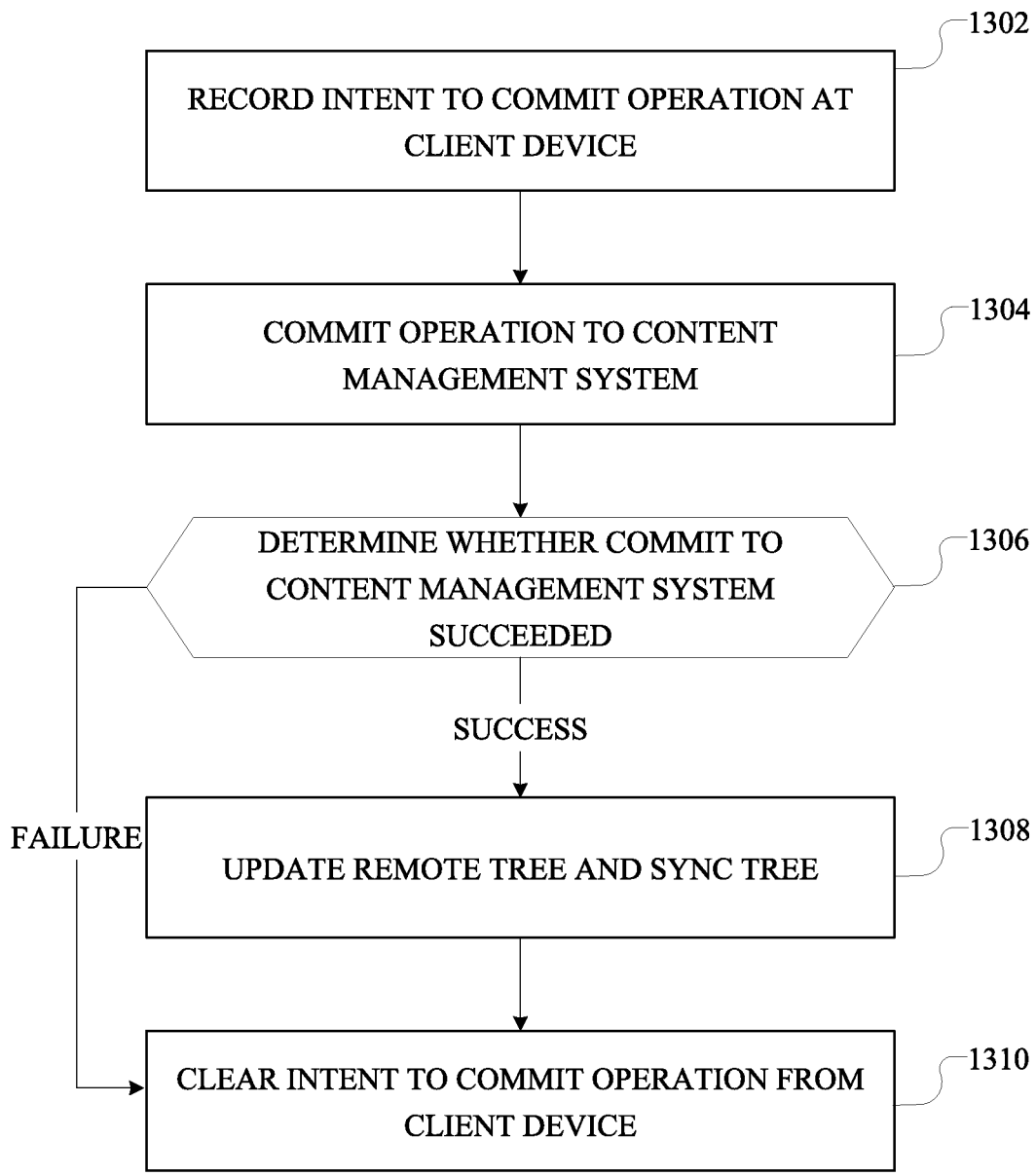
FIG. 13A shows an example method for committing a content item operation to a server file journal.

FIG. 13A illustrates an example method for committing intent 1206 to content management system 110. At step 1302, client synchronization service 156 on client device 150 records an intent to commit operation (e.g., operation from intent 1206) at client device 150. Client synchronization service 156 can record the intent to commit the operation durably on disk or memory at client device 150 to track the pending commit. Client device 150 can store dirty commit records and track modifications until an event triggers removal of the pending commit(s), such as a failure or success.

At step 1304, client synchronization service 156 commits the operation to content management system 110 (e.g., file journal interface 202). Client synchronization service 156 can send a message to content management system 110 requesting to commit the operation. The message can include a cursor, as previously explained, which content management system 110 can use to determine the state of content items at client device 150 and the position of client device 150 at server file journal 148. The cursor can include, for example, a server journal ID (SJID) for each namespace associated with client device 150. The SJID indicates the position of client device 150 at server file journal 148 for each namespace, and thus provides the state of each namespace at client device 150.

At step 1306, client synchronization service 156 determines whether the commit to content management system 110 from step 1304 succeeded. In some cases, content management system 110 can automatically send an error or acknowledgement to client synchronization service 156 in response to the commit, indicating whether the commit succeeded or failed. In some cases, client synchronization service 156 can contact content management system 110 to request an acknowledgement or error notification. For example, client synchronization service 156 can send a message to content management system 110 requesting acknowledgment that the commit succeeded.

If the commit succeeded, content management system 110 can respond to client synchronization service 156 and notify client device 150 that the commit succeeded. If the commit did not succeed, content management system 110 may respond with a failure response or may not respond to the request from client synchronization service 156. If client synchronization service 156 determines the commit failed, at step 1310 client synchronization service 156 clears the intent to commit operation from client device 150. If the state at client device 150 is outdated relative to the state at server file journal 148, client synchronization service 156 can receive or request any necessary updates to synchronize the state at client device 150 with the state at server file journal 148.

If client synchronization service 156 determines the commit succeeded, at step 1308, client synchronization service 156 updates remote tree 610 and sync tree 620 to include node 804 as shown in FIG. 8. At step 1310, client synchronization service 156 then clears the intent to commit the operation from client device 150.

By determining whether the commit to content management system 110 at step 1306 succeeded, client synchronization service 156 can prevent conflicts resulting from scenarios where client synchronization service 156 commits an operation and updates its content and tree data structures (610, 620, 630) but the commit does not succeed at content management system 110. This would create a conflict in state between client device 150 and content management system 110.

For example, after client synchronization service 156 commits the operation at step 1304, various scenarios can prevent the commit from actually being successfully processed and applied at content management system 110, such as a crash at client device 150 or content management system 110, a network condition (e.g., latency or congestion, network failure, etc.), processing conditions (e.g., long queue at content management system 110, memory errors at content management system 110, etc.), and so forth. At step 1306, client synchronization service 156 can thus verify whether the commit succeeded or failed before deciding whether to apply the operation or clear the stored or cached intent to commit at client device 150.

Checking if the commit succeeded and clearing the intent to commit if the commit failed also allows client device 150 to distinguish self-authored operations and avoid conflicting itself through self-authored operations. For example, client device 150 can record the intent to commit for any operations authored by client device 150 as well as an indication that the operations are self-authored. Client device 150 then checks with content management system 110 to verify whether the commit succeeded before applying the operation (e.g., updating the tree data structures). As described further below with respect to FIG. 13B, content management system 110 can guarantee that if it reports to client device 150 that an intent to commit has failed or was not received, such intent to commit will not subsequently succeed if subsequently received by content management system 110. Thus, client device 150 can similarly guarantee that a commit will not succeed after client device 150 indicates the intent to commit failed and clears the intent to commit after receiving a fail or success acknowledgment from content management system 110.

This can prevent a scenario where, for example, client device 150 believes an attempt to commit an operation failed and later receives from content management system 110 an update or indication of a revision based on the operation being subsequently approved by content management system 110. For example, client device 150 may send a commit to content management system 110. If the commit is temporarily lost or delayed, content management system 110 and client device 150 may believe that the commit failed. If the commit later resurfaces and content management system 110 processes and approves the commit after client device 150 has cleared the intent to commit or otherwise marked the intent to commit as failed, the operation associated with the failed commit could inadvertently be propagated to client device 150 even though the operation should have never been approved. Client device 150 may receive the operation and not realize the operation is its own operation from the previous failed commit, and apply the operation believing the operation was generated and synchronized from another device. Unable to distinguish the operation as the self-authored operation associated with the previous failed commit, client device 150 may apply the operation and create a conflict in the state of the associated content item(s) or namespace(s). The client device's own operation may thus create a conflict at the client device caused by the client device failing its own operation and subsequently applying the same operation under the belief the operation is a new revision generated by another device and propagated to the client device.

Figure 13B:
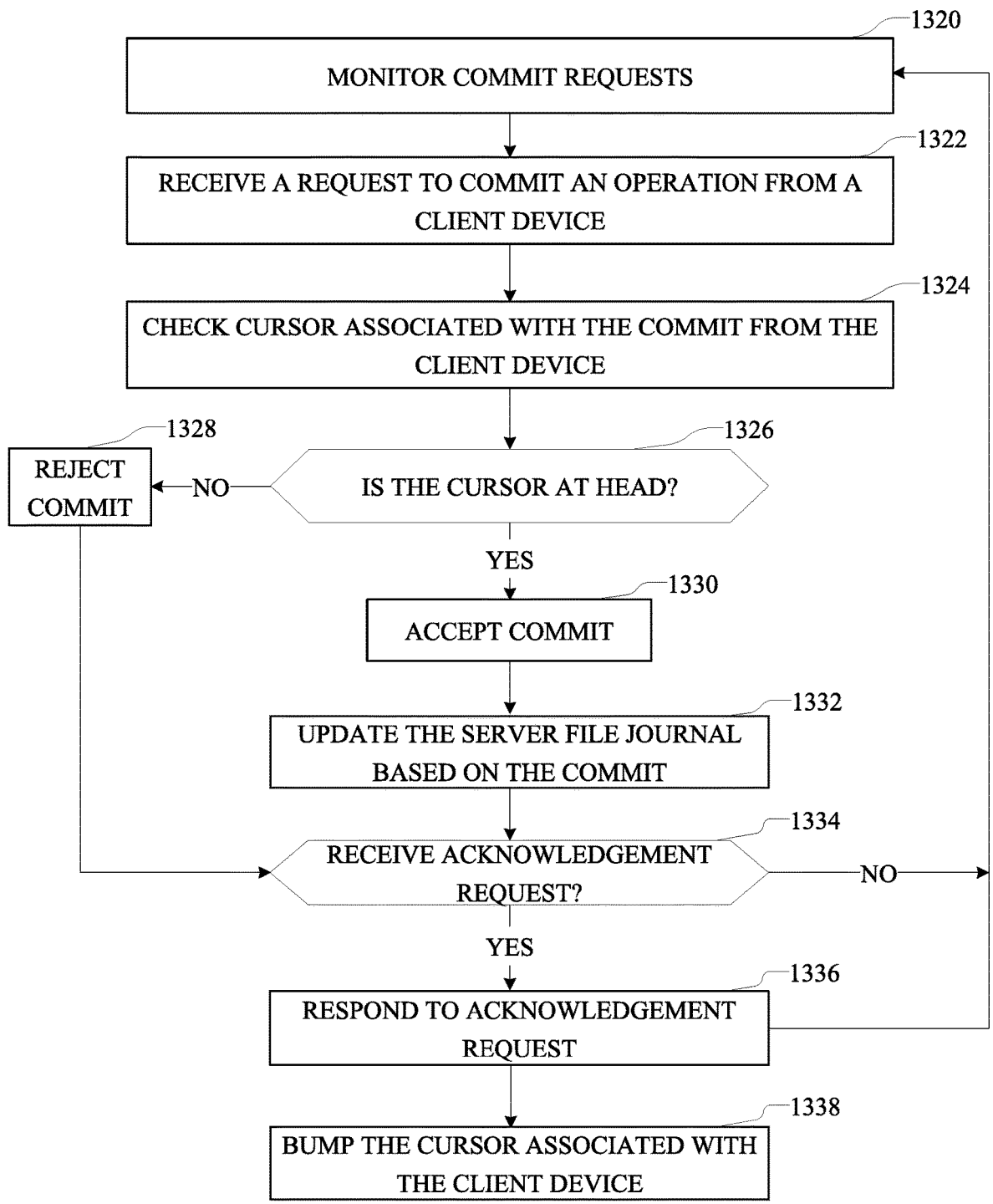
FIG. 13B shows an example method for processing a request to commit a content item operation from a client device.

FIG. 13B illustrates an example method for processing commits at content management system 110. At step 1320, file journal interface 202 monitors commit requests from client devices (e.g., client device 150). At step 1322, file journal interface 202 receives a request to commit an operation from client device 150 (e.g., client synchronization service 156). The request can identify the operation associated with the commit and a cursor associated with client device 150. For example, the request can be a request from client synchronization service 156 to commit intent 1206 as shown in FIG. 13A. Thus, the request can identify the add operation (e.g., Add "Foo.txt") corresponding to intent 1206 shown in FIG. 8, and the cursor at client device 150. The cursor at client device 150 can be the last or most current cursor received by client device 150 from file journal interface 202.

As previously explained, the cursor can identify the position of client device 150 at server file journal 148, which reflects the latest revisions or state of each namespace at client device 150 relative to the revisions or state at server file journal 148 for each of the namespaces. For example, the cursor can identify a server file journal identifier (SJID) for each namespace at client device 150. The SJID of a namespace indicates the latest SJID (e.g., row, revision, or state) for that namespace obtained by client device 150. The cursor can thus indicate whether client device 150 has received the latest revision in server file journal 148 for each namespace at client device 150.

In response to the request to commit the operation, at step 1324, file journal interface 202 checks the cursor associated with the commit from client device 150. At step 1326, file journal interface 202 determines if the cursor is at head. Here, file journal interface 202 determines if the revision (SJID) identified by the cursor for each namespace in the cursor is the latest revision for that namespace on server file journal 148.

For example, if the cursor identifies SJID 50 for namespace 2, file journal interface 202 determines if SJID 50 is the latest SJID (e.g., the latest row or revision) for namespace 2 in server file journal 148 (e.g., journal 310). If so, then the cursor from client device 150 is at head, meaning it is at the end of server file journal 148 for each namespace at client device 150, which indicates that client device 150 has obtained the latest revisions or state in server file journal 148 for each namespace at client device 150. If not, the cursor from client device 150 is not at head, meaning it is not at the end of server file journal 148 for each namespace at client device 150, which indicates that client device 150 has not obtained the latest revisions or state in server file journal 148 for each namespace at client device 150. In other words, the content items at client device 150 associated with one or more namespaces are outdated.

If the cursor is not at head, at step 1328, file journal interface 202 rejects the commit from client device 150. For example, based on the cursor not being at head, file journal interface 202 can determine that the operation associated with the commit from client device 150 modifies a content item(s) and/or namespace(s) that is outdated (e.g., does not reflect the latest revisions at server file journal 148) and may create a conflict with the revisions at server file journal 148 for that content item(s) and/or namespace(s). File journal interface 202 can thus reject the commit to prevent a conflict being created by the operation associated with the commit. File journal interface 202 can send a response to client device 150 indicating that the commit has been rejected. File journal interface 202 can also send the latest revisions or state in server file journal 148 to client device 150, or prompt client device 150 to perform an update.

If the cursor is at head, at step 1330, file journal interface 202 can accept the commit. In some cases, file journal interface 202 can perform another check to verify the operation will not create a conflict prior to accepting the commit. For example, in addition to determining that the cursor is at head, file journal interface 202 can also compare the revision reflected by the operation associated with the commit (e.g., intent 1206) with the revisions at server file journal 148 to verify that the operation will not create a conflict even if the cursor is at head. To illustrate, assume the operation is a delete operation for a file and file journal interface 202 determines that the cursor is at head. Before accepting the commit, file journal interface 202 can verify that server file journal 148 includes a previous revision adding the file to a specific namespace. If file journal interface 202 determines that server file journal 148 does not include a revision for adding the file to the namespace, file journal interface 202 can identify a conflict between the delete operation and the lack of an add revision. File journal interface 202 can then reject the commit, reconcile the conflict, and/or ask client device 150 to reconcile the conflict.

After accepting the commit, at step 1332, file journal interface 202 updates server file journal 148 based on the commit. For example, file journal interface 202 can write a revision to server file journal 148 reflecting the operation associated with the commit. File journal interface 202 can translate the operation to a revision, as previously described, and write the revision for the namespace associated with the operation.

At step 1334, file journal interface 202 can determine if it received an acknowledgment request from client device 150. For example, client device 150 can send a request to file journal interface 202 for acknowledgment of the commit in order to determine if the commit failed or succeeded. At step 1336, file journal interface 202 can respond to the acknowledgment request from client device 150. File journal interface 202 can notify client device 150 of the status of the commit, including whether the commit succeeded or failed.

At step 1338, file journal interface 202 can bump the cursor associated with client device 150. For example, assume the cursor from client device 150 identifies SJID 6 for namespace 1 as the latest revision for namespace 1 at client device 150, and the operation associated with the commit corresponds to namespace 1. File journal interface 202 can bump the cursor associated with namespace 1 from SJID 6 to SJID 7. File journal interface 202 can provide the updated cursor to client device 150, and client device 150 can use the updated cursor for future commits.

File journal interface 202 can bump the cursor after updating server file journal 148 or after receiving an acknowledgment request from client device 150. In some cases, file journal interface 202 can bump the cursor after receiving an acknowledgment request from client device 150 even if the commit associated with the acknowledgement request was not accepted by file journal interface 202. For example, if file journal interface 202 receives an acknowledgment request from client device 150, it can bump the cursor based on the acknowledgment request even if file journal interface 202 never received or approved the associated request to commit. By bumping the cursor, file journal interface 202 can guarantee that once it indicates to client device 150 that the commit has not been accepted or recorded, the commit will not be subsequently accepted or recorded.

For example, when client device 150 sends a request to commit to file journal interface 202, in some cases the request can be temporarily lost or delayed for a variety of reasons, such as network or computing issues (e.g., latency, congestion, crashes, client-side task cancellation, etc.). As a result, file journal interface 202 may not receive the request to commit until later than expected. For example, file journal interface 202 may receive an acknowledgment request from client device 150, respond to the acknowledgment request, only to later receive the original request to commit from client device 150. In this example, if file journal interface 202 responds to client device 150 with an indication that the commit was not recorded, received, or approved, and subsequently receives and approves/records the commit, such commit can create a conflict between the state at content management system 110 and client device 150.

Thus, to guarantee that when file journal interface 202 tells client device 150 that a commit was not recorded or approved, such commit will not be later committed even if subsequently received by file journal interface 202, file journal interface 202 can bump the cursor to ensure a lost or delayed commit will be rejected if it resurfaces. For example, when file journal interface 202 receives a request to commit after responding to client device 150 that the commit was not recorded or approved, file journal interface 202 checks if the cursor is at head as explained in step 1326. Since file journal interface 202 has bumped the cursor since the request to commit was initially sent by client device 150, file journal interface 202 will determine that the cursor associated with the request to commit is not at head and thereafter reject the request to commit as explained in step 1328. Accordingly, file journal interface 202 can prevent conflicts or errors resulting from commits delayed or lost during processing or transmission. In other words, if a commit has not been approved or received when the cursor is bumped, bumping the cursor will ensure that such commit is never approved or recorded.

This also prevents conflicts at client device 150 from self-authored operations, as previously explained. For example, if client device 150 fails an intent to commit at client device 150, bumping the cursor will ensure a failed commit is not subsequently recorded by file journal interface 202 and propagated to client device 150.

Bumping the cursor can also prevent various modification or commit races that could be potentially created with other approaches, such as a "commit again" approach where client device 150 and/or file journal interface 202 can retry a failed commit. Below is a non-limiting example of such a race or condition prevented by bumping the cursor.

Client device 150 records intent 1206 to add "Foo.txt" with blocklist A. The commit request from client device 150 is dispatched to file journal interface 202 but delayed at the network. In addition, client device 150 crashes after sending the commit. Client device 150 then comes back online and in recovery mode attempts to re-commit the add. File journal interface 202 rejects the commit because "Foo.txt" is already latest elsewhere. Client device 150 interprets the rejected commit as proof that its own commit which is in flight has failed and consequently clears the intent to commit cache/log at client device 150. Client device 150 then edits "Foo.txt" on client device 150 to blocklist B. "Foo.txt" is deleted remotely by another user or device. The original commit request for intent 1206 from client device 150 then arrives at file journal interface 202 and is accepted by file journal interface 202. Client device 150 then pulls the add of "Foo.txt" with blocklist A from file journal interface 202 at the same path as the edited "Foo.txt" with blocklist B. Client device 150 now has a conflict between the edited "Foo.txt" with blocklist B and its own previous add of "Foo.txt" with blocklist A. Accordingly, client device 150 has inadvertently conflicted itself.

This example scenario would be prevented by bumping the cursor. For example, when file journal interface 202 later receives the add commit for "Foo.txt" with blocklist A, file journal interface 202 checks the cursor and determines that the cursor is not at head (e.g., step 1326), as the cursor has been bumped since the commit was sent by client device 150. File journal interface 202 will then reject the commit and prevent client device 150 from pulling the add of "Foo.t"t" with blocklist A from file journal interface 202. Thus, once client device 150 determines a commit has failed and clears the intent to commit cache/log, the commit is guaranteed to never succeed. Accordingly, file journal interface 202 and client device 150 can guarantee that client device 150 will not pull the add of "Foo.txt" with blocklist A after the edit of "Foo.txt" in the previous example, and create a conflict between "Foo.txt" with blocklist A and "Foo.txt" with blocklist B at the same path.

Symbolic Links

Figure 14:
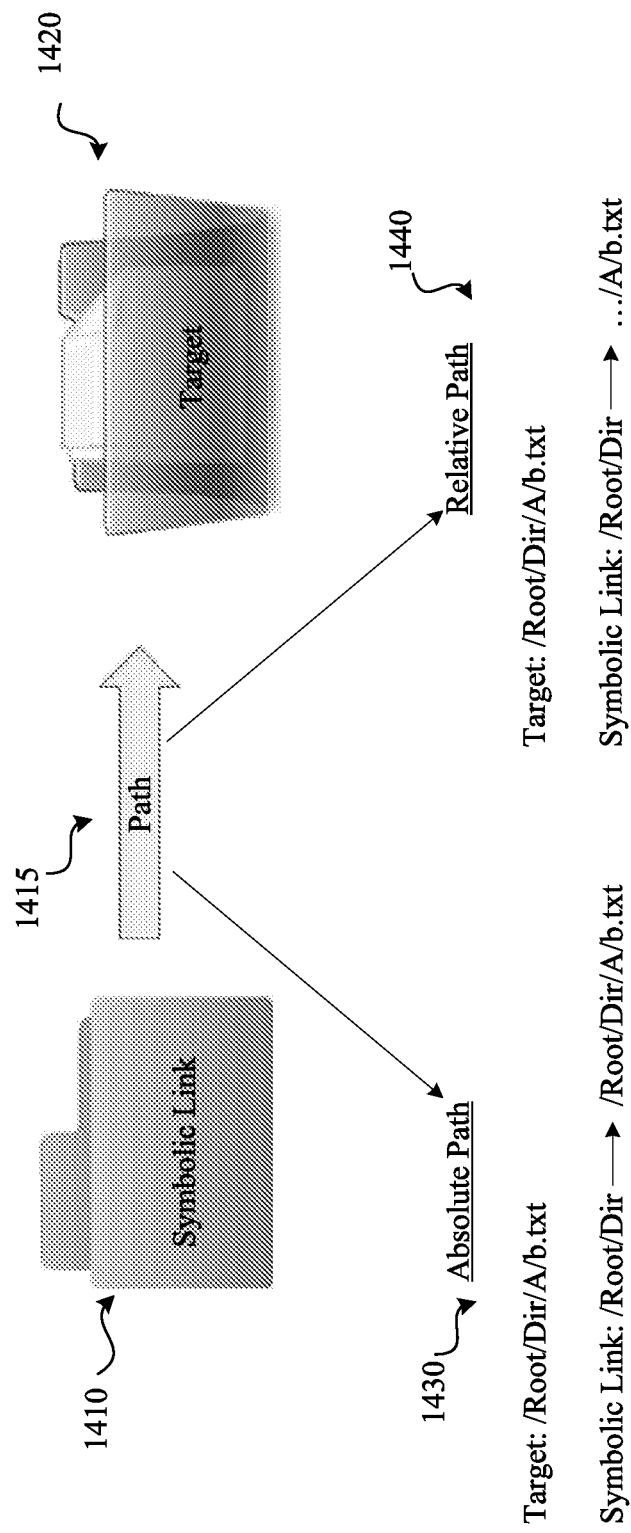
FIG. 14 shows a diagram of an example symbolic link.

FIG. 14 shows an example symbolic link. A symbolic link ("sym link") is a content item (e.g., file) that contains a reference or pointer to another content item (e.g., a file or directory). The reference or pointer is a path to the target content item, such as a relative or absolute path. The symbolic link may appear as a file, folder, or shortcut on client device 150, but when selected, the symbolic link redirects to the target content item. Thus, the symbolic link can be used to access the target content item from the symbolic link.

In FIG. 14, symbolic link 1410 depicts a symbolic link with path 1415 to target 1420. When a user clicks on symbolic link 1410, the user will be redirected to target 1420 via path 1415. If path 1415 is valid and the user does not encounter any problems accessing target 1420, the user will gain access to the content of target 1420 through symbolic link 1410.

As illustrated here, path 1415 can be an absolute path (1430) or a relative path (1440). Absolute path 1430 contains the full path of target 1420 on a destination filesystem or location regardless of the relative location of symbolic link 1410, and can be accessed via symbolic link 1410 irrespective of any relative location between symbolic link 1410 and target 1420.

Relative path 1440 contains a path relative to symbolic link 1410. For example, symbolic link 1410 is located in this example at "/Root/Dir" and target 1420 is located at "/Root/Dir/A/b.txt". In absolute path 1430, symbolic link 1410 points to the full path of target 1420, namely "/Root/Dir/A/b.txt". In relative path 1440, symbolic link 1410 instead points to " . . . /A/b.txt", which is the path to target 1420 relative to "/Root/Dir", where symbolic link 1410 is located.

In the synchronization context, symbolic links present various challenges. First, the synchronization behavior of symbolic links may vary on different operating systems. Moreover, if the system synchronizes the symbolic link but does not also store and synchronize the content of the target content item, other users or devices receiving a copy of the symbolic link may not be able to access the target. Thus, the symbolic link may not properly synchronize to other user accounts or devices and may become invalid for other user accounts or devices. The link created by the symbolic link to the target may thus be broken when synchronized. This can further create problems for users. For example, certain content items, such as application bundles, may often include files that are symbolic links pointing to other files or folders. If those symbolic links are broken through synchronization, the content items (e.g., application bundles) will become corrupt, invalid, etc.

On the other hand, if the system synchronizing a symbolic link follows the target and synchronizes the target's content, this can also create multiple problems for other users or hosts. For example, in some instances, the target may not be accessible to other users or hosts and the synchronization may thus create inconsistencies. Different users and devices could end up with different synchronization results or behavior for the symbolic links based on various factors, such as access, link validity, etc. Moreover, the contents of the target could be added to a user's account or device when the user did not intend for such content to be included, and may even fill up the storage available for the user account or device. Such synchronization can also create security concerns by copying target content from a user's account or device which the user did not intend to share with other users or devices or may allow other users or devices to gain unauthorized access to the user's content and/or device.

Depending on whether the path in the symbolic link is absolute or relative, other inconsistencies can also result based on invalid links resulting at other hosts or accounts. For example, an absolute path used in a symbolic link may point to a valid location on a local filesystem of a client device, which will not be accessible from another device. Thus, when the symbolic link with the absolute path is synchronized to other devices, those devices will not have access to the target and the symbolic link will become invalid at those devices.

Various other problems can result when synchronizing symbolic links. FIGS. 15A-D illustrate various scenarios for synchronizing symbolic links, and describe different options for synchronization as well as potential benefits and disadvantages.

FIG. 15A shows a table of an example scenario (1500) for synchronizing symbolic links when the target and the symbolic link are contained in the same namespace (e.g., NSID). The table includes options 1505 for handling the synchronization of the symbolic link (e.g., 1410) depending on whether the path (e.g., 1415) in the symbolic link is a relative path (1440) or an absolute path (1430). Options 1505 depict various advantages and disadvantages for situations when the path is a relative path (1440) and when the path is an absolute path (1430), which are further described below.

Option 1 includes synchronizing the symbolic link as a symbolic link. This refers to treating the symbolic link as a symbolic link and synchronizing the symbolic link itself without following the path (1440 or 1430) and synchronizing the target, even if synchronization of the symbolic link may render the symbolic link invalid for some users or devices.

At option 1, synchronization of the symbolic link may ensure data integrity (e.g., data synchronized, including symbolic links, reflects the data as stored by the user) when path 1415 is relative path 1440 or absolute path 1430. Option 1 also ensures consistency across platforms (e.g., operating systems) when the path (1415) is either relative (1440) or absolute (1430).

Consistency across platforms refers to the synchronization behavior of client application 152 (e.g., via client synchronization service 156) across different platforms (e.g., operating systems). For example, the ability or timing for detecting content operations or events and trigger synchronization can vary when client application 152 is hosted on different operating systems. This variation can depend on where the target resides, and may be affected by other factors as well. For example, as further explained below with respect to option 2 as well as FIGS. 15C and 15D, the timing or ability to detect changes and trigger synchronization when a change occurs may vary between operating systems depending on whether the change occurred on a target content item that is an "internal target" or an "external target".

An internal target can refer to a target contained within an area or location (e.g., a directory, a folder, a volume, a partition, a disk, etc.) on client device 150 that is set or enabled for synchronization with content management system 110 and/or available to content management system 110 and/or client application 152 for management and/or synchronization, and an external target can refer to a target contained outside of such area or location. For example, a directory, namespace or folder on client device 150 that is tracked and synchronized by content management system 110 and contains any or all of the content items maintained by client device 150 for a user account at content management system 110 is an internal target, while anything outside of such directory, namespace or folder is an external target.

To illustrate, client device 150 may have a directory "/Home/" (not shown) which serves as the top directory of content items for user account "Lisa" (not shown) on content management system 110. Content items stored inside of "/Home/" can be synchronized with content management system 110, and content items residing outside of "/Home/" may not be synchronized with content management system 110. Thus, the directory "/Home/" and anything within "/Home/" can be considered an internal target by content management system 110. By contrast, anything outside of the directory "/Home/" can be considered an external target by content management system 110. Accordingly, in this example, the folder "/Home/Folder Al" (not shown) would be considered an internal target and any content items (e.g., folders, files, etc.) residing at, say, "1" or "Thin!" (not shown) on client device 150 may be considered an external target.

Referring back to the notion of consistency across platforms described in option 1, when a target is an internal target, client application 152 will generally be able to detect a change to the internal target and trigger synchronization when the change occurs on clients with different operating systems. Thus, this synchronization behavior (i.e., the ability to detect and synchronize a change when it occurs) is consistent across platforms (e.g., operation systems). However, as further described below, synchronization behavior may vary across platforms when the change occurs at an external target.

As illustrated in scenario 1500 shown in FIG. 15A, option 1 can, however, result in inconsistencies across hosts that have synchronization disabled for the symbolic link or target. This applies when the path (1415) is relative (1440) or absolute (1430). For example, if a symbolic link points to "Folder A" (not shown) and a user has synchronization of "Folder A" to client device 150 disabled (e.g., by selectively disabling synchronization of "Folder A" to exclude "Folder A" from synchronizations operations), client device 150 will not store a local copy of "Folder A", as "Folder A" will be removed from client device 150 for the user and may only be stored remotely at content management system 110 and/or at other client devices. Accordingly, when the symbolic link pointing to "Folder A" is synchronized at client device 150, the symbolic link will be invalid as it will point to a target (i.e., "Folder A") that does not exist on client device 150.

If the path is an absolute path (1430), option 1 can also result in inconsistencies across hosts for any hosts where the absolute path is invalid. For example, as shown in FIG. 14, absolute path 1430 of symbolic link 1410 points to target 1420 at "/Root/Dir/A/b.txt". If symbolic link 1410 is synchronized to a client device that does not contain one or more of the folders or directories in absolute path 1430 (e.g., "/Root/", "'Did" and/or "/A/"), then symbolic link 1410 at that client device will be invalid.

Option 2 involves following the symbolic link to the target and synchronizing the target. Thus, option 2 synchronizes the actual target and content of the target. In the example of symbolic link 1410, option 2 would involve synchronizing target 1420 instead of symbolic link 1410.

In option 2, if the path of the symbolic link is a relative path (1440) or an absolute path (1430), synchronization option 2 can corrupt content items which rely on the symbolic link. For example, application bundles often include symbolic links pointing to other items and rely on those symbolic links being valid and their paths properly pointing to their targets. Thus, in option 2, when a target is synchronized instead of the symbolic link to that target, the application bundle relying on that symbolic link can become corrupt and/or may generate errors. To illustrate, many different operating systems and applications use bundles to encapsulate code and resources for the operating systems and applications. Bundles can use directories and files for organization and may contain symbolic links. When option 2 synchronizes the target of a symbolic link instead of the symbolic link, the symbolic link is replaced with a copy of the target which generates an error when the operating system or application expects a symbolic link and attempts to read the symbolic link. This can in turn render the code, resources, and/or content implemented via the symbolic link unreadable or inaccessible by the operating system or application.

Synchronizing the target in option 2 can also lead to large storage utilization, as previously mentioned, when the path is either relative or absolute. For example, the symbolic link may lead to the target being synchronized and stored on a client device even though the user may not want or intend for that content to be stored on the client device. The synchronization of the target can also lead to higher storage utilization for a user account at content management system 110, which can result in higher costs to the user account or limited availability for other content items. In some cases, synchronization of the target can lead to a significant increase in storage utilization and may also lead to duplicate content items. For example, some media applications, such as a photos application, may use symbolic links in their libraries to modify a library folder structure or transform an older library folder structure to a new compatible structure. If the libraries reside in a synchronized directory and are enabled for synchronization with content management system 110, option 2 may cause the targets for every symbolic link in the libraries to be synchronized and copied across devices. This can result in duplication of data. For example, the content of the target may be stored and synchronized at their actual location as well as at the location of the target's symbolic link. If the volume of target content synchronized via option 2 is large or the size of the target content items is large—as is often the case with photos or videos for example—the duplicated data can result in a significant increase in storage utilization across client devices as well as on user account(s) at content management system 110.

For both relative and absolute paths, option 2 can also result in synchronization asymmetry where the access, views, and/or behavior differs between user accounts and/or devices. For example, assume a first client adds symbolic link 1410 in "/Root/" pointing to target 1420 at "/Root/Dir/A/b.txt", and "/Root/" is later synchronized to a second client. If symbolic link 1410 is synchronized according to option 2, namely by following target 1420 and synchronizing target 1420 (i.e., "/Root/Dir/A/b.txt"), the second client will receive a copy of "b.txt" from target 1420 at "'Root/Did", while the first client will have symbolic link 1410 at "/Root/Dir/". Such asymmetric behavior can thus cause synchronization inconsistencies where the first client and the second client may have different content after synchronization is complete. Moreover, such synchronization asymmetry can occur when the path of the symbolic link is a relative path (1440) or an absolute path (1430).

Further, at option 2, the synchronization of the target can create potential security problems. Potential security problems can result when content of the target is synchronized to other user accounts or devices, when the target may not have been intended for sharing or may expose sensitive data. Consider the following example. Assume a symbolic link in "Folder A" (not shown) points to "/etc/password" (not shown), and "Folder A" is later uploaded to content management system 110 and shared and/or synchronized with other client devices. When "Folder A" is shared and/or synchronized with a user account or client device, the content in "Folder A" will include the content from the target "/etc/password" of the symbolic link in "Folder A". However, content item "/etc/password" may be a sensitive or security item. Thus, the inadvertent sharing or synchronization of "/etc/password" as part of the content of "Folder A" can create a security hole, and could be leveraged to extract data from a user's computer or gain unauthorized access to a user's data.

At option 3, the synchronization simply ignores symbolic links and doesn't synchronize the symbolic links or the target content. In both cases of relative and absolute paths, this option can create a consistent behavior and view across platforms and hosts, but may corrupt content items that rely on the symbolic link or need access to the target content.

FIG. 15B shows a table of an example scenario (1510) for synchronizing symbolic links when the target and symbolic link are contained on different namespaces. Options 1, 2, and 3 in scenario 1510 have similar advantages and disadvantages for relative paths and absolute paths as scenario 1500. However, in addition, scenario 1510 introduces additional, potential problems caused by the content spanning multiple namespaces. For example, if a symbolic link points to a target on a different namespace, the symbolic link may become invalid if synchronized to users or devices that do not have access to the different namespace, and the target content may not be accessible at option 2 if it resides on a namespace which a user or device cannot access.

FIG. 15C shows a table of an example scenario (1520) for synchronizing symbolic links when the target of the symbolic link is an internal target. As previously described with reference to FIG. 15A, an internal target can refer to a target contained within an area or location (e.g., a directory, a folder, a volume, a partition, a disk, etc.) on client device 150 that is set or enabled for synchronization with content management system 110 and/or available to content management system 110 and/or client application 152 for management and/or synchronization.

At option 1, if the path is a relative path (1440) or an absolute path (1430), synchronization of the symbolic link can ensure data integrity and consistency across platforms, but may create inconsistencies across hosts for targets that have synchronization disabled at those hosts and may result in inconsistencies for symbolic links spanning multiple namespaces. If the path is an absolute path, option 1 can also result in inconsistencies across hosts if the path is invalid at those hosts.

At option 2, if the path is a relative path (1440) or an absolute path (1430), synchronization of the target can lead to consistency across platforms, but may result in synchronization asymmetry, potential inconsistencies for symbolic links spanning multiple namespaces, and corruption of content items that rely on symbolic links being valid and functional, such as bundles. In addition, if the path is an absolute path, option 2 can create potential security problems as previously explained.

At option 3, when the path is either relative or absolute, ignoring the symbolic link can result in consistency across platforms and hosts, but may corrupt content items that rely on symbolic links being valid and functional.

FIG. 15D shows a table of an example scenario (1530) for synchronizing symbolic links when the target of the symbolic link is an external target. As previously described with reference to FIG. 15A, an external target can refer to a target that is not contained within an area or location (e.g., a directory, a folder, a volume, a partition, a disk, etc.) on client device 150 that is set or enabled for synchronization with content management system 110 and/or available to content management system 110 and/or client application 152 for management and/or synchronization.

At option 1, when the path is either relative or absolute, synchronizing the symbolic link can ensure data integrity, but may result in invalid links for user accounts or hosts that do not have access to the target, and may result in inconsistencies across platforms.

Inconsistencies across platforms can result from client application 152 being implemented on different operating systems. For example, in UNIX-based operating systems such as LINUX and MACINTOSH operating systems developed by APPLE INC. (e.g., macOS or also referred as MAC OS X), client synchronization service 156 in client application 152 may detect changes occurring at an external target, and may trigger synchronization of the contents of the external target when the external target is updated. This means that web clients and other clients will have the latest version of the external target when the target is updated. However, in WINDOWS-based operating systems developed by MICROSOFT CORPORATION, client synchronization service 156 in client application 152 may not detect changes to external targets when the external targets are modified. Instead, client synchronization service 156 may detect such changes when client application 152 or client synchronization service 156 is restarted at the host. Thus, synchronization of changes to the external targets may not occur when the external targets are modified but later when client application 152 or client synchronization service 156 is restarted at the host. At various times, this can result in inconsistencies in the content on some user accounts or devices, and may lead some users to believe that the symbolic link synchronization is broken or not supported.

Moreover, the synchronized symbolic links are guaranteed to be valid only on the hosts where the symbolic links are created. In other words, the symbolic links can become invalid in some hosts, as the target may not exist in those hosts.

At option 2, when the path is either relative or absolute, synchronization of the target corrupts content items that rely on symbolic links being valid and functional, creates synchronization asymmetry, and results in inconsistencies across platforms. In the case of symbolic links that use an absolute path to the target, synchronization of the target can also lead to security risks as previously explained.

At option 3, ignoring the symbolic links can yield consistency across platforms and hosts in either absolute or relative path scenarios. However, in both absolute and relative paths, ignoring the symbolic links corrupts any content items that rely on symbolic links.

As illustrated in scenarios 1500, 1510, 1520, 1530, there are various options (1505) for synchronizing symbolic links, and the various options can have different advantages and disadvantages for the various scenarios. In each case, the advantages and disadvantages are affected by a number of factors. Accordingly, rules and/or requirements can be configured for handling synchronization of symbolic links in the different scenarios. In some cases, rules can be set which require symbolic links to always be synchronized as symbolic links regardless of whether they contain an absolute or relative path or which scenario applies to the particular synchronization scenario. This requirement can ensure consistency across hosts, platforms, scenarios, etc., and provide predictable results and behavior for symbolic links. At this same time, as illustrated in FIGS. 15A-D, this approach can result in inconsistencies and errors in certain scenarios.

In some cases, rules can be created to define different synchronization behaviors for symbolic links based on options 1505, scenarios 1500, 1510, 1520, 1530, the type of path in a symbolic link (e.g., absolute path 1430 or relative path 1440), and/or the various advantages and disadvantages described in scenarios 1500, 1510, 1520, 1530. For example, a rule can be defined that requires the actual symbolic links to be synchronized in every instance, but also provides that if synchronization of the symbolic link breaks/invalidates the symbolic link, content management system 110 can generate a prompt for one or more user accounts affected which requests user input, and allows the user to accept the synchronization, reject the synchronization, request the symbolic link be modified to preserve its functionality or validity post synchronization, or request that the target be also shared and synchronized with a user who does not have access to the target and thus would not be able to use the symbolic link.

For example, if a symbolic link is being synchronized with a set of user accounts or devices that also have access to the target, content management system 110 can determine that synchronization of the symbolic link will not break or invalidate the symbolic link, and simply synchronize the symbolic link to those user accounts. If the symbolic link has an absolute path which may become invalid when synchronized with other user accounts or devices, but the other user accounts or devices otherwise have access to the target, content management system 110 can notify the user account that created the symbolic link that the symbolic link will not function for the other user accounts or devices and ask the user account if the path in the symbolic link should be converted from absolute to relative in order to preserve the functionality or validity of the link for the other user accounts or devices. The user can allow modification of the symbolic link to preserve its validity after synchronization, and content management system 110 can change the absolute path to a relative path that is valid for all user accounts or devices receiving a synchronized copy of the symbolic link. Since the other user accounts or devices in this example already have access to the target, the symbolic link will work properly for each user account or device and allow the target to be accessed from the symbolic link.

If a user account or device has disabled synchronization of the target, the symbolic link will be invalid for that user account or device even if the path is modified to a relative path. In this case, content management system 110 can determine that the symbolic link will not work for that user account or device because synchronization for the target has been selectively disabled for that user account or device, and generate a notification for the user account or device. The notification can indicate that the symbolic link will not function while synchronization is selectively disabled for the target, and provide an option for the user account or device to modify the synchronization settings for the target and selectively enable synchronization of the target. If the user account or device accepts enabling of synchronization of the target, the target can be synchronized with the user account or device and the symbolic link can then function properly.

If a user account or device does not have access to the target, content management system 110 can synchronize the symbolic link with that user account or device but also generate an alert to the user account or device that created the symbolic link (or any other user account with access to both the symbolic link and the target), indicating that the symbolic link will be invalid for the particular user account or device that does not have access to the target. The user account or device may not have access to the target for a number of reasons, as described in scenarios 1500, 1510, 1520, 1530, such as the target being located in a location (e.g., a namespace, an external location, etc.) that is not accessible by the user account or device. In some cases, the alert may also provide an option to share the target with the user account or device that does not have access to the target. For example, the alert may indicate that the symbolic link will be invalid for a particular user account or device receiving a copy of the symbolic link because the particular user account or device does not have access to the target, and provide an option to share the target with the particular user account or device. If a user who receives the alert and has permissions that allow that user to share the target with the particular user account or device accepts sharing the target with the particular user account or device, content management system 110 can in turn synchronize both the symbolic link and the target with the particular user account or device. This in turn may ensure that the symbolic link is valid for that particular user account or device.

If content management system 110 determines that, after synchronizing the target to that particular user account or device, the symbolic link will still be invalid for that particular user account or device because the symbolic link includes an absolute path that will not be valid for the particular user account or device, then content management system 110 can additionally include an option in the alert for modifying the path in the symbolic link from an absolute path to a relative path that works within the structure of the synchronized content items.

Figure 16:
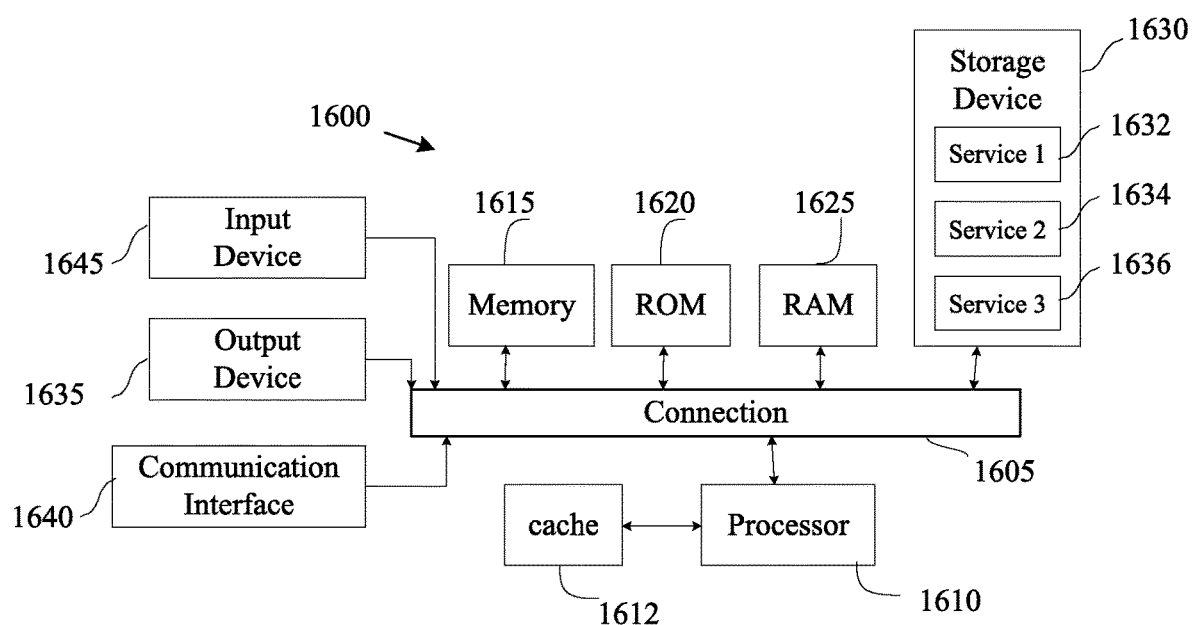
FIG. 16 shows an example of a system for implementing various aspects of the present technology.

FIG. 16 shows an example of computing system 1600, which can be for example any computing device making up client device 150, content management system 110 or any component thereof in which the components of the system are in communication with each other using connection 1605. Connection 1605 can be a physical connection via a bus, or a direct connection into processor 1610, such as in a chipset architecture. Connection 1605 can also be a virtual connection, networked connection, or logical connection.

In some embodiments computing system 1600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1600 includes at least one processing unit (CPU or processor) 1610 and connection 1605 that couples various system components including system memory 1615, such as read only memory (ROM) 1620 and random access memory (RAM) 1625 to processor 1610. Computing system 1600 can include a cache of highspeed memory 1612 connected directly with, in close proximity to, or integrated as part of processor 1610.

Processor 1610 can include any general purpose processor and a hardware service or software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes an input device 1645, which can represent any number of input mechanisms, such as a microphone for speech, a touch-sensitive screen for gesture or graphical input, keyboard, mouse, motion input, speech, etc. Computing system 1600 can also include output device 1635, which can be one or more of a number of output mechanisms known to those of skill in the art. In some instances, multimodal systems can enable a user to provide multiple types of input/output to communicate with computing system 1600. Computing system 1600 can include communications interface 1640, which can generally govern and manage the user input and system output. There is no restriction on operating on any particular hardware arrangement and therefore the basic features here may easily be substituted for improved hardware or firmware arrangements as they are developed.

Storage device 1630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMS), read only memory (ROM), and/or some combination of these devices.

The storage device 1630 can include software services, servers, services, etc., that when the code that defines such software is executed by the processor 1610, it causes the system to perform a function. In some embodiments, a hardware service that performs a particular function can include the software component stored in a computer-readable medium in connection with the necessary hardware components, such as processor 1610, connection 1605, output device 1635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with nonvolatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    adding a first content item on a client device, the first content item being associated with a user account at a content management system;
    determining the first content item does not have a first unique identifier from the content management system;
    comparing metadata between the first content item and a second content item to determine that the first content item and the second content item are associated with one another to allow the first content item to inherit a second unique identifier associated with the second content item;
    in response to the determination that the first content item and the second content item are associated with one another to allow the first content item to inherit the second unique identifier associated with the second content item, assigning the second unique identifier to the first content item;
    sending, to the content management system, a request to verify a uniqueness of the second unique identifier at the content management system;
    after sending the request to verify the uniqueness of the second unique identifier, adding a node representing the first content item to a local tree at the client device, the node identifying the first content item based on the second unique identifier and the local tree representing a local state of content items at the client device;
    based on a response to the request, determining whether the second unique identifier is verifiably unique at the content management system, wherein the request to verify includes a block or blocklist associated with the second content item, or a hash of at least a portion of the second content item; and
    uploading the first content item with the second unique identifier to the content management system.

2. The method of claim 1, further comprising:
    in response to determining that the second unique identifier is not verifiably unique, stripping the second content item of the second unique identifier; and
    obtaining a third unique identifier for the second content item from the content management system.

3. The method of claim 1, wherein the first unique identifier and the second unique identifier are written as metadata for the first content item.

4. The method of claim 1, wherein assigning the second unique identifier to the first content item comprises reassigning the second unique identifier from the second content item.

5. The method of claim 4, wherein reassigning the second unique identifier to the first content item comprises extracting the second unique identifier from the second content item and appending the second unique identifier to the first content item as an extended attribute.

6. The method of claim 1, wherein the second unique identifier comprises a respective unique identifier generated by the content management system and assigned to the second content item by the content management system.

7. The method of claim 1, wherein assigning the second unique identifier to the first content item comprises writing the second unique identifier to the first content item as an extended attribute of the first content item.

8. The method of claim 1, wherein determining to allow the first content item to inherit the second unique identifier from the second content item comprises:
    identifying a first path associated with the first content item;
    determining a previous path associated with the second content item matches the first path associated with the first content item;
    determining the first content item comprises a version of the second content item being resurrected or moved to the first path associated with the first content item; and
    based on determining the first content item comprises the version of the second content item, determining to allow the first content item to inherit the second unique identifier from the second content item.

9. A non-transitory computer readable medium comprising instructions, the instructions, when executed by one or more processors, cause a client device to:
    add a first content item on the client device, the first content item being associated with a user account at a content management system;
    determine the first content item does not have a first unique identifier from the content management system;
    compare metadata between the first content item and a second content item to determine that the first content item and the second content item are associated with one another to allow the first content item to inherit a second unique identifier from the second content item;
    in response to the determination that the first content item and the second content item are associated with one another to allow the first content item to inherit the second unique identifier associated with the second content item, assign the second unique identifier to the first content item;
    send, to the content management system, a request to verify a uniqueness of the second unique identifier at the content management system;
    after sending the request to verify the uniqueness of the second unique identifier, add a node representing the first content item to a local tree at the client device, the node identifying the first content item based on the second unique identifier and the local tree representing a local state of content items at the client device;
    based on a response to the request, determine whether the second unique identifier is verifiably unique at the content management system, wherein the request to verify includes a block or blocklist associated with the second content item, or a hash of at least a portion of the second content item; and
    upload the first content item with the second unique identifier to the content management system.

10. The non-transitory computer readable medium of claim 9, comprising further instructions to cause the client device to:
    in response to determining that the second unique identifier is not verifiably unique, strip the second content item of the second unique identifier; and obtain a third unique identifier for the second content item from the content management system.

11. The non-transitory computer readable medium of claim 9, wherein the first unique identifier and the second unique identifier are written as metadata for the first content item.

12. The non-transitory computer readable medium of claim 9, wherein assigning the second unique identifier to the first content item comprises reassigning the second unique identifier from the second content item.

13. The non-transitory computer readable medium of claim 9, wherein reassigning the second unique identifier to the first content item comprises extracting the second unique identifier from the second content item and appending the second unique identifier to the first content item as an extended attribute.

14. The non-transitory computer readable medium of claim 9, wherein the second unique identifier comprises a respective unique identifier generated by the content management system and assigned to the second content item by the content management system.

15. The non-transitory computer readable medium of claim 9, wherein assigning the second unique identifier to the first content item comprises writing the second unique identifier to the first content item as an extended attribute of the first content item.

16. The non-transitory computer readable medium of claim 9, wherein determining to allow the first content item to inherit the second unique identifier from the second content item comprises:
   identifying a first path associated with the first content item;
   determining a previous path associated with the second content item matches the first path associated with the first content item;
   determining the first content item comprises a version of the second content item being resurrected or moved to the first path associated with the first content item; and
   based on determining the first content item comprises the version of the second content item, determining to allow the first content item to inherit the second unique identifier from the second content item.

17. A computing device comprising:
   one or more processors; and
   at least one non-transitory computer readable medium having stored therein instructions which, when executed by the one or more processors, cause the computing device to:
   add a first content item on the computing device, the first content item being associated with a user account at a content management system;
   determine the first content item does not have a first unique identifier from the content management system;
   compare metadata between the first content item and a second content item to determine that the first content item and the second content item are associated with one another to allow the first content item to inherit a second unique identifier from the second content item;
   in response to the determination that the first content item and the second content item are associated with one another to allow the first content item to inherit the second unique identifier associated with the second content item, assign the second unique identifier to the first content item;
   send, to the content management system, a request to verify a uniqueness of the second unique identifier at the content management system;
   after sending the request to verify the uniqueness of the second unique identifier, add a node representing the first content item to a local tree at the computing device, the node identifying the first content item based on the second unique identifier and the local tree representing a local state of content items at the computing device;
   based on a response to the request, determine whether the second unique identifier is verifiably unique at the content management system, wherein the request to verify includes a block or blocklist associated with the second content item, or a hash of at least a portion of the second content item; and
   upload the first content item with the second unique identifier to the content management system.

18. The computing device of claim 17, wherein determining to allow the first content item to inherit the second unique identifier from the second content item comprises:
   identifying a first path associated with the first content item;
   determining a previous path associated with the second content item matches the first path associated with the first content item;
   determining the first content item comprises a version of the second content item being resurrected or moved to the first path associated with the first content item; and
   based on determining the first content item comprises the version of the second content item, determining to allow the first content item to inherit the second unique identifier from the second content item.

19. The computing device of claim 17, comprising further instructions to cause the computing device to:
   in response to determining that the second unique identifier is not verifiably unique, strip the second content item of the second unique identifier; and
   obtain a third unique identifier for the second content item from the content management system.

* * * * *